(12) United States Patent
Chunduri et al.

(10) Patent No.: US 12,478,706 B2
(45) Date of Patent: Nov. 25, 2025

(54) AIR PURIFIERS INCLUDING A PLASMA REACTOR CAPABLE OF PRODUCING ONE OR MORE REACTION PRODUCTS FROM AMBIENT AIR

(71) Applicant: Somnio Global Holdings, LLC, Novi, MI (US)

(72) Inventors: Tejasvi Chunduri, Ann Arbor, MI (US); Volodymyr Ivanovich Golota, Novi, MI (US); Abhishek Nagesh Kumbhar, Ann Arbor, MI (US); Ruslan Joseph Menezes, Farmington, MI (US); Sujeet Shyamsunder Shinde, Novi, MI (US); Raj Siman Swamy Naidu Ugapathy, Novi, MI (US); Pravansu S. Mohanty, Canton, MI (US)

(73) Assignee: SOMNIO GLOBAL HOLDINGS, LLC, Novi, MI (US)

( * ) Notice: Subject to any disclaimer, the term of this patent is extended or adjusted under 35 U.S.C. 154(b) by 465 days.

(21) Appl. No.: 17/911,595

(22) PCT Filed: Mar. 19, 2021

(86) PCT No.: PCT/US2021/023159
§ 371 (c)(1),
(2) Date: Sep. 14, 2022

(87) PCT Pub. No.: WO2021/188895
PCT Pub. Date: Sep. 23, 2021

(65) Prior Publication Data
US 2023/0119625 A1    Apr. 20, 2023

Related U.S. Application Data

(60) Provisional application No. 62/991,921, filed on Mar. 19, 2020.

(51) Int. Cl.
*A61L 9/22* (2006.01)
*B01J 21/18* (2006.01)
*H05H 1/48* (2006.01)

(52) U.S. Cl.
CPC ............ *A61L 9/22* (2013.01); *B01J 21/18* (2013.01); *H05H 1/48* (2013.01); *A61L 2209/11* (2013.01);
(Continued)

(58) Field of Classification Search
CPC ........................................... A61L 9/22
See application file for complete search history.

(56) References Cited

U.S. PATENT DOCUMENTS

| 8,388,900 B2 | 3/2013 | Benedek et al. | |
| 2004/0007000 A1* | 1/2004 | Takeda | F24F 8/192 62/264 |

(Continued)

FOREIGN PATENT DOCUMENTS

WO    2018045378 A1    3/2018

*Primary Examiner* — Kevin Joyner
(74) *Attorney, Agent, or Firm* — Dinsmore & Shohl LLP

(57) ABSTRACT

An air purifier may include an ambient air intake configured to draw ambient air into the air purifier: a plasma reactor configured to generate one or more reaction products from the ambient air: a main body including at least the plasma reactor: a neutralizing trap configured to neutralize at least a portion of the one or more reaction products generated by the plasma reactor, thereby producing a purified gas stream; and a purified gas outlet configured to expel the purified gas stream from the air purifier. The ambient air intake may be fluidly coupled to the plasma reactor. The plasma reactor may be fluidly coupled to the neutralizing trap. The neutralizing trap may be fluidly coupled to the purified gas outlet.

18 Claims, 42 Drawing Sheets

(52) U.S. Cl.
CPC ..... *A61L 2209/134* (2013.01); *A61L 2209/14* (2013.01); *H05H 2245/15* (2021.05)

(56) References Cited

U.S. PATENT DOCUMENTS

| | | |
|---|---|---|
| 2004/0120845 A1 | 6/2004 | Potember et al. |
| 2005/0174062 A1* | 8/2005 | Tanaka .............. H01J 37/32009 315/111.21 |
| 2005/0257687 A1* | 11/2005 | Tanaka ...................... B03C 3/08 96/15 |
| 2008/0063577 A1 | 3/2008 | Crowe et al. |
| 2012/0269677 A1 | 10/2012 | Zhou et al. |
| 2015/0050191 A1 | 2/2015 | Li et al. |
| 2017/0333587 A1* | 11/2017 | Bender .............. B01D 46/0027 |

* cited by examiner

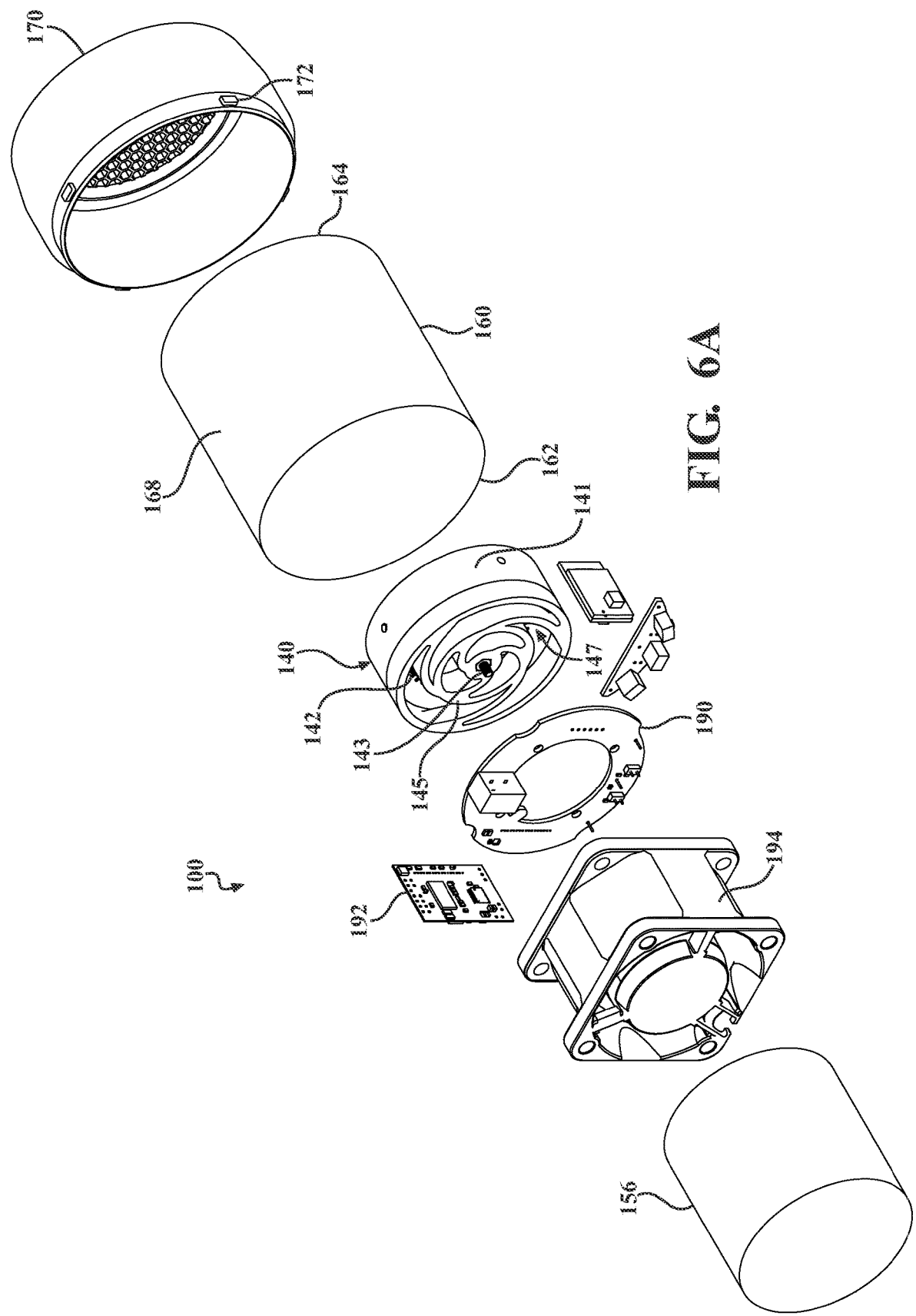

FIG. 21
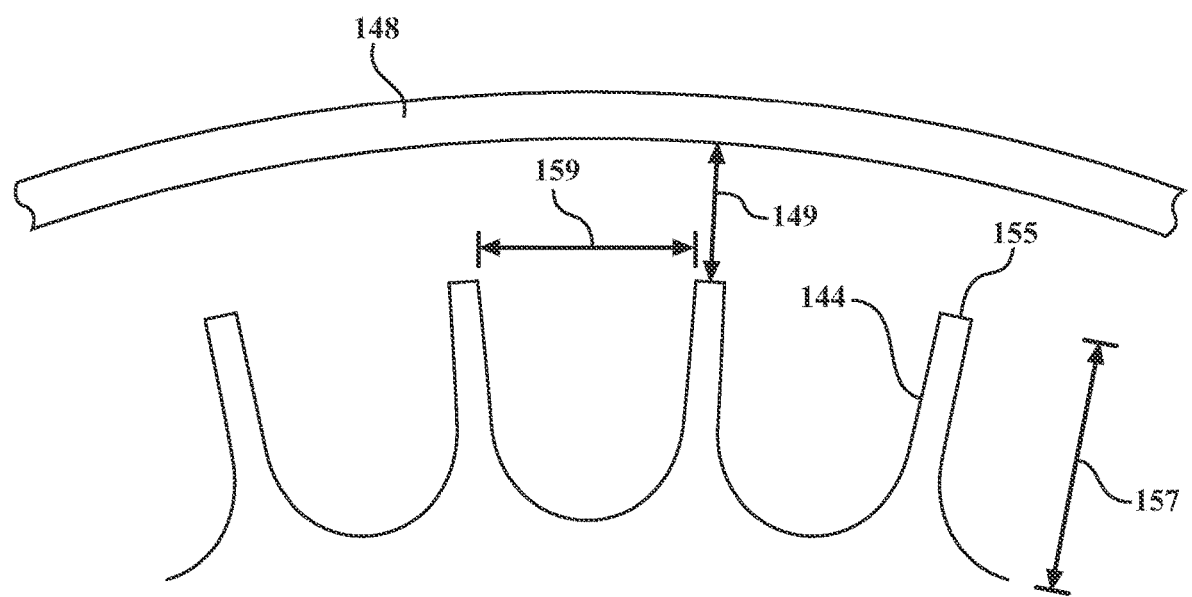
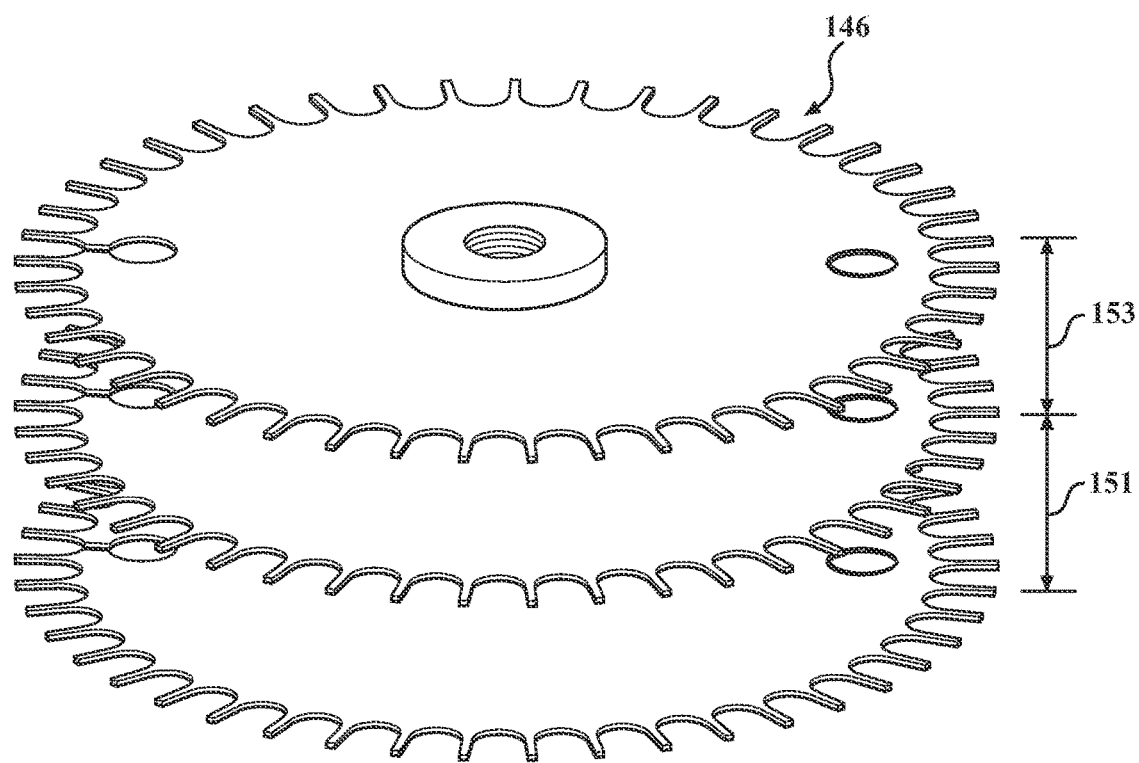
FIG. 22

FIG. 23

Single Pass Efficiency of Viable MS2 Bacteriophage Bioaerosol

Before the Trap: 4.33
After the Trap: 5.74

Y-axis: Net Log Reduction

Legend: LF 1 Reduction, LF 2 Reduction

FIG. 24

Single Pass Efficiency of Viable A. Niger Bioaerosol

Before the Trap: 3.80
After the Trap: 4.23

Y-axis: Net Log Reduction

Legend: LF 1 Reduction, LF 2 Reduction

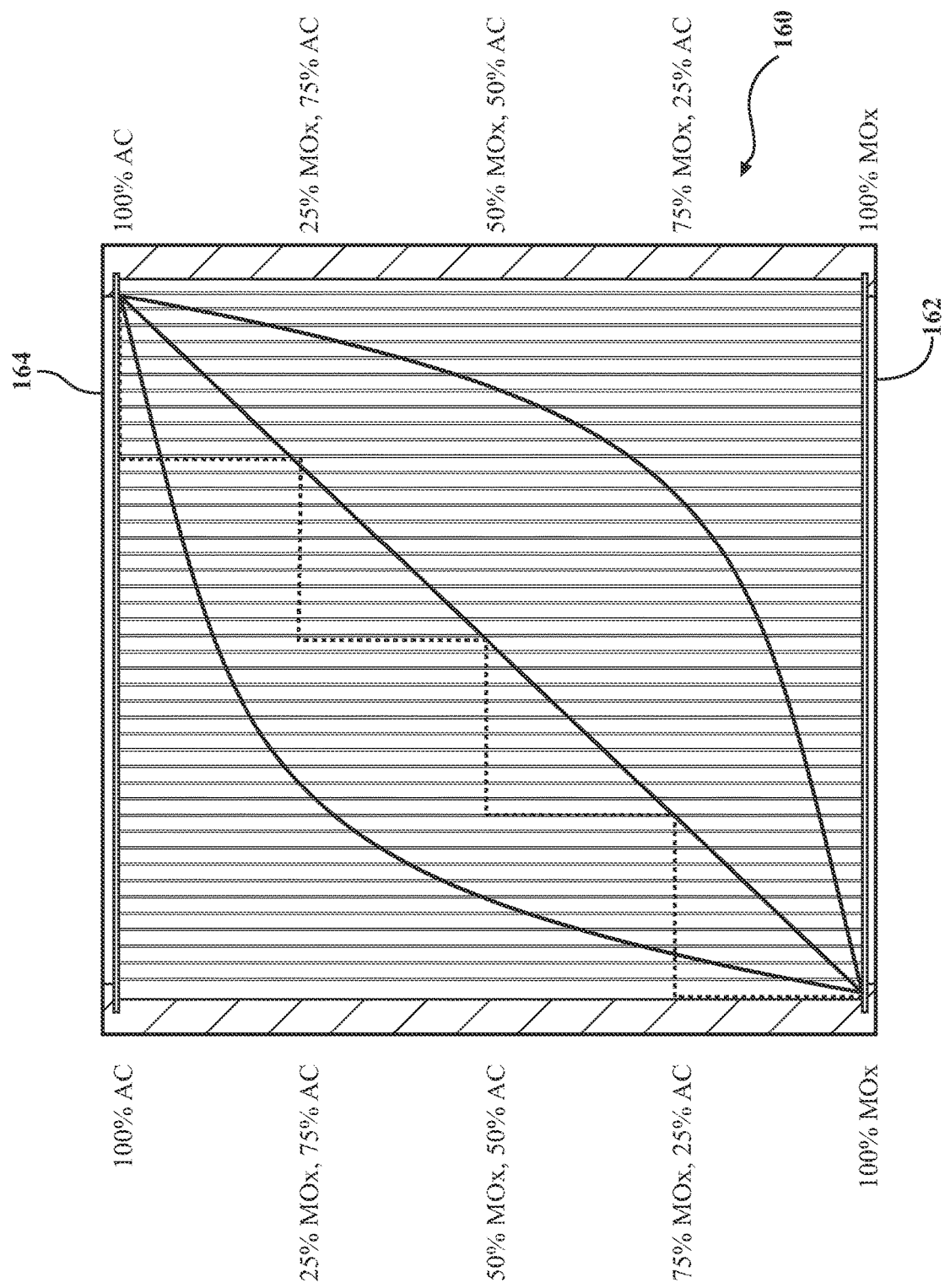

AIR PURIFIERS INCLUDING A PLASMA REACTOR CAPABLE OF PRODUCING ONE OR MORE REACTION PRODUCTS FROM AMBIENT AIR

CROSS REFERENCE TO RELATED APPLICATIONS

This application is the U.S. National Stage of PCT/US2021/023159 filed on Mar. 19, 2021, which claims priority to U.S. Provisional Patent Application 62/991,921, filed Mar. 19, 2020, the entire contents of both are incorporated herein by reference in their entirety.

TECHNICAL FIELD

The present disclosure relates to devices for purifying ambient air and, more particularly, to devices that include at least (a) a plasma reactor configured to generate one or more reaction products from the ambient air and (b) a neutralizing trap configured to neutralize at least a portion of the reaction products generated by the plasma reactor, thereby producing a purified gas stream.

BACKGROUND

Various filtration systems may be used to reduce the concentration of contaminants in ambient air. While conventional trapping filters for air purifiers may be produced at low costs, they simply retain contaminants and can thus produce uneven filtration results due to high contaminant concentrations, or as a result of extended runtimes, or both. In addition, conventional trapping filters may provide a growth medium for biological contaminants, and thus have a negative effect on air quality if not frequently replaced or maintained.

Other typical air purifiers may include HEPA (High Efficiency Particulate Air) systems or electrostatic precipitators, which use electrostatic forces to remove particles from the air. However, typical HEPA filters and electrostatic precipitators are not capable of removing volatile organic compounds (VOCs) from the ambient air.

SUMMARY

From the aforementioned, it is apparent that typical air purifiers may not be capable of efficiently and effectively removing contaminants from ambient air. As such, alternative air purifiers are desirable. These air purifiers, which may be sized to accommodate a personal space or one or more rooms of a building, and may include a plasma reactor configured to generate one or more reaction products from the ambient air. The reaction products may include one or more of ozone and free radicals, which may remove at least a portion of contaminants from the ambient air when contacted with one another. Moreover, the air purifiers may include a neutralizing trap configured to neutralize at least a portion of the one or more reaction products generated by the plasma reactor into their basic forms, thereby producing a purified gas stream. The neutralizing trap may also remove any uncontacted reaction products from the purified gas stream before the purified gas stream is expelled from the air purifier.

The following summary is provided to facilitate an understanding of some of the innovative features unique to the present disclosure and is not intended to be a full description. A full appreciation of the various aspects of the disclosure can be gained by taking the entire specification, claims, drawings, and abstract as a whole.

It is highly desirable that an air purifier include a plasma reactor capable of utilizing gases, such as ambient air, to generate reaction products, such as ozone and free radicals, at high density and with high efficiency. Heretofore, these plasma reactors have been susceptible to moisture in the feed gas, as water vapor in the gas may cause unwanted arcing. Further, generating a significant amount of energetic electrons at the streamer head is required for dissociation and ionization efficiency, and it has been challenging to prevent radical loss due to collision with untreated gas failing to interact with the streamer head to maintain high radical density.

It is also highly desirable that the air purifier include a neutralizing trap capable of sequestering and neutralizing at least a portion of the reaction products generated by the plasma reactor. Once this has occurred, a purified gas stream is produced and expelled from the air purifier. The neutralizing trap may include a plurality of layers, each having a different composition from the other layers. Without being bound by theory, it is believed that a neutralizing trap that includes a plurality of layers increases the lifetime of the air purifier.

Therefore, provided in the present disclosure is an air purifier that includes both a plasma reactor and a neutralizing trap. The plasma reactor may include one or more discharge pins having a sharp curvature to ignite streamers at low applied voltage. Also, a plurality of ignition tips are optionally provided on each discharge pin to generate a plurality of streamers. Further, the discharge pins are optionally arranged such that streamer heads constrain themselves to reduce secondary branching. Yet further, the discharge pins lend themselves to cost effective manufacturing and assembly.

In general, streamer volume does not play a crucial role on the species concentration. Further, branching instability increases as the diameter of the streamer increases during propagation and is a function of streamer length. Branching and generation of secondary streamers reduce radical generation efficiency, and hence should be avoided. For reference, the electric field at the heads of smaller radii (as in the case of positive) streamers is much more enhanced than on the larger radii (as in the case of negative) streamers. The smaller radii streamers also move faster. Since radical production efficiency is determined by the local electric field (via the electron energy), narrow and primary streamers may be promoted for high radical generation efficiency in large discharge gaps.

Streamers originating from the same polarity discharge pins are repelled by neighboring streamers. If constrained uniformly by the field of neighboring streamers, radius thinning as well as field enhancement will occur. Further, the generation of secondary streamers will be restricted, thereby enhancing radical generation efficiency. Therefore, streamer ignition tips should be optimally positioned such that the field proximity of the surrounding streamers constrain each streamer head to keep it narrow and stable, and thus, achieve further field enhancement without increasing the applied voltage. And, a significant fraction of electrons can cause dissociation and ionization of gas molecules, thereby producing large amount of radicals. However, care must be taken to prevent arcing due to speed increase.

Large amounts of high-energy free radicals in the one or more reaction products may cause fast chemical reactions with impurities and moisture. As such, to develop reliable discharge devices, both the discharge pin and the ground electrode of the plasma reactor should have good electrical conductivity, erosion, and corrosion resistance.

To maximize the radical density and generation efficiency of one or both of the one or more reaction products, restricting the gas flow through the inter-pin gaps may be a design objective of the air purifier. Most of the feed gas (e.g., ambient air) may be optionally directed to interact with a streamer head, thereby leaving little untreated gas in the air purifier that can lead to radical loss or ozone loss in the one or more reaction products due to collision. Further, the residual charges at the ignition tips may be removed between successive streamers to prevent arcing. Also, the air purifier may be operable at high relative humidity without condensation on the electrodes. In other words, the gas velocity at the ignition tips may be strong.

Provided are air purifiers that solve one or more of the above problems by optionally providing, in at least one aspect, one or more plasma reactors configured to generate one or more reaction products from the ambient air. The air purifiers may further include one or more neutralizing traps configured to neutralize at least a portion of the one or more reaction products generated by the one or more plasma reactors, thereby producing a purified gas stream. These one or more plasma reactors may accomplish this function by increasing the number of primary streamers per unit volume, providing uniformity in their distribution in the flow path, and hence increasing the interaction of the ambient air with higher number of energetic electrons capable of dissociation and ionization.

In some aspects, an air purifier may include an ambient air intake configured to draw ambient air into the air purifier; a plasma reactor configured to generate one or more reaction products from the ambient air; a main body including at least the plasma reactor; a neutralizing trap configured to neutralize at least a portion of the one or more reaction products generated by the plasma reactor, thereby producing a purified gas stream; and a purified gas outlet configured to expel the purified gas stream from the air purifier. The ambient air intake may be fluidly coupled to the plasma reactor. The plasma reactor may be fluidly coupled to the neutralizing trap. The neutralizing trap may be fluidly coupled to the purified gas outlet.

In one or more aspects, an air purifier may include a main body including a first end and a second end that is opposite of the first end; an ambient air intake positioned within a portion of the main body; a plasma reactor positioned between the first end of the main body and the second end of the main body, where the plasma reactor may be configured to generate one or more reaction products from the ambient air; a neutralizing trap configured to neutralize at least a portion of the one or more reaction products generated by the plasma reactor, thereby producing a purified gas stream; and a purified gas outlet positioned proximal to the second end of the main body. The ambient air intake may be configured to draw ambient air into the air purifier. The ambient air intake may be fluidly coupled to the plasma reactor. The plasma reactor may be fluidly coupled to the neutralizing trap. The purified gas outlet may be configured to expel the purified gas stream from the second end of the air purifier. The neutralizing trap may be fluidly coupled to the purified gas outlet.

In one or more aspects, an air purifier may include a main body including a first end and a second end that is opposite of the first end; an ambient air intake positioned proximal to the first end of the main body; a plasma reactor including a plurality of discharge electrode assemblies, wherein the plasma reactor is positioned between the first end of the main body and the second end of the main body, and wherein the plasma reactor is configured to generate one or more reaction products from the ambient air; a neutralizing trap configured to neutralize at least a portion of the one or more reaction products generated by the plasma reactor, thereby producing a purified gas stream; and a purified gas outlet configured to expel the purified gas stream from the air purifier. The ambient air intake may be configured to draw ambient air into the air purifier. The ambient air intake may be fluidly coupled to the plasma reactor. The plasma reactor may be fluidly coupled to the neutralizing trap. The neutralizing trap may be fluidly coupled to the purified gas outlet.

In one or more aspects, the neutralizing trap may include a plurality of layers, optionally wherein two or more of the layers within the plurality of layers have a different composition from each other. Each of the layers may be formed from activated carbon, a metal oxide catalyst, or both. Optionally, the neutralizing trap may include a sensor or sensor strip at the air outlet to indicate the release of the radicals beyond a specified limit. The sensor strip may change colors when the exposure occurs beyond a cumulative specified limit. The sensor strip may also operably communicate with an electronic display.

In one or more aspects, the plasma reactor may produce ultraviolet (UV) light for contact with the ambient air, the purified gas stream, or both. The UV light may include wavelengths from 10 nm to 400 nm.

In one or more aspects, the air purifier may have a plasma reactor is that is centrally located in the main body and a neutralizing trap that is disposed radially outboard of the plasma reactor. The neutralizing trap may surround the plasma reactor. The neutralizing trap may include a plurality of neutralizing blocks, with each neutralizing trap block having an inlet end and an opposite outlet end. A neutralizer inlet area may be defined in the main body, and the plurality of neutralizing blocks may include a pair of neutralizing blocks. The pair of neutralizing blocks may be disposed with the respective inlet ends adjacent the neutralizer inlet area, a gas flow path being defined from the plasma reactor to the inlet area, and the gas flow path splitting to flow through each of the neutralizing blocks in the pair. Neutralizer outlet areas may be defined in the main body, with each neutralizer outlet area being adjacent the outlet ends of one of the neutralizing blocks in the pair. A second neutralizer inlet area may be defined in the main body. The plurality of neutralizing blocks may further include a second pair of neutralizing blocks, the second pair of neutralizing blocks being disposed with the respective inlet ends adjacent the second neutralizer inlet area, a gas flow path further being defined from the plasma reactor to both of the inlet areas, and the gas flow path splitting to flow through each of the neutralizing blocks in each of the pairs. Each neutralizer outlet area may be adjacent the outlet ends of one of the neutralizing blocks in each of the pairs. The purified gas outlet may include two outlets, each outlet being fluidly coupled to one of the neutralizer outlet areas.

In one or more aspects, the air purifier may include a plasma reactor assembly defining the plasma reactor, power supply and fan. The plasma reactor assembly may have an assembly main body, with the plasma reactor, power supply and fan being disposed in the assembly main body. The plasma reactor assembly may have an end cap removable from the assembly main body to expose the plasma reactor. Removing the end cap may disconnect power to the plasma reactor. The counter electrode of the plasma reactor may be removable for cleaning.

In one or more aspects, a method of at least partially purifying ambient air includes the steps of drawing ambient air into an air purifier; passing the ambient air through a plasma reactor; generating one or more reaction products in the plasma reactor, thereby introducing the reaction products into the ambient air to define a gas stream; and neutralizing at least a portion of the reaction products by passing the gas stream through a neutralizing trap, thereby producing a purified gas stream. A fan may be provided and be operable to draw the ambient air into the air purifier and to pass the air and gas stream through the plasma reactor and neutralizing trap. A particulate filter may be provided before the fan, such as at an inlet to the purifier, and be rated at 0.5 mm to 5 mm to protect the fan and the plasma reactor. The method may include passing the purified gas stream through a particulate filter. The particulate filter may have a plurality of perforations, optionally where each perforation is from 2 microns to 10 microns and/or the perforations may trap particles with a size of at least 1 to 10 microns.

The neutralizing trap may include activated carbon, a metal oxide catalyst, or both. The neutralizing trap may include a plurality of layers, optionally wherein two or more of the layers within the plurality of layers have a different composition from each other. The neutralizing trap may include a first layer, a second layer, a third layer, a fourth layer, and a fifth layer, wherein: the first layer comprises greater than 90 wt. % activated carbon, based on the total weight of the first layer; the second layer comprises from 60 wt. % to 90 wt. % activated carbon, based on the total weight of the second layer, and from 10 wt. % to 40 wt. % of the metal oxide catalyst, based on the total weight of the second layer; the third layer comprises from 40 wt. % to 60 wt. % activated carbon, based on the total weight of the third layer, and from 40 wt. % to 60 wt. % of the metal oxide catalyst, based on the total weight of the third layer; the fourth layer comprises from 10 wt. % to 40 wt. % activated carbon, based on the total weight of the fourth layer, and from 60 wt. % to 90 wt. % of the metal oxide catalyst, based on the total weight of the fourth layer; and the first layer comprises greater than 90 wt. % of the metal oxide catalyst, based on the total weight of the fifth layer.

The neutralizing trap may include a first layer, a second layer, and a third layer, wherein: the first layer comprises greater than 90 wt. % activated carbon, based on the total weight of the first layer; the second layer comprises from 10 wt. % to 90 wt. % activated carbon, based on the total weight of the second layer, and from 10 wt. % to 90 wt. % of the metal oxide catalyst, based on the total weight of the second layer; and the third layer comprises greater than 90 wt. % of the metal oxide catalyst, based on the total weight of the third layer.

In one or more aspects, the ambient air, the gas stream, or both, may be exposed to ultraviolet (UV) light. The UV light may include wavelengths from 10 nm to 400 nm.

In one or more aspects, the one or more reaction products include ozone, oxygen radicals (O*), nitrogen radicals (N*), hydroxyl radicals (OH*), hydrogen radicals (H*), and methylene radicals (CH2*), or combinations thereof.

In one or more aspects, the purified gas stream has a humidity of greater than 10%.

In one or more aspects, the plasma reactor includes: a discharge electrode assembly comprising one or more discharge electrode pins in an array arranged in a radial pattern and electrically configured to receive one or more voltage pulses; and a counter electrode positioned radially outward from the one or more discharge electrode pins, wherein: the discharge electrode assembly is surrounded by the counter electrode and is separated therefrom by a discharge gap comprising a flow passage; and at least one baffling electrically isolates the discharge electrode assembly from the counter electrode and permits the flow of gas through the flow passage. The discharge electrode assembly may include a plurality of layers of arrays of the one or more discharge electrode pins. A layer gap may separate each of the layers of arrays, wherein the layer gap is from 1 millimeter (mm) to 10 mm. The one or more discharge electrode pins may each include an ignition tip, each ignition tip defined by an angle, the ignition tip positioned at a terminus of the discharge electrode pin proximal to the counter electrode. A counter electrode gap may separate the counter electrode from each ignition tip of the one or more discharge electrode pins, wherein the counter electrode gap is from 0.25 millimeters (mm) to 10.5 mm. An ignition tip gap may separate each ignition tip of the one or more discharge electrode pins, wherein the ignition tip gap is from 0.25 millimeters (mm) to 10 mm.

In one or more aspects, a sanitizing mode is provided wherein: a rate of generating one or more reaction products in the plasma reactor is increased to a rate greater than in a non-sanitizing mode; and/or a flow rate through the neutralizing trap is increased to a rate greater than in the non-sanitizing mode; wherein a portion of the reaction products are released to a surrounding area for sanitizing. The flow rate in the sanitizing mode is at least twice the flow rate in the non-sanitizing mode, optionally at least five times the flow rate in the non-sanitizing mode. There may also be a post-sanitizing mode wherein reaction products are not generated and neutralizing continues. The method may include sensing a presence of a user and disabling the sanitizing mode when the user is present.

Accordingly, it becomes possible to solve the aforementioned problems and to generate one or more of reaction products, such as ozone and free radicals, at high density, selectivity, and efficiency, in an air purifier, and neutralize at least a portion of the one or more reaction products in order to purify ambient air, thereby producing a purified gas stream.

Additional features and advantages of the technology described in the present disclosure will be set forth in the detailed description that follows, and in part will be readily apparent to those skilled in the art from the description or recognized by practicing the technology as described in this disclosure, including the detailed description that follows, as well as the claims.

BRIEF DESCRIPTION OF THE DRAWINGS

For the purpose of illustrating the concepts described in the present disclosure, there is shown in the drawings a form that is exemplary; it being understood, however, that the present disclosure is not limited to the precise arrangements and instrumentalities shown. The drawings are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention. Exemplary aspects will become more fully understood from the detailed description and the accompanying drawings, wherein:

FIG. 6A is a schematic view illustrating various components of an air purifier, according to one or more embodiments presently presented;

FIG. 21 is an illustration showing the length of discharge electrode pins and the gaps between each discharge electrode pin of a discharge electrode assembly, according to one or more embodiments presently presented;

FIG. 22 is an illustration showing a gap that may be present between each of the layers of arrays of one or more discharge electrode pins, according to one or more embodiments presently presented;

FIG. 23 is a graph showing a reduction of viable MS2 Bacteriophage bioaerosol present in the ambient air compared to the purified gas stream produced by an air purifier, according to one or more embodiments presently presented;

FIG. 24 is a graph showing the reduction of viable *A. Niger* bioaerosol present in the ambient air compared to the purified gas stream produced by an air purifier, according to one or more embodiments presently presented;

FIG. 30 is an illustration of a multilayer particulate filter, according to one or more embodiments presently presented;

DETAILED DESCRIPTION

Figure 1:
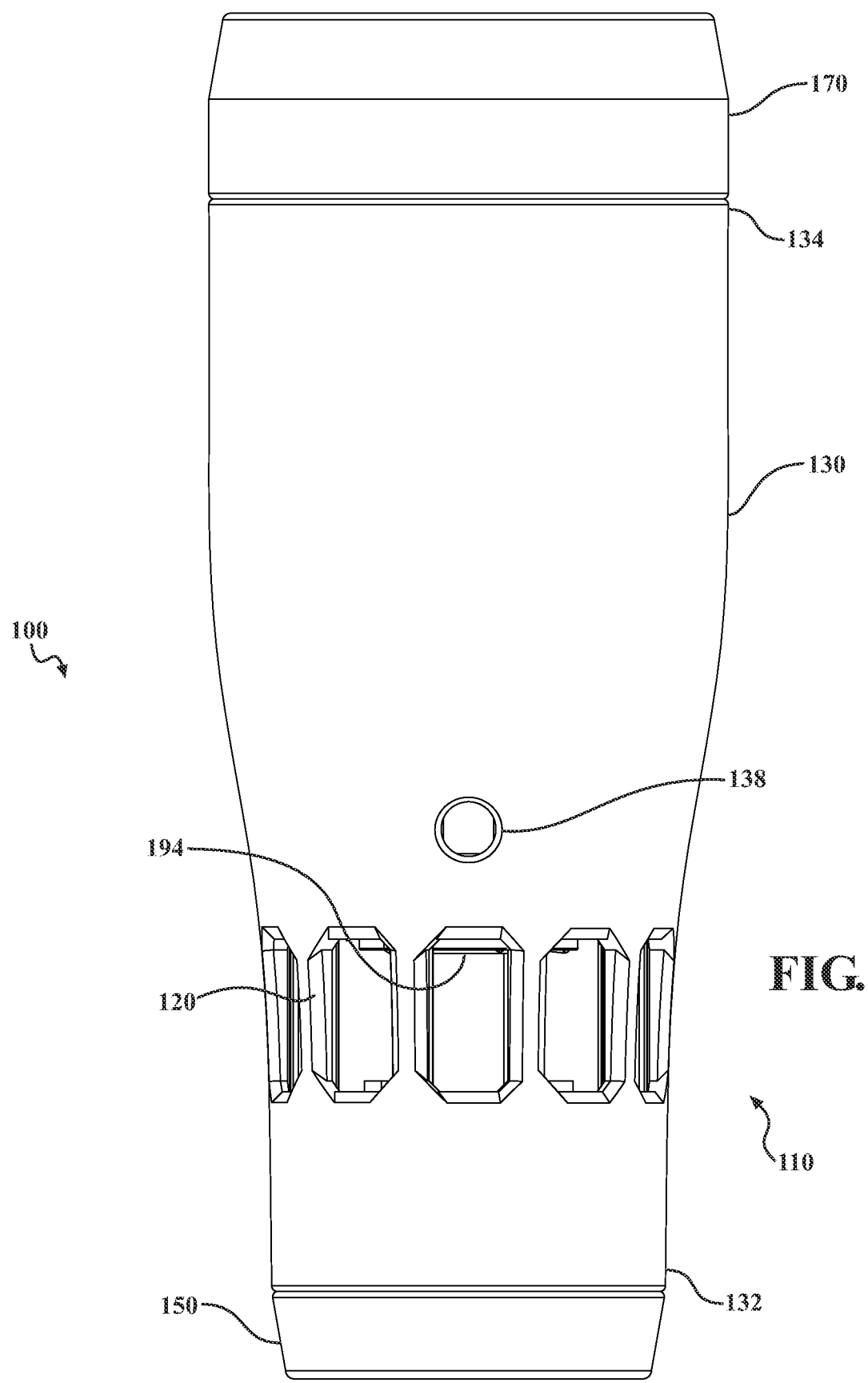
FIG. 1 is an illustration of an air purifier, according to one or more embodiments presently presented.
Figure 2:
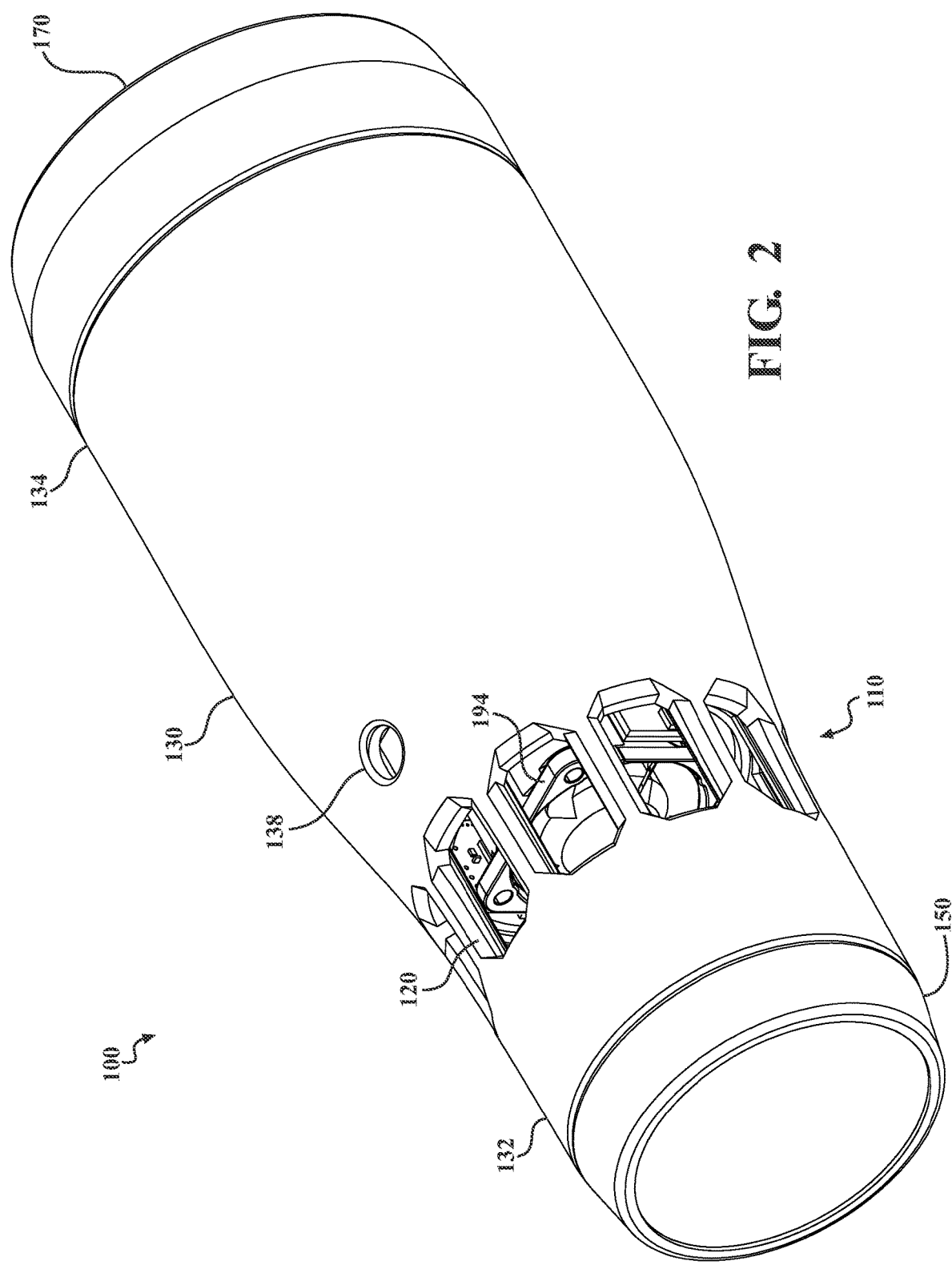
FIG. 2 is an illustration of the air purifier shown in FIG. 1 from a different perspective.

Detailed aspects are disclosed herein; however, it is to be understood that the disclosed aspects are merely exemplary in nature and may be embodied in various and alternative forms. The Figures are not necessarily to scale. Therefore, specific details disclosed herein are not to be interpreted as limiting, but merely as a representative basis for any aspect of the invention and/or as a representative basis for teaching one skilled in the art to variously employ the present invention.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and shall not be interpreted in an idealized or overly formal sense unless expressly so defined herein.

Throughout this specification, where publications are referenced, the disclosures of these publications in their entireties are hereby incorporated by reference into this application to more fully describe the state of the art to which this invention pertains.

The following terms or phrases used herein have the exemplary meanings listed below in connection with at least one aspect:

The term "ambient air," as used herein, means air that includes one or more contaminants. Contaminants may include, but are not limited to, bacteria, viruses, molds, pollen, mites, pesticides, cleaning solvents, formaldehyde, volatile organic compounds, dust, lint, dirt, smoke, soot, hair, pet dander, or any combination of thereof. In embodiments, contaminants may include particulates having a diameter in excess of 0.01 micrometers ($\mu m$). In one or more embodiments, contaminants may include particulates having a diameter of less than 1000 $\mu m$.

The term "reaction product," as used herein, means one or more of ozone, free radicals, and other byproducts produced by the plasma reactor from the ambient air.

The term "free radical," as used herein, means an atom or group of atoms that has an unpaired valence electron and/or is vibrationally excited, and is therefore unstable and highly reactive as those terms are recognized in the art. For example, free oxygen radicals are produced by the following inelastic electron collisions:

  (1)

  (2)

  (3)

which are expressed in a generic form as: $O_2+e^-\rightarrow O^*+O^*$. Other radicals may be produced by similar inelastic collisions depending upon the composition of the gas in the discharge space, such as:

  (4)

  (5)

Examples of free radicals may include one or more of oxygen radicals (O*), nitrogen radicals (N*), hydroxyl radicals (OH*), hydrogen radicals (H*), and methylene radicals ($CH_2^*$).

The term "purified gas stream," as used herein, means a gas stream that includes fewer contaminants than the ambient air, which may be used as a feed gas, for the air purifier. Such contaminants may include, but are not limited to the contaminants that may be present in the ambient air.

Referring now to FIGS. 1-6A, an air purifier 100, according to one or more embodiments, is shown. The air purifier 100 may include an ambient air intake 110, which may be configured to draw ambient air into the air purifier 100 and may be fluidly coupled to at least a plasma reactor 140. The ambient air intake 110 may include a plurality of openings 120 positioned circumferentially around a main body 130 of the air purifier. The main body 130 may include a first end 132 and a second end 134, between which one or more of the other components described herein may be positioned.

Figure 4:
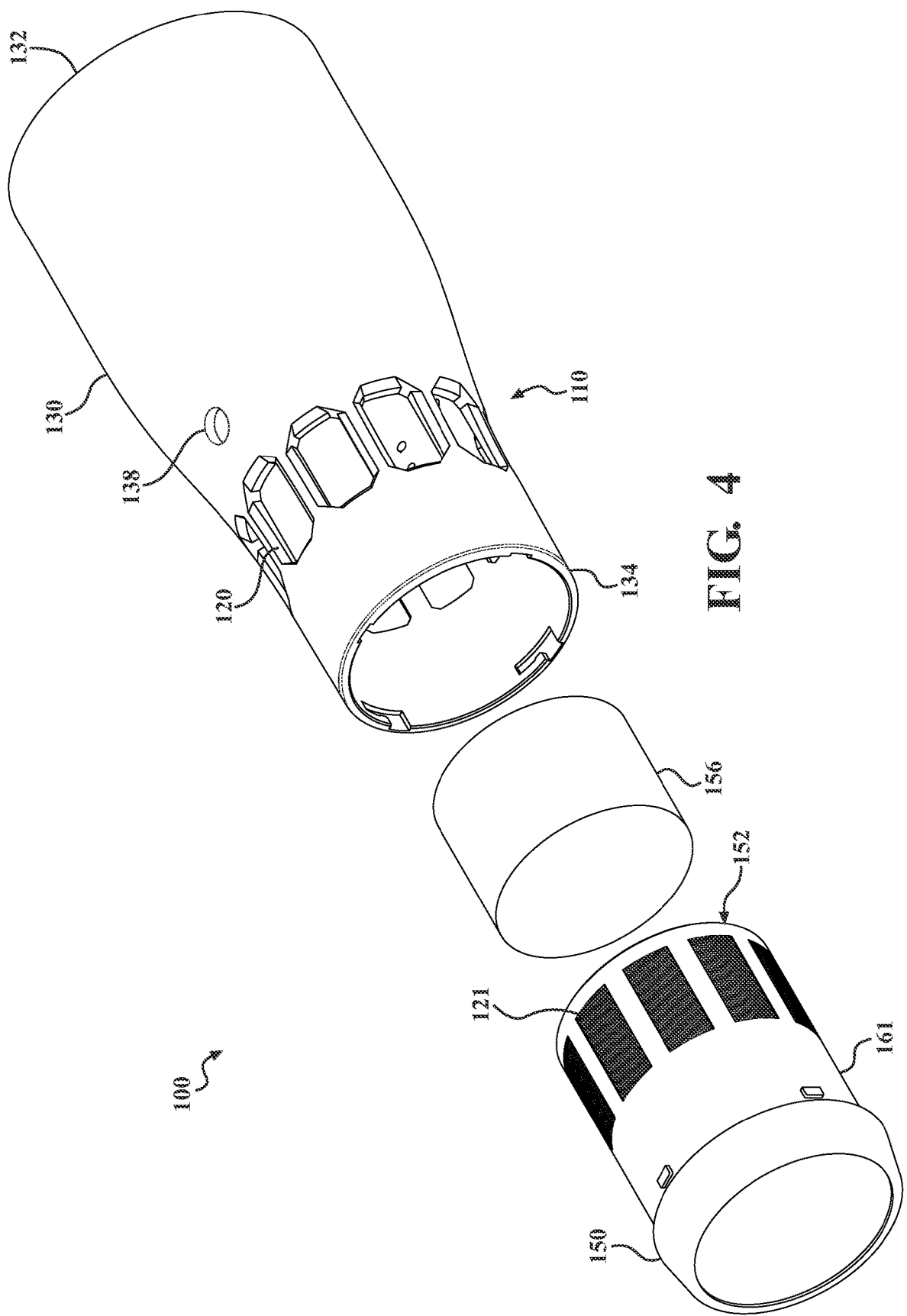
FIG. 4 is a schematic view illustrating some of the components of an air purifier, according to one or more embodiments presently presented.
Figure 5:
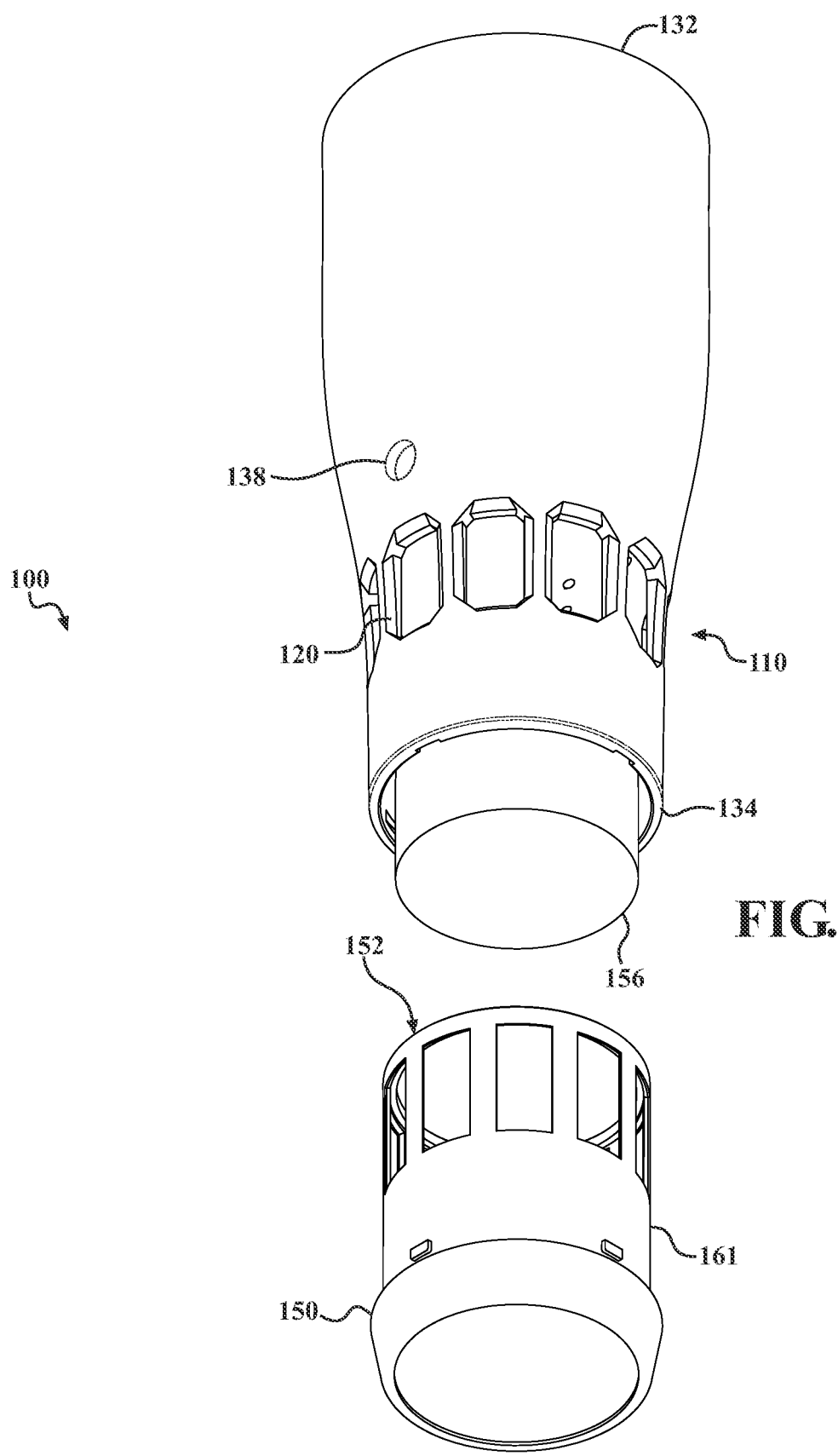
FIG. 5 is a different schematic view of the air purifier shown in FIG. 4.

Each of the plurality of openings 120 may include a screen in order to prevent large particulates from entering the air purifier 100 and for other safety reasons. The optional screen 121 is illustrated in FIG. 4. Such a screen may be used to prevent particles greater than 1000 microns and preferably greater than 840 microns, greater than 500 microns, or greater than 100 microns from entering into the air purifier 100. The ambient air intake 110 may be configured to draw ambient air into the air purifier 100. In one or more embodiments, the air purifier 100 may be shaped to fit into an unmodified cup holder of a vehicle. The air purifier 100 may also be easily portable so that a user may transport it to a personal area, for example, a desk workstation or nightstand. Although FIG. 1 shows the air purifier 100 as cylindrically shaped, it is contemplated that the air purifier 100 of the present disclosure may be many different shapes, such as rectilinear.

Referring now to FIGS. 6A-8, the air purifier 100 may include the plasma reactor 140 configured to generate one or more reaction products from the ambient air. The main body 130 may house at least the plasma reactor 140.

Figure 7:
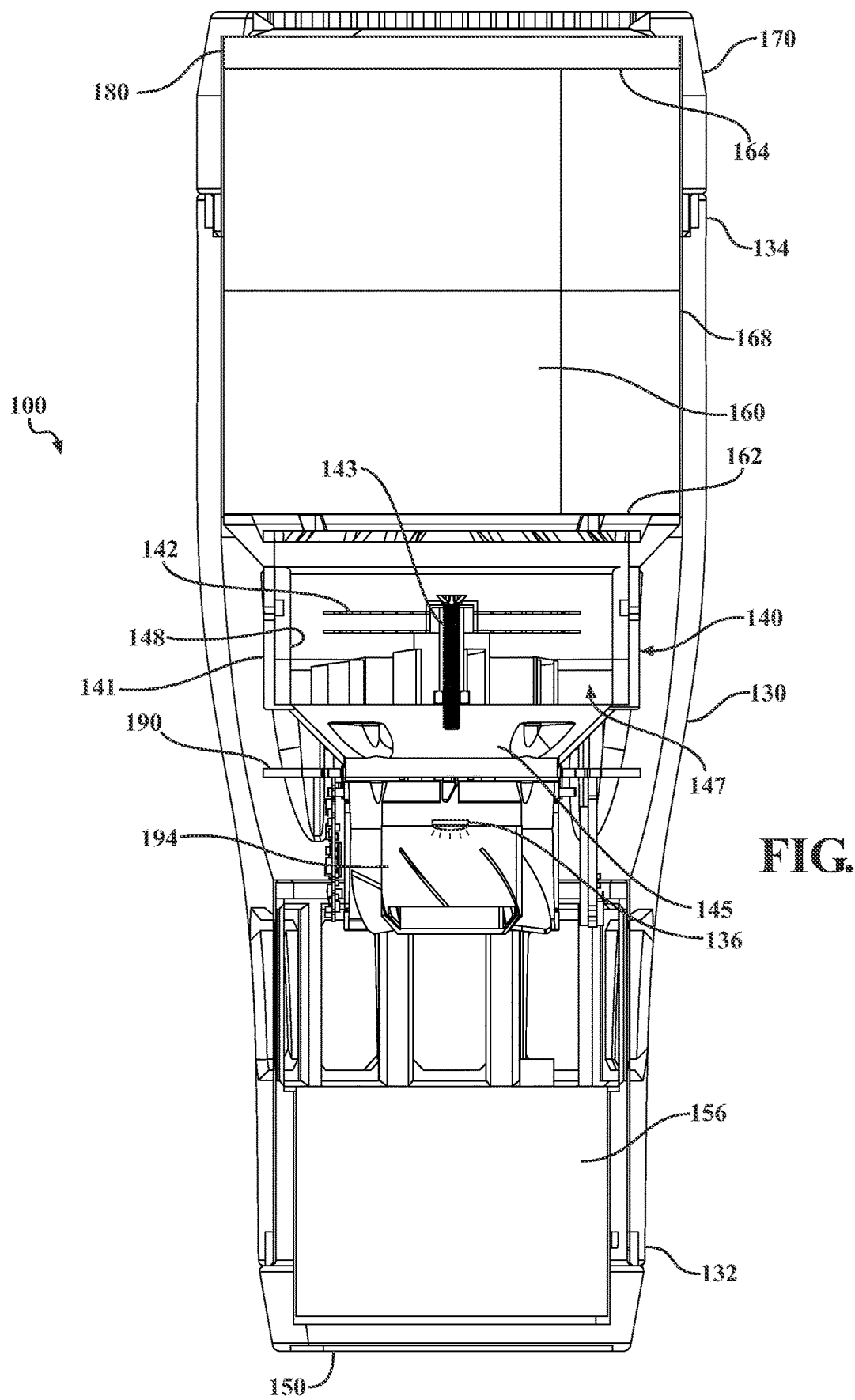
FIG. 7 is a cross-sectional view of an air purifier, according to one or more embodiments presently presented.
Figure 8:
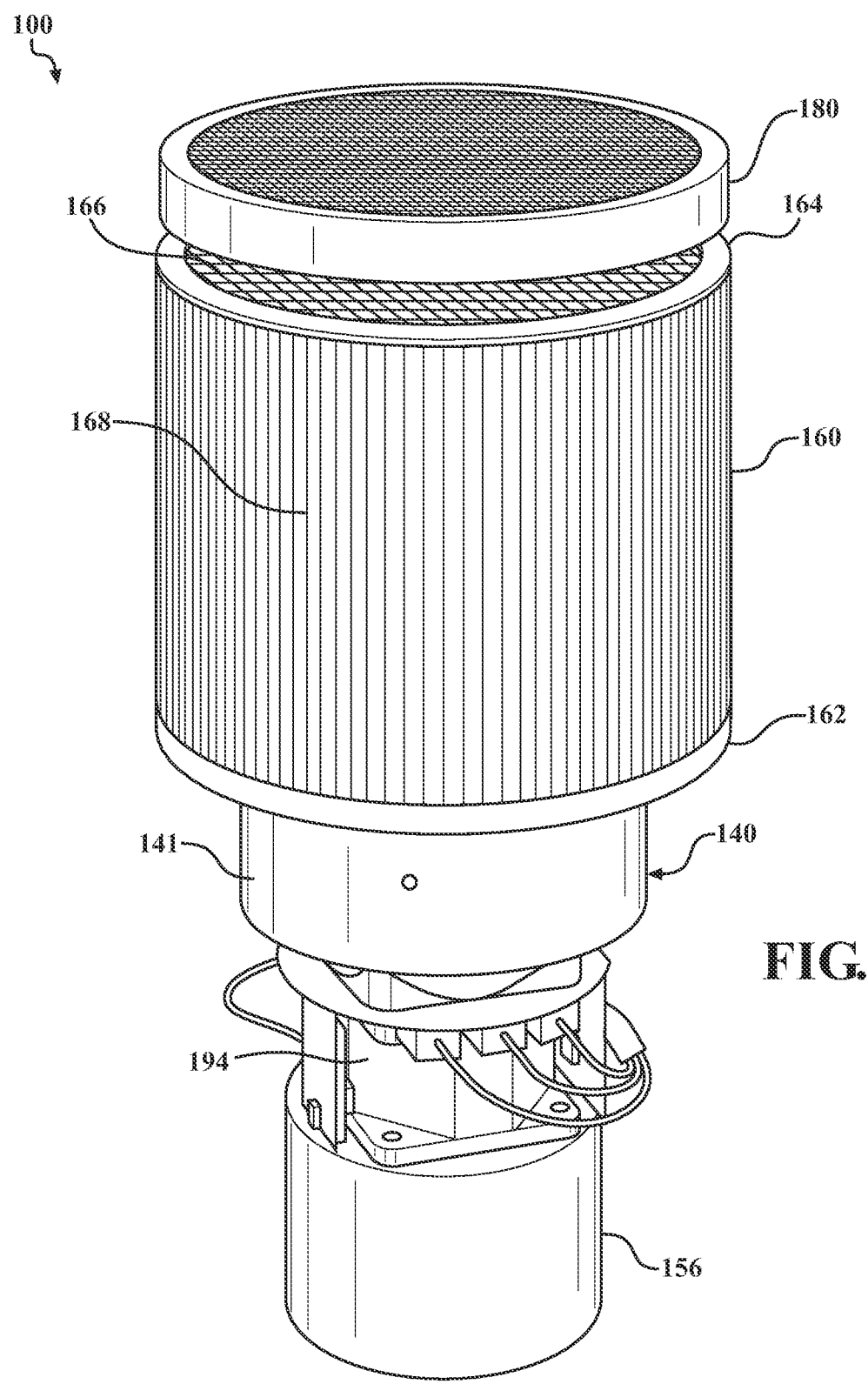
FIG. 8 is an illustration of various components of an air purifier, according to one or more embodiments presently presented.
Figure 9:
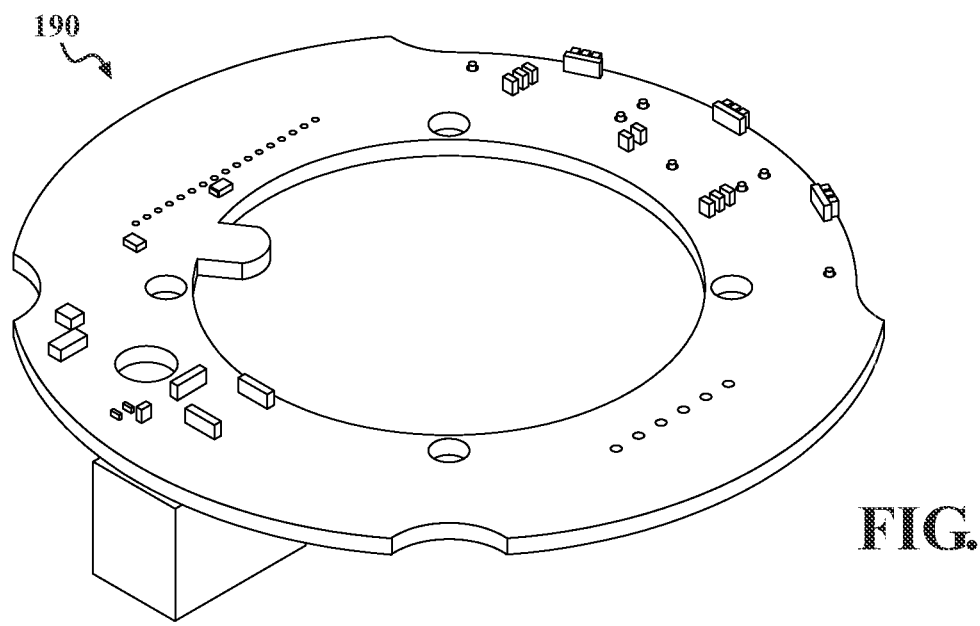
FIG. 9 is an illustration of a control unit that may be included in an air purifier, according to one or more embodiments presently presented.
Figure 11A:
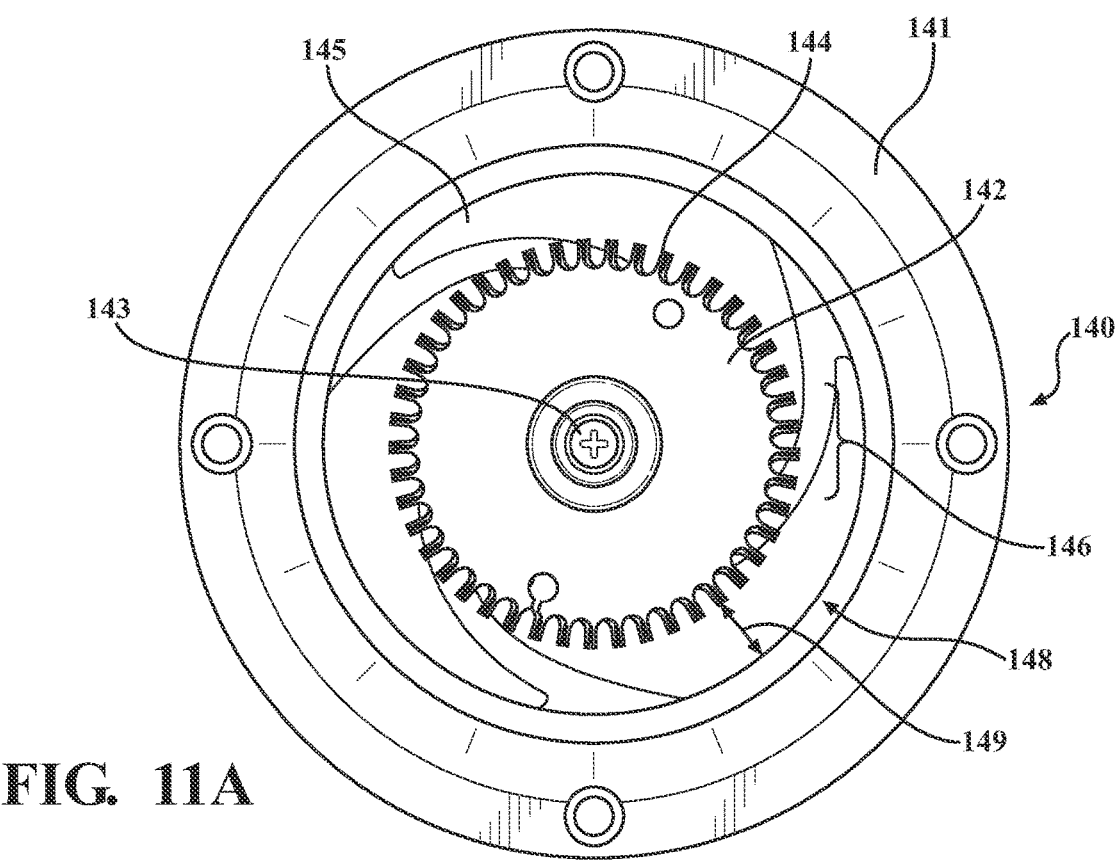
FIG. 11A is an illustration of a plasma reactor that may be included in an air purifier, according to one or more embodiments presently presented.
Figure 11B:
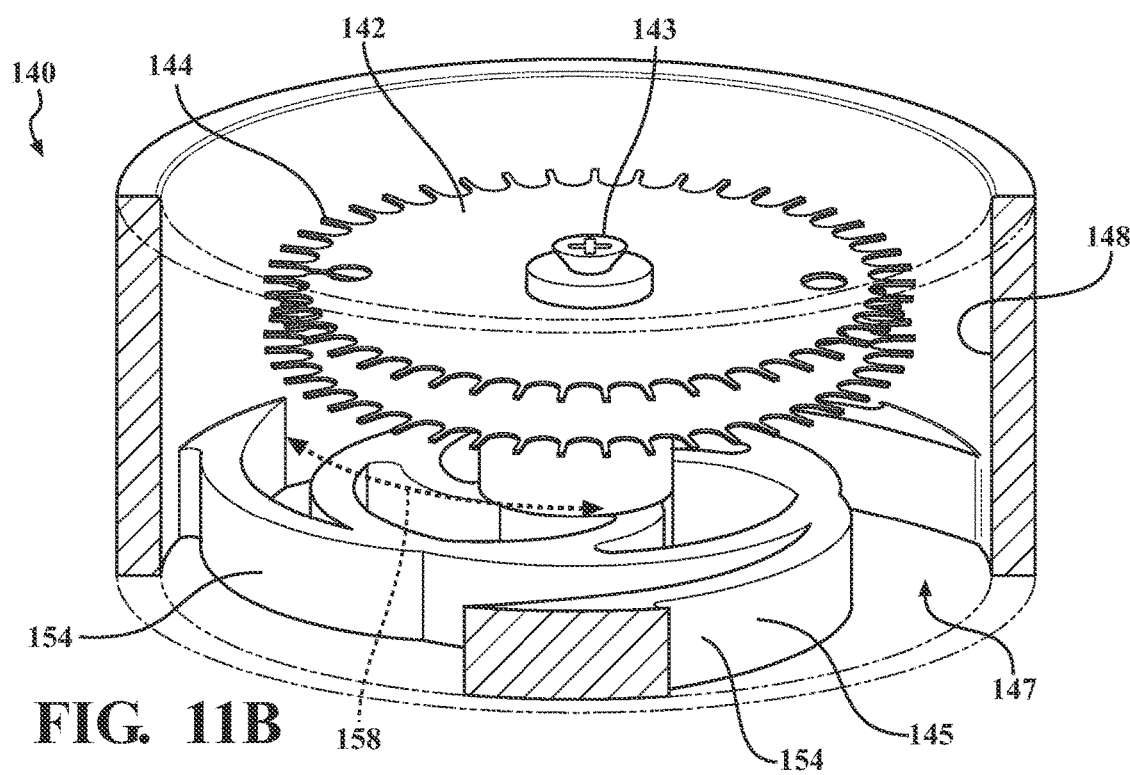
FIG. 11B is a partial cross-sectional view of the plasma reactor shown in FIG. 11A.
Figure 11C:
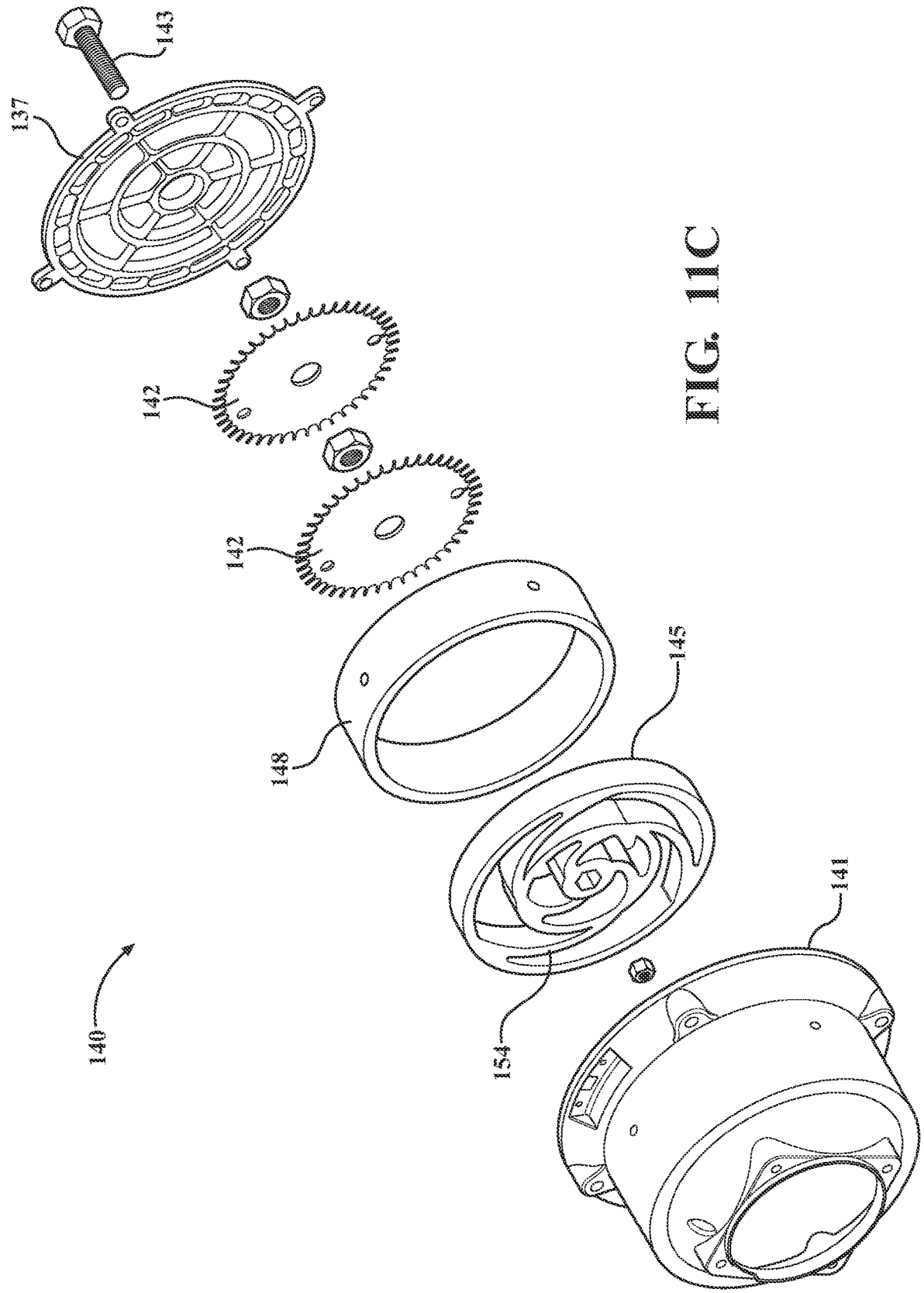
FIG. 11C is an exploded view of the plasma reactor shown in FIG. 11A.

As shown in FIGS. 11A-C, in one or more embodiments, the plasma reactor 140 may include a plasma reactor housing 141, a discharge electrode assembly 142 that includes one or more discharge electrode pins 144 in an array 146, and a baffling 145. The array 146 may be arranged in a radial pattern and electrically configured to receive one or more voltage pulses. In the illustrated example, the array 146 includes pins extending radially from the entire perimeter of a circular discharge electrode assembly 142. Although depicted in a radial pattern, it should be appreciated that other orientations and shapes may be used, such as rectilinear. In one or more embodiments, the air purifier 100 may include UV lamps, electrical reactors, or the like in addition to—or instead of—the plasma reactor 140. Element 136 in FIG. 7 represents a UV lamp, electrical reactor, or the like. The light or reactor may be disposed in various locations suitable for treating airflow through the air purifier, and would be connected to the power supply and control to allow operation The plasma reactor 140 may further include a counter electrode 148 positioned outward from the one or more discharge electrode pins 144. In one or more embodiments, the counter electrode 148 may be formed from graphite (carbon), platinum, gold, rhodium, other materials known to be inert electrodes, and combinations of the above.

In embodiments, the discharge electrode assembly 142 may be surrounded by the counter electrode 148 and may be separated from the counter electrode 148 by a discharge gap 149, thereby defining a flow passage 147. Baffling 145 may electrically isolate the discharge electrode assembly 142 and permit the smooth flow of ambient air through the flow passage 147.

Baffling 145 separates the discharge electrode assembly 142 from the counter electrode 148. As depicted in FIG. 11B, the counter electrode 148 may be stacked upon baffling 145 such that their outer circumferences are aligned. As shown in FIG. 11C, the baffling 145 may be used to secure the discharge electrode assembly 142 to the plasma reactor 140 by a fastener 143, such as a screw, bolt or the like. The fastener 143 may also be configured to secure a top plate 137 to the plasma reactor 140. The baffling 145 may be made from plastic or other insulative material. As depicted, the baffling 145 includes three curved, radially extending arms 154, but may include any number of curved, radially extending arms. The radially extending arms 154 may have an equivalent linear length 158 sized to prevent conduction between the discharge electrode assembly 142 and the counter electrode 148 through the baffling 145.

The insulation material and the linear length 158 of the baffling 145 may be chosen to accommodate the voltage provided to the plasma reactor 140. In one embodiment, the plasma reactor 140 may operate at 8 kilovolts (kV), the linear length 158 of the insulative material may be from 65 mm to 70 mm, and the discharge gap 149 may be about 6 mm. The plasma reactor voltage, the linear length 158, and the discharge gap 149 may all be varied to permit the intended function of the plasma reactor 140. For example, the operating voltage of the plasma reactor 140 may range from 1 kV to 20 kV, the linear length 158 may be from 10 mm to 200 mm, and the discharge gap 149 may be from 1 mm to 20 mm.

In embodiments, the plasma reactor 140 of the air purifier 100 may include a plurality of layers of arrays 146, each of which may include the one or more discharge electrode pins 144. While two layers of arrays 146 are shown in FIGS. 11A-C, it is contemplated that any number of layers of arrays 146 may be included in the plasma reactor 140.

As shown in FIG. 22, a layer gap 151 may separate each of the layers of arrays 146. The layer gap 151, in embodiments, may be from 1 millimeter (mm) to 10 mm, such as from 1.5 mm to 10 mm, from 2 mm to 10 mm, from 2.5 mm to 10 mm, from 3 mm to 10 mm, from 3.5 mm to 10 mm, from 4 mm to 10 mm, from 4.5 mm to 10 mm, from 1 mm to 9.5 mm, from 1 mm to 9 mm, from 1 mm to 8.5 mm, from 1 mm to 8 mm, from 1 mm to 7.5 mm, from 1 mm to 7 mm, from 1 mm to 6.5 mm, from 1 mm to 6 mm, from 1 mm to 5.5 mm, from 1 mm to 5 mm, from 1.5 mm to 9.5 mm, from 2 mm to 9 mm, from 2.5 mm to 8.5 mm, from 3 mm to 8 mm, from 3.5 mm to 7.5 mm, from 4 mm to 7 mm, or from 4.5 mm to 5.5 mm. In embodiments, multiple layer gaps 151 and 153 may separate the plurality of layers of arrays 146. The multiple layer gaps 151 and 153 may be equally spaced from one another or may be variably spaced from one another, using any of the previously-described ranges.

Referring now to FIG. 21, in embodiments, the one or more discharge electrode pins 144 may each include an ignition tip 155. Each ignition tip 155 may be defined by an angle and positioned at a terminus of the discharge electrode pin 144 proximal to the counter electrode 148. In embodiments, a counter electrode gap 149 may separate the counter electrode 148 from each ignition tip 155 of the one or more discharge electrode pins 144. In embodiments, the counter electrode gap 149 may be from 0.25 millimeters (mm) to 10.5 mm, such as from 0.5 mm to 10 mm, from 1 mm to 9.5 mm, from 1.5 mm to 9 mm, from 2 mm to 8.5 mm, from 2.5 mm to 8 mm, from 3 mm to 7.5 mm, from 3.5 mm to 7 mm, or from 4 mm to 7 mm.

Referring still to FIG. 21, in one or more embodiments, an ignition tip gap 159 may separate each ignition tip 155 of the one or more discharge electrode pins 144. In embodiments, the ignition tip gap 159 may be from 0.25 millimeters (mm) to 10 mm, such as from 0.5 mm to 9 mm, from 1 mm to 8 mm, from 1.5 mm to 7 mm, from 2 mm to 6 mm, from 2.5 mm to 5.5 mm, or from 2.5 mm to 5 mm.

A more detailed description of the plasma reactor 140 may be found in PCT Application No. PCT/US2017/050087, published as WO 2018/045378, which is incorporated herein by reference in its entirety. Without being bound by theory, it is believed that the reaction products generated by the plasma reactor 140 may induce cold plasma in the flow passage 147. Cold plasma treatment may purify the ambient air through at least three different methods: (1) physical destruction of contaminants present in the ambient air; (2) programmed death of bacteria present in the ambient air; and (3) cluster formation. Cluster formation is a function of imparting an electric charge to contaminants present in the ambient air through cold plasma treatment. Contaminants that are too small to be filtered, even through nanofiltration, may be drawn to one another through opposite electric charges. The contaminants in the ambient air may thus agglomerated through contact with the plasma reactor 140 as a reaction product to a size where clusters may be removed from the ambient air through a neutralizing trap and/or a particulate filter, both of which are described in detail below.

In one or more embodiments, the plasma reactor 140 may produce ultraviolet (UV) light for contact with the ambient air, the purified gas stream, or both. For example, light source 136 may produce UV light for contact with the ambient air. In embodiments, the UV light may have a wavelength of from 10 nanometers (nm) to 400 nm, such as from 10 nm to 390 nm, from 10 nm to 380 nm, from 10 nm to 370 nm, from 10 nm to 360 nm, from 10 nm to 350 nm, from 10 nm to 340 nm, from 10 nm to 330 nm, from 10 nm to 320 nm, from 10 nm to 310 nm, from 10 nm to 300 nm, from 20 nm to 400 nm, from 30 nm to 400 nm, from 40 nm to 400 nm, from 50 nm to 400 nm, from 60 nm to 400 nm, from 70 nm to 400 nm, from 80 nm to 400 nm, from 90 nm to 400 nm, from 100 nm to 400 nm, from 110 nm to 400 nm, from 120 nm to 400 nm, from 130 nm to 400 nm, from 140 nm to 400 nm, from 150 nm to 400 nm, from 160 nm to 400 nm, from 170 nm to 400 nm, from 180 nm to 400 nm, from 190 nm to 400 nm, from 200 nm to 400 nm, from 20 nm to 380 nm, from 30 nm to 370 nm, from 40 nm to 360 nm, from 50 nm to 350 nm, from 60 nm to 340 nm, from 70 nm to 330 nm, from 80 nm to 320 nm, from 90 nm to 310 nm, or from 100 nm to 300 nm. Without being bound by theory, it is believed that the production of UV light may further destroy any contaminants present in the ambient air, thereby producing a more decontaminated purified gas stream.

Titanium dioxide may be applied to any plasma-facing surfaces of the plasma reactor 140, including the discharge electrode assembly 142 and the counter electrode 148, to interact with moisture and UV light. Applied in such fashion, it is believed that contaminants may be destroyed through a photoelectrochemical oxidation (PECO) process when contacted with the UV light. Optionally, the titanium dioxide may be embedded into the counter electrode material 148. Titanium dioxide may also be formed via oxidation of electrode material if the electrodes are formed from any titanium material. In some embodiments, the titanium dioxide coating may be applied by a plasma vapor deposition process.

In one or more embodiments, the air purifier 100 may include light piping (not shown), which can transmit light produced by the plasma reactor 140 to an exterior portion of the air purifier 100. The lighting may serve as a visual indication to a user that the plasma reactor 140 is engaged. The light piping may include a cut-off filter to prevent the user from contacting any unfiltered UV light.

Referring again to FIGS. 1-5, the main body 130 of the air purifier 100 may include (e.g., house) at least the plasma reactor 140. In one or more embodiments, the main body 130 of the air purifier 100 may also include a neutralizing trap 160, as shown in FIGS. 6A-8. In some embodiments, the neutralizing trap 160 may be absent. In embodiments that include the neutralizing trap 160, the neutralizing trap 160 may be configured to neutralize at least a portion of the one or more reaction products generated by the plasma reactor 140, thereby producing a purified gas stream. In other words, the neutralizing trap 160 may neutralize at least a portion of the submicron particles present in the ambient air (e.g., as contaminants) that have been contacted with the one or more reaction products produced by the plasma reactor 140, thereby removing the submicron particles from the ambient air and producing the purified gas stream.

Regardless of the exact embodiment of the plasma reactor 140 selected for inclusion in the air purifier 100, it is believed that the majority of purification of the ambient air occurs in the plasma reactor 140. As shown in FIGS. 23 and 24, the net log reduction of viable MS2 Bacteriophage bioaerosol and viable A. Niger bioaerosol of ambient air contacted with the plasma reactor 140 is 4.33 and 3.80, respectively. These results mean that the plasma reactor 140, alone, may be capable of reducing the amount of bacteria present in the ambient air stream by at least 99.9%.

As shown in FIGS. 6A-8, the neutralizing trap 160 may be fluidly coupled to the plasma reactor 140. The neutralizing trap 160 may be formed from any suitable material capable of sequestering and neutralizing the charged submicron particles produced by the plasma reactor 140. In one or more embodiments, the neutralizing trap may include activated carbon, a metal oxide catalyst, graphene or a graphene derivative, redox active organic polymers, or any combination thereof. Illustrative examples of materials that may be used in a neutralizing trap may be found in Valgimigli, et al., *J. Mater. Chem. B,* 2018; 6:2036-2051. As used herein, the term "activated carbon" may include any porous carbon material, such as a char that has been subjected to reaction with gases. In embodiments, the activated carbon may include additional compounds, such as zinc chloride, that may increase its adsorptive properties. Moreover, as used herein, the term "metal oxide catalyst" may include an oxide of a metal in any of its oxidation states, or combinations of such metal oxides. In embodiments, the metal oxide catalyst may include additional compounds, such as one or more metal chlorides, which may increase the adsorptive properties of the metal oxide catalyst. In one or more embodiments, the neutralizing trap 160 may further include ceramic fibers or glass fibers in order to increase the mechanical strength of the neutralizing trap 160.

In embodiments, the metal oxide catalyst may include one or more oxides of lanthanide metals and/or metals found in IUPAC Groups 3-12 of the Periodic Table, such as IUPAC Groups 7-11 of the Periodic Table. In one or more embodiments, the metal oxide may include one or more oxides of manganese, copper, nickel, silver, iron, and cerium. In certain embodiments, the metal oxide may include one or more oxides of cerium or manganese, such as $MnO$, $Mn_3O_4$, $Mn_2O_3$, $MnO_2$, $MnO_3$, $Mn_2O_7$, or combinations thereof. In addition to—or instead of—the previously described embodiments of metal oxides that may be used to form the neutralizing trap 140, the metal oxide catalyst may further include one or more of colloidal platinum and colloidal palladium.

Referring now to embodiments of neutralizing traps shown in FIGS. 6A-B and 13A-B, the neutralizing trap 160 may be a monolithic superstructure. The monolithic superstructure may be formed primarily from glass fibers or particulates, ceramic fibers or particulates, metals, or a combination thereof. In one or more embodiments, the monolithic superstructure may be coated with the activated carbon, the metal oxide catalyst, or both.

In one or more embodiments, the neutralizing trap 160 may include a plurality of layers (e.g., one layer to 10 layers) between each of its ends 162 and 164. In some embodiments, two or more of the layers within the plurality of layers of the neutralizing trap 160 may have a different composition from each other. Each of the layers may include activated carbon, the metal oxide catalyst, or both embedded within each of the layers of the neutralizing trap 160 at varying amounts, such as the neutralizing trap shown in FIG. 30. Each of the layers may also include ceramic fibers or glass fibers in order to increase the mechanical strength of one or more of the layers of a multi-layer neutralizing trap.

In embodiments, each of the plurality of layers of the neutralizing trap 160 may have a substantially similar volumetric size to one or more of the other of the plurality of layers. However, in other embodiments, each of the plurality of layers of the neutralizing trap 160 may have different volumetric sizes when compared to one or more of the other of the plurality of layers. Without being bound by theory, it is believed that a neutralizing trap 160 having a plurality of layers having different compositions from each other may increase the lifetime of the air purifier 100, the mass of reaction products removed from the purified air stream, or both, depending on the temperature and/or humidity conditions of the ambient air.

While not shown in the Figures, in one or more embodiments, the neutralizing trap 160 may include a first layer, a second layer, a third layer, a fourth layer, and a fifth layer. In such five-layer embodiments of the neutralizing trap 160, the first layer may include greater than 90 wt. % activated carbon, based on the total weight of the first layer, such as greater than 91 wt. % activated carbon, 92 wt. % activated carbon, 93 wt. % activated carbon, 94 wt. % activated carbon, 95 wt. % activated carbon, 96 wt. % activated carbon, 97 wt. % activated carbon, 98 wt. % activated carbon, or 99 wt. % activated carbon, all of which are based on the total weight of the first layer.

Still referring to the five layer embodiments of the neutralizing trap 160, the second layer may include from 60 wt. % to 90 wt. % activated carbon, based on the total weight of the second layer, such as from 62 wt. % to 88 wt. % activated carbon, from 64 wt. % to 86 wt. % activated carbon, from 65 wt. % to 85 wt. % activated carbon, from 66 wt. % to 84 wt. % activated carbon, from 68 wt. % to 82 wt. % activated carbon, or from 70 wt. % to 80 wt. % activated carbon, all of which are based on the total weight of the second layer. Likewise, the second layer may include from 10 wt. % to 40 wt. % of the metal oxide catalyst, based on the total weight of the second layer, such as from 12 wt. % to 38 wt. % activated carbon, from 14 wt. % to 36 wt. % activated carbon, from 15 wt. % to 35 wt. % activated carbon, from 16 wt. % to 34 wt. % activated carbon, from 18 wt. % to 32 wt. % activated carbon, or from 20 wt. % to 30 wt. % activated carbon, all of which are based on the total weight of the second layer.

Still referring to the five layer embodiments of the neutralizing trap 160, the third layer may include from 40 wt. % to 60 wt. % activated carbon, based on the total weight of the third layer, such as from 41 wt. % to 59 wt. % activated carbon, from 42 wt. % to 58 wt. % activated carbon, from 43 wt. % to 57 wt. % activated carbon, from 44 wt. % to 56 wt. % activated carbon, or from 45 wt. % to 55 wt. % activated carbon, all of which are based on the total weight of the third layer. Likewise, the third layer may include from 40 wt. % to 60 wt. % of the metal oxide catalyst, based on the total weight of the third layer, such as from 41 wt. % to 59 wt. % of the metal oxide catalyst, from 42 wt. % to 58 wt. % of the metal oxide catalyst, from 43 wt. % to 57 wt. % of the metal oxide catalyst, from 44 wt. % to 56 wt. % of the metal oxide catalyst, or from 45 wt. % to 55 wt. % of the metal oxide catalyst, all of which are based on the total weight of the third layer.

Still referring to the five layer embodiments of the neutralizing trap 160, the fourth layer may include from 10 wt. % to 40 wt. % activated carbon, based on the total weight of the third layer, such as from 12 wt. % to 38 wt. % activated carbon, from 14 wt. % to 36 wt. % activated carbon, from 15 wt. % to 35 wt. % activated carbon, from 16 wt. % to 34 wt. % activated carbon, from 18 wt. % to 32 wt. % activated carbon, or from 20 wt. % to 30 wt. % activated carbon, all of which are based on the total weight of the fourth layer. Likewise, the fourth layer may include from 60 wt. % to 90 wt. % of the metal oxide catalyst, based on the total weight of the fourth layer, such as from 62 wt. % to 88 wt. % of the metal oxide catalyst, from 64 wt. % to 86 wt. % of the metal oxide catalyst, from 65 wt. % to 85 wt. % of the metal oxide catalyst, from 66 wt. % to 84 wt. % of the metal oxide catalyst, from 68 wt. % to 82 wt. % of the metal oxide catalyst, or from 70 wt. % to 80 wt. % of the metal oxide catalyst, all of which are based on the total weight of the fourth layer.

Still referring to the five layer embodiments of the neutralizing trap 160, the fifth layer may include greater than 90 wt. % of the metal oxide catalyst, based on the total weight of the first layer, such as greater than 91 wt. % of the metal oxide catalyst, 92 wt. % of the metal oxide catalyst, 93 wt. % of the metal oxide catalyst, 94 wt. % of the metal oxide catalyst, 95 wt. % of the metal oxide catalyst, 96 wt. % of the metal oxide catalyst, 97 wt. % of the metal oxide catalyst, 98 wt. % of the metal oxide catalyst, or 99 wt. % of the metal oxide catalyst, all of which are based on the total weight of the fifth layer.

In other embodiments, the neutralizing trap 160, may include a first layer, a second layer, and a third layer. In such three layer embodiments of the neutralizing trap 160, the first layer may include greater than 90 wt. % activated carbon, based on the total weight of the first layer, such as greater than 91 wt. % activated carbon, 92 wt. % activated carbon, 93 wt. % activated carbon, 94 wt. % activated carbon, 95 wt. % activated carbon, 96 wt. % activated carbon, 97 wt. % activated carbon, 98 wt. % activated carbon, or 99 wt. % activated carbon, all of which are based on the total weight of the first layer.

Still referring to the three layer embodiments of the neutralizing trap 160, the second layer may include from 10 wt. % to 90 wt. % activated carbon, based on the total weight of the third layer, such as from 15 wt. % to 85 wt. % activated carbon, from 20 wt. % to 80 wt. % activated carbon, from 25 wt. % to 75 wt. % activated carbon, from 30 wt. % to 70 wt. % activated carbon, from 35 wt. % to 65 wt. % activated carbon, or from 40 wt. % to 60 wt. % activated carbon, all of which are based on the total weight of the second layer. Likewise, the second layer may include from 10 wt. % to 90 wt. % of the metal oxide catalyst, based on the total weight of the fourth layer, such as from 15 wt. % to 85 wt. % of the metal oxide catalyst, from 20 wt. % to 80 wt. % of the metal oxide catalyst, from 25 wt. % to 75 wt. % of the metal oxide catalyst, from 30 wt. % to 70 wt. % of the metal oxide catalyst, from 35 wt. % to 65 wt. % of the metal oxide catalyst, or from 40 wt. % to 60 wt. % of the metal oxide catalyst, all of which are based on the total weight of the fourth layer.

Still referring to the three layer embodiments of the neutralizing trap 160, the third layer may include greater than 90 wt. % of the metal oxide catalyst, based on the total weight of the first layer, such as greater than 91 wt. % of the metal oxide catalyst, 92 wt. % of the metal oxide catalyst, 93 wt. % of the metal oxide catalyst, 94 wt. % of the metal oxide catalyst, 95 wt. % of the metal oxide catalyst, 96 wt. % of the metal oxide catalyst, 97 wt. % of the metal oxide catalyst, 98 wt. % of the metal oxide catalyst, or 99 wt. % of the metal oxide catalyst, all of which are based on the total weight of the third layer.

Regardless of the exact embodiment of a multi-layer neutralizing trap selected, each of the plurality of layers of the neutralizing trap 160, in embodiments, may have a different cell density than one or more of the other layers present in the neutralizing trap 160. Without being bound by theory, it is believed that varying the cell density from one layer to the next layer of a multi-layer neutralizing trap may create a tortuous path for the ambient air, thus increasing the interaction time of the ambient air with the neutralizing trap 160. A more tortuous path may allow for more sequestering and neutralizing of the one or more reaction products present in the ambient air, thereby producing a more decontaminated purified gas stream.

Now referring to FIG. 30, it is further contemplated that the neutralizing trap 160 may include a gradient of the metal oxide catalyst and the activated carbon. In other words, the neutralizing trap 160 may include a spatial distribution of activated carbon and the metal oxide catalyst, such that the ratio of the metal oxide catalyst to the activated carbon is varied gradually from a first end 162 to a second end 164 of the neutralizing trap 160. FIG. 30 represents the neutralizing trap which may be formed from a continuous body or with discrete layers. The labels on the left and right side indicate exemplary portions of activated carbon (AC) and metal oxide catalyst (MOx) in an example where the relative portions vary linearly. The curved provided in the body of the trap 160 represent other possible distributions, including a stepwise distribution which may represent discrete layers. Without being bound by theory, it is believed that a spatial distribution may increase reaction product removal efficiency across a wide range of operating conditions—from low temperatures and low humidity conditions, where activated carbon may perform better, to high temperature and high humidity conditions, where the metal oxide catalyst may perform better.

Figure 13A:
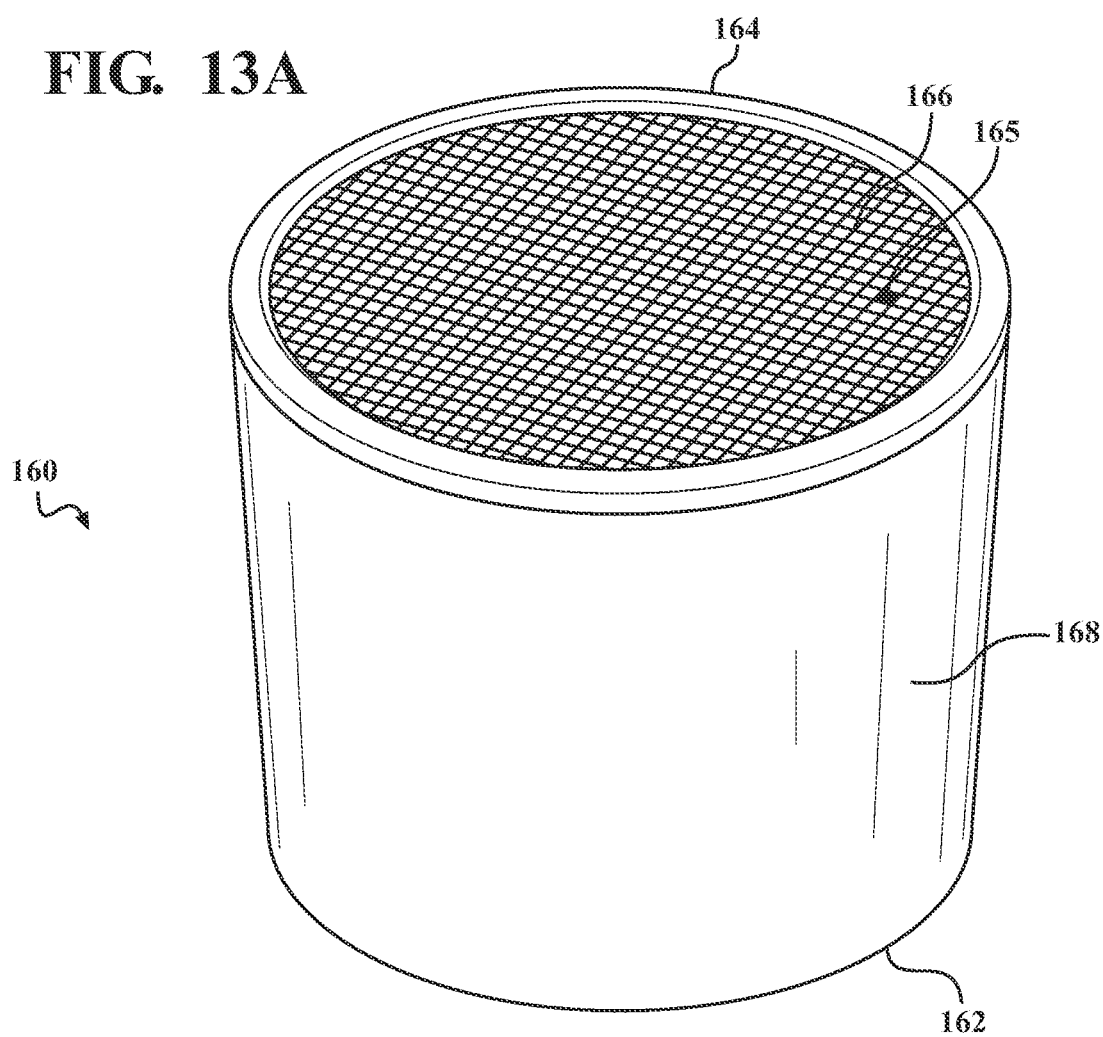
FIG. 13A is an illustration of a neutralizing trap that may be included in an air purifier, according to one or more embodiments presently presented.
Figure 13B:
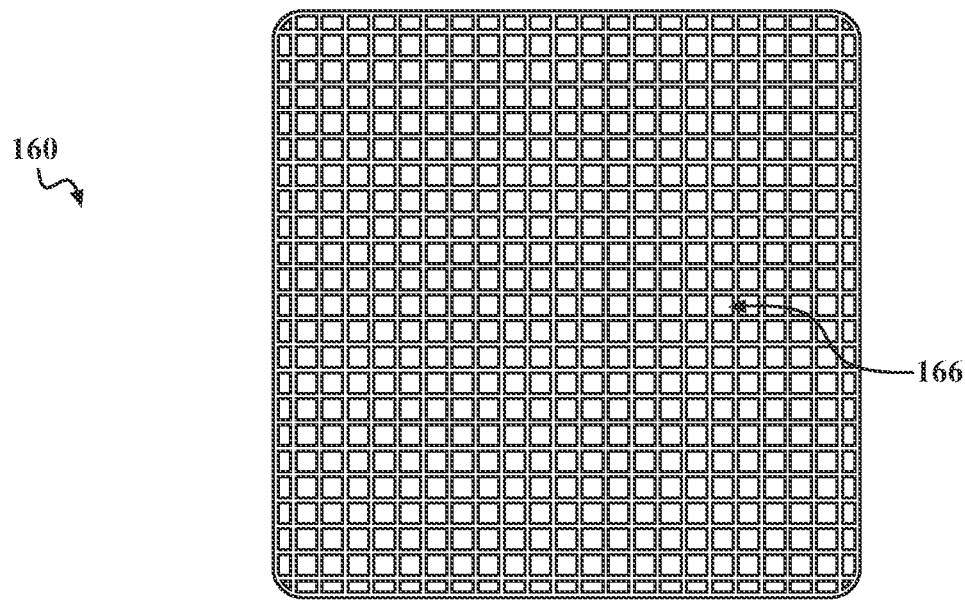
FIG. 13B is an alternative illustration of a neutralizing trap that may be included in an air purifier, according to one or more embodiments presently presented.

Referring now to FIGS. 13A-B, the neutralizing trap 160 may include channels 166 extending between the first end 162 and the second end 164, through which the purified gas stream travels before it is expelled from the air purifier 100. As shown in FIGS. 13A-B, the channels 166 may be square in cross-section and arranged in a grid of square openings. However, it is contemplated that the channels 166 may have any suitable shaped cross-section, or combination of shaped cross-sections, that allows the purified gas stream to travel through the neutralizing trap 160. Suitable cross-section shapes for the channels 166 may include circular, honeycomb, rectangular, or the like.

While the channels 166 may allow the purified gas stream to travel freely through the neutralizing trap 160, and by extension, the air purifier 100, the outer boundary 168, in embodiments, may be formed from a material to prevent any of the purified gas stream from escaping out the sides. In one or more embodiments, the outer boundary 168 of the neutralizing trap 160 may be formed from foam, cardboard, urethanes, resins, or combinations thereof. In embodiments, the channels 166 may be formed from different materials than used to form the outer boundary 168 of the neutralizing trap 160. In embodiments, an exit end of the neutralizing trap 160 may be equipped with a sensor, schematically represented at 165, to measure the reaction product removal efficacy of the neutralizing trap 160. Optionally, the sensor may be placed at the outlet 170 of the air purifier 100. In some embodiments, the sensor indicates the extent of the exposure via a color change. In certain embodiments, the sensor may detect the extent of the exposure via current or voltage output, which can be amplified and read by electronic circuits known in the art. In one or more embodiments, the sensor may display a light (e.g., green) to indicate safe operation. In embodiments, the sensor may display a light (e.g., red) to indicate unsafe operation. The sensor may further—or instead—emit an audible sound when unsafe operational conditions are reached. In embodiments, the sensor may send a signal to the user via wireless communication. In one or more embodiments, the sensor may send a signal to the control system to shut off the operation of the air purifier.

In embodiments, the neutralizing trap may include metal structures to increase the mechanical strength of the neutralizing trap. In embodiments, the neutralizing trap may be constructed to hold a plurality of pellets of activated carbon and/or metal oxide catalyst with the flow of gas passing though the plurality of pellets. The ratio of carbon to metal oxide may be in accordance with any of the other embodiments discussed herein and the transition from one material to the other may be similar to any of the embodiments. The pellets may have any shape, including but not limited to spherical, cylindrical, ring-shaped, ellipsoidal, rough-shaped or a combination of shapes. A plurality of pellets may be provided in combination with any of the other embodiments of neutralizing trap disclosed herein. As a non-limiting example, the trap may have a plurality of layers, some of which are a mesh material and some of which are pellets.

Referring again to FIGS. 23 and 24, the net log reduction of viable MS2 Bacteriophage bioaerosol and viable *A. Niger* bioaerosol of ambient air contacted with an air purifier that includes the plasma reactor 140, the neutralizing trap 160, and a particulate filter 180 (discussed herein below) are 5.74 and 4.23, respectively. These results mean that the plasma reactor 140, the neutralizing trap 160, and the particulate filter 180, working in combination with one another, are capable of reducing the amount of bacteria present in the ambient air stream by at least 99.99%, thereby forming the purified gas stream.

Figure 14:
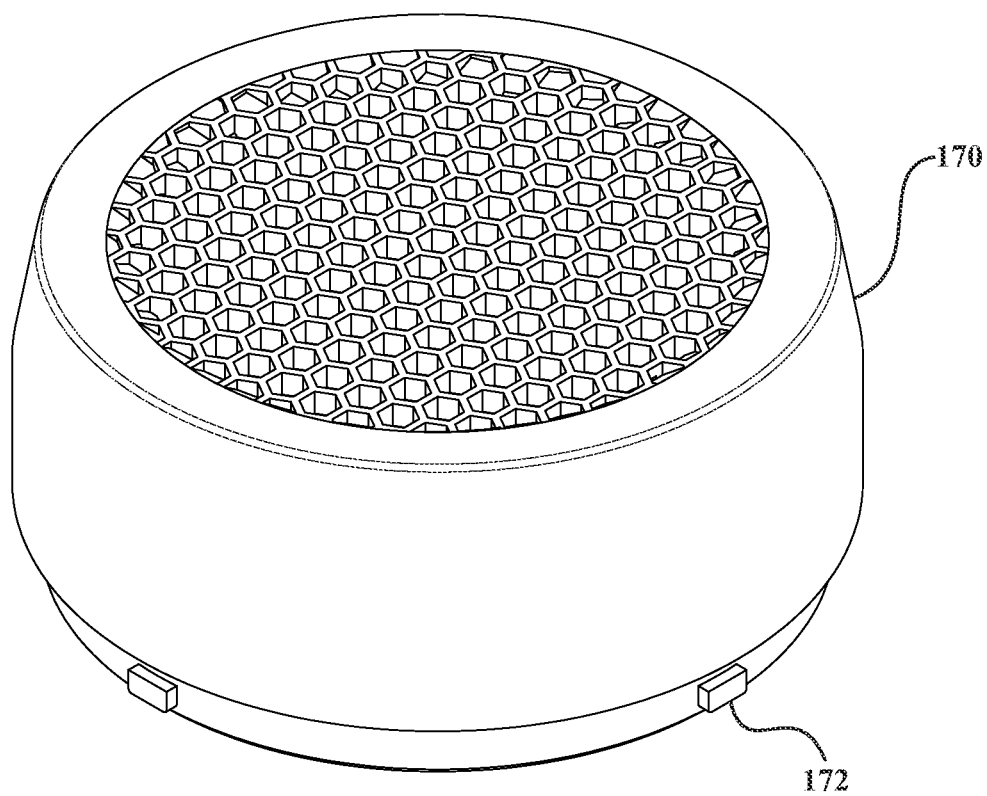
FIG. 14 is an illustration of a particulate filter that may be included in an air purifier, according to one or more embodiments presently presented.

As shown in FIGS. 6A-8 and 14, once the ambient air has traveled through the neutralizing trap 160 to create a purified gas stream, the purified gas stream may then be expelled from a purified gas outlet 170. In embodiments, the purified gas outlet 170 may be positioned proximal to the second end 134 of the main body 130. As shown in detail in FIG. 14, the purified gas outlet 170 may have a substantially cylindrical shape, in order to fit within the air purifier 100 shown in FIGS. 1-5. However, the purified gas outlet 170 may have any suitable shape in order to fit within additional embodiments of the air purifier disclosed herein. Moreover as shown in FIG. 14, the purified gas outlet 170 include honeycomb-shaped openings. However, it is contemplated that the purified gas outlet 170 may include any suitable shape, or combination of shapes, that allows the purified gas stream to be expelled from the air purifier 100. Suitable shapes for the purified gas outlet 170 may include circular openings, grid-shaped openings, rectangular openings, or the like. In one or more embodiments, the purified gas outlet 170 may include securing nodules 172 configured to fit into securing channels 171 (see FIG. 1) and secure the purified gas outlet 170 to the main body 130 of the air purifier 100.

Figure 6B:
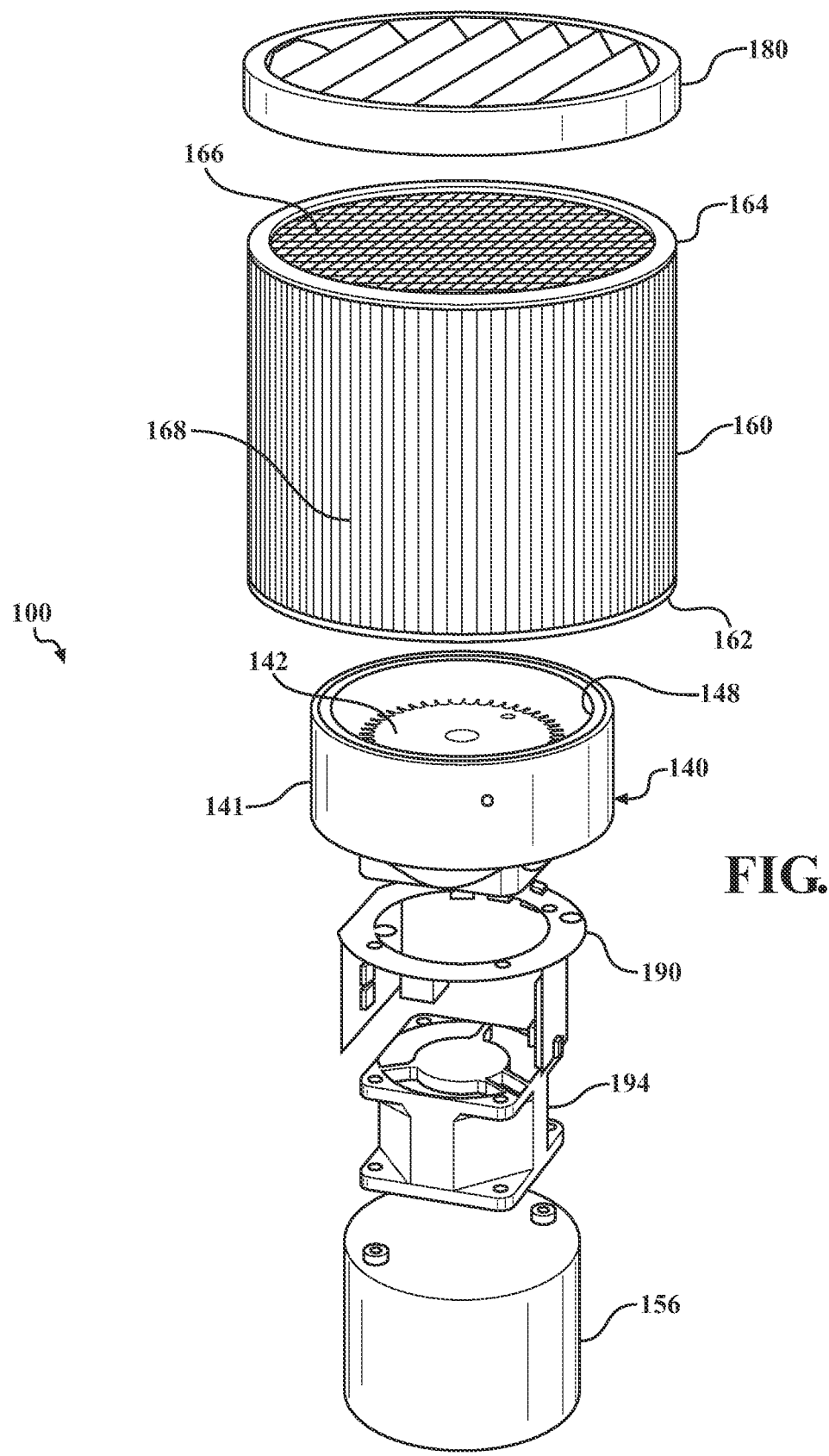
FIG. 6B is a schematic view illustrating some of the components of an air purifier, according to one or more embodiments presently presented.
Figure 15:
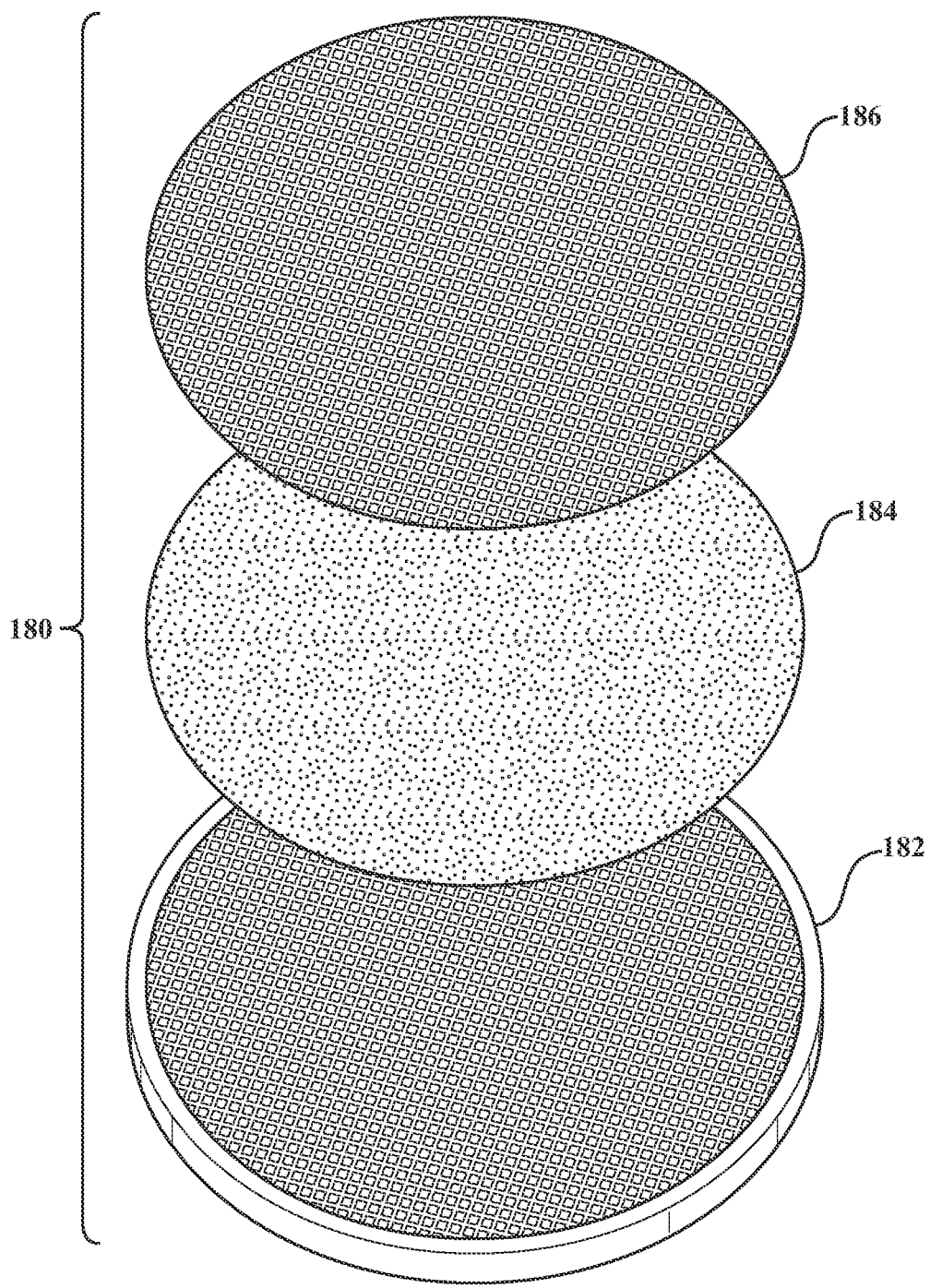
FIG. 15 is an illustration of various components of a particulate filter that may be included in an air purifier, according to one or more embodiments presently presented.
Figure 16:
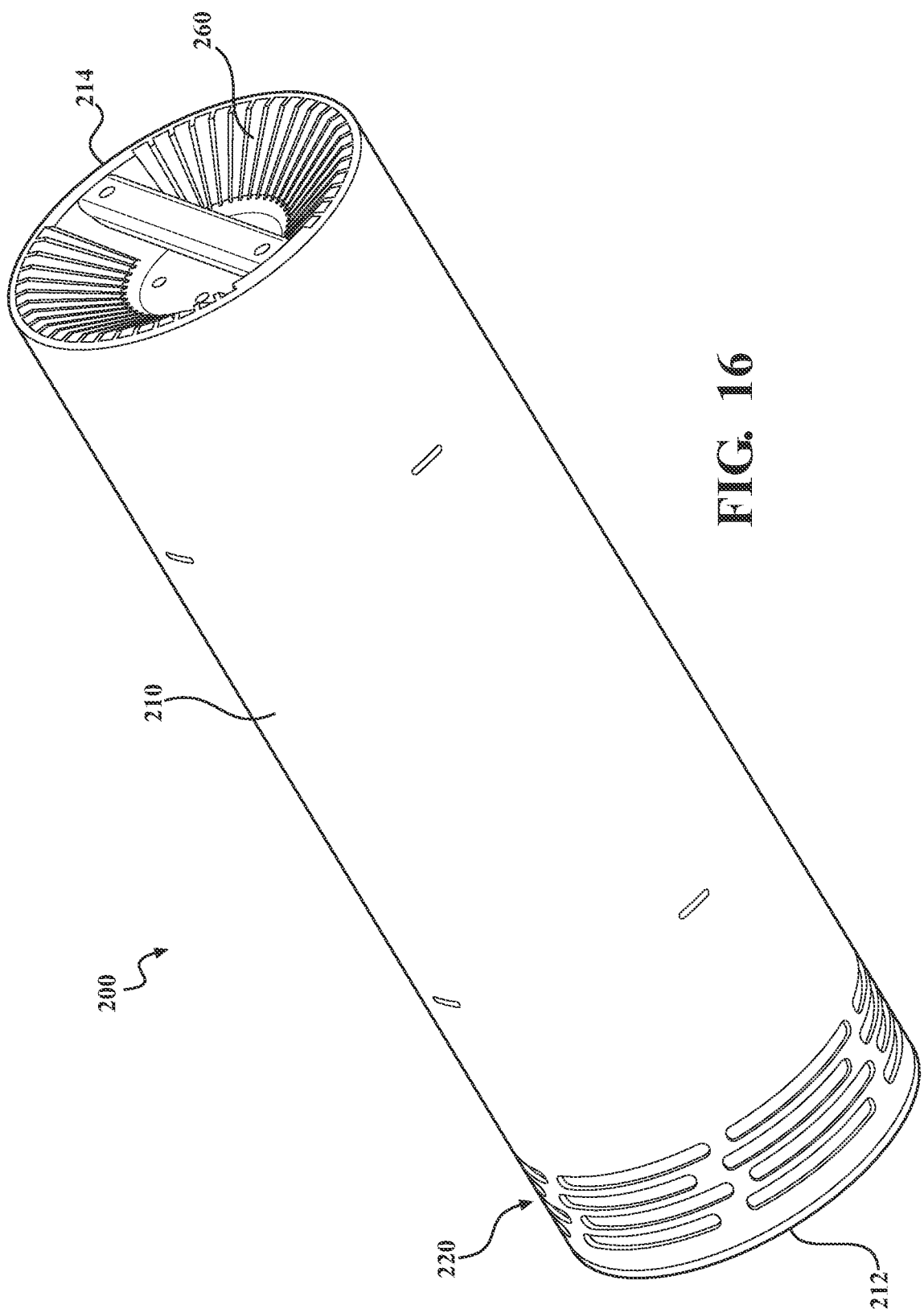
FIG. 16 is an illustration of an alternative air purifier, according to one or more embodiments presently presented.

Referring now to FIG. 6B, 7 and FIG. 15, the air purifier 100 may further include a particulate filter 180. In embodiments, the particulate filter 180 may be fluidly coupled to the purified gas outlet 170 and configured to further reduce the number of particulates present in the purified gas stream. As shown in FIG. 6B, the particulate filter 180 may be pleated to reduce air resistance and increase surface area. As shown in FIG. 15, the particulate filter 180 may include a separation screen 182, a micron filter 184, and a securing screen 186. Each of the components of the particulate filter 180 may be fluidly coupled to the purified gas outlet 170. In one or more embodiments, the separation screen 182 of the particulate filter 180 may be directly coupled to the purified gas outlet 170 and the micron filter 184 may be directly coupled to the separation screen 182. The securing screen 186 may also be directly coupled to the micron filter 184, such that it secures the micron filter 184 between the particulate filter 180 and the securing screen 186. In embodiments, the separation screen 182 and the securing screen 186 may be made from wire mesh, or similar suitable materials capable of allowing the purified gas stream to flow freely. In one or more embodiments, the micron filter may include a plurality of perforations, optionally when each perforation may be from 2 microns to 6 microns. Without being bound by theory, it is believed that the particulate filter 180 may function to remove any relatively large particulates due to agglomeration that remain in the purified gas stream.

In one or more embodiments, the air purifier may include a base 150, which may be removably connected to the first end 132 of the air purifier 100 in order to allow for the base 150 to be easily removed from the main body 130 of the air purifier 100. As shown in FIG. 4, the base 150 may include a plurality of openings 152, which may align with the plurality of openings 120 of the ambient air intake 110. In embodiments, the plurality of openings 152 may include a screen 121, instead of or in addition to a screen covering the plurality of openings 120, as previously described. Still referring to FIG. 4, the base 150 may include an extension cover 161, which may be configured to cover a power source 156, which may be configured to supply the air purifier 100, and any of its components described herein, with power.

Figure 10:
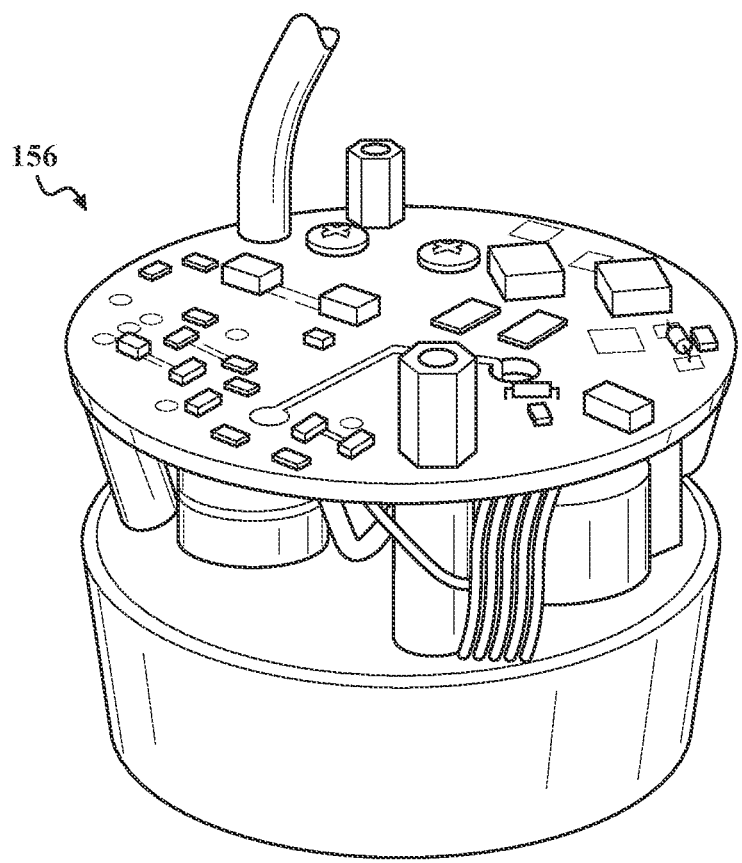
FIG. 10 is an illustration of a power supply that may be included in an air purifier, according to one or more embodiments presently presented.

Referring now to FIGS. 6A and 10, the power source 156, which may include any of the state of the art power sources typically found in such a technology device, and may be coupled (e.g., electronically coupled) to a control unit 190 that may include a printed circuit board 192. The power source 156 may be positioned proximal to the first end 132 of the main body 130 of the air purifier. In embodiments, the power source 156 may be configured to alternate the air purifier 100, and optionally the plasma reactor 140, between a powered state and an unpowered state. In other words, the air purifier 100, as an entire unit, may be in a powered state, while the plasma reactor 140 is in an unpowered state.

The power source 156 may include a transformer (FIG. 10) capable of converting an electric voltage typically supplied by a motor vehicle or electric vehicle (e.g., 6 watts/12 volts) to an electric voltage capable of powering the plasma reactor 140 (e.g., 8 kV). Without being bound by theory, it is believed the transformer of the power source 156 may overcome various obstacles associated with the load pulled by the plasma reactor 140, size constraints of the air purifier 100, and circuit topology of the power source 156.

In embodiments, the controller 190 may also direct power supplied by the power source 156 to a fan 194 (or a plurality of fans), which may be fluidly coupled to the ambient air intake 110 and/or the plasma reactor 140. In one or more embodiments, the fan 194 may be configured to increase an air flow rate of the ambient air introduced to the plasma reactor 140, the neutralizing trap 160, or both by the ambient air intake 110. In embodiments, regardless of whether the fan 194 is (a) present in the air purifier 100 or (b) in a powered state, the air flow rate of ambient air traveling through the air purifier 100 may be from 5 cubic meters per hour ($m^3/hr$) to 40 $m^3/hr$, such as from 10 $m^3/hr$ to 35 $m^3/hr$, from 10 $m^3/hr$ to 30 $m^3/hr$, from 15 $m^3/hr$ to 30 $m^3/hr$, or from 20 $m^3/hr$ to 30 $m^3/hr$.

Figure 12:
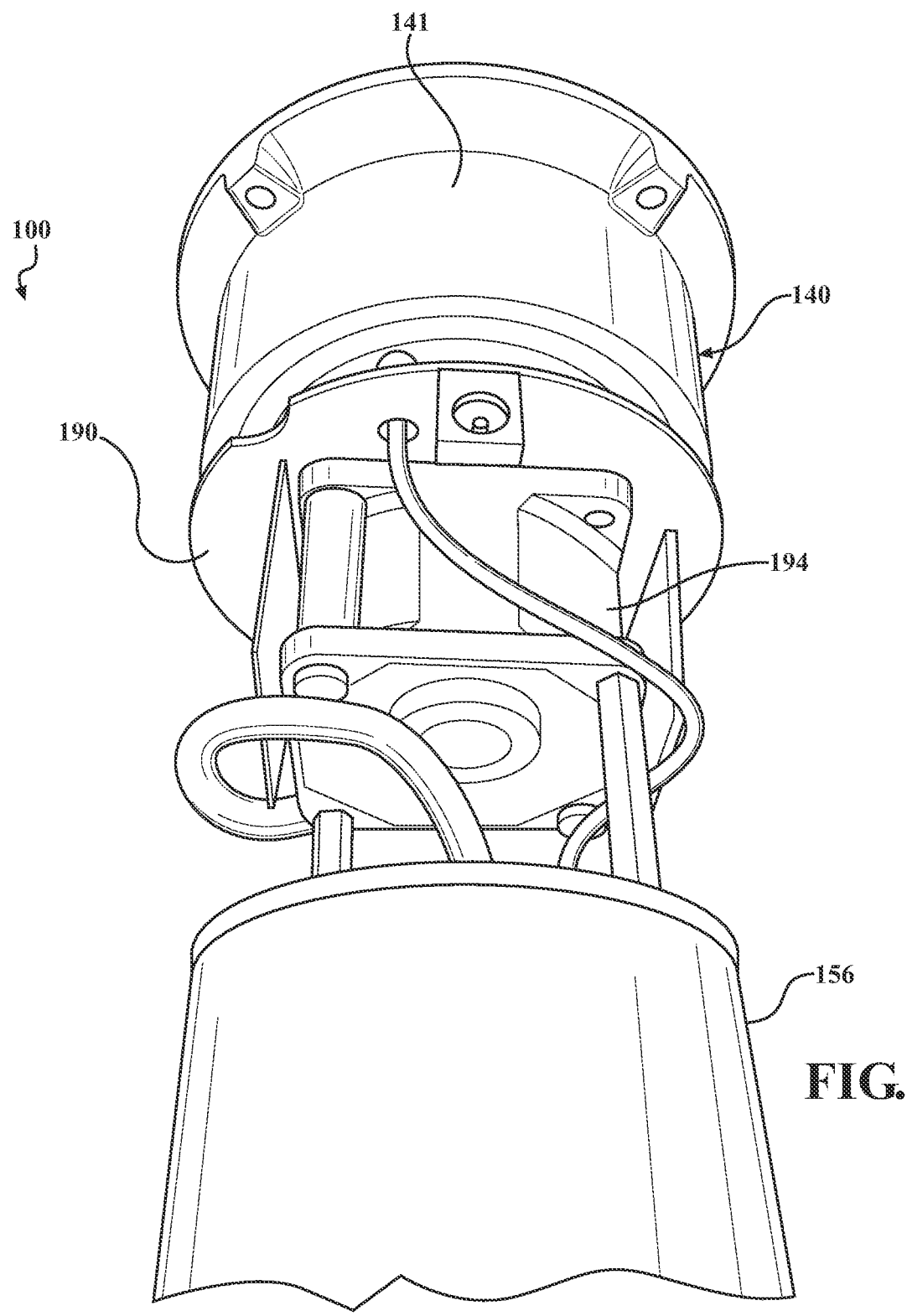
FIG. 12 is an illustration of various components of an air purifier, according to one or more embodiments presently presented.

The fan 194, in other words, may be optionally included and/or in a powered state to increase the flow rate of the ambient air into the plasma reactor 140 of the air purifier 100. In one or more embodiments, sound-insulating material (not shown) may be placed proximal to the fan 194 and/or the power source 156 in order to damp and/or absorb the noise generated by the fan 194. Moreover, connectors (not shown) with a noise-damping feature may also be included between all mechanical mounts for any of the components of the air purifier 100 described herein. FIG. 12 shows one configuration of the fan 194, plasma generator 140 and power source 156.

Referring again to the control unit 190, the control unit 190 may be configured to execute a process in which the plasma reactor 140 is alternated between a powered state and an unpowered state, while keeping the fan 194 in a powered state. For example, the control unit 190 may maintain the plasma reactor 140 in the powered state for three consecutive minutes and then in the unpowered state for one minute intervals. Any other time lengths and ratios for maintaining any of the components of the air purifier 100 in the powered state and the unpowered state are contemplated herein without constraint. Without being bound by theory, the life of the neutralizing trap 160 may be extended by alternating the plasma reactor 140, or other components, between the powered state and the unpowered state. The life of the neutralizing trap 160 is the time before the neutralizing trap 160 is recommended to be replaced or regenerated.

The control unit 190, in embodiments, may also be configured to address and process fault detection and damage mitigation, thereby providing a command to the power source 156 to change every component of the air purifier 100 into the unpowered state, optionally a reboot, and/or optionally disabling the air purifier 100 until it has been repaired. The fault detection capable of being sensed by the control 190 may include, but is not limited to: (1) arc-plasma streamers that reach between electrode pins 144 and the counter electrode 148 that cause low voltage electrical breakdown of gases with ion emission and a high current discharge; (2) sparks-debris that may enter the plasma reactor 140 that cause a high voltage electrical breakdown of gases with strong ionization and low current discharge between electrode pins 144 and the counter electrode 148; (3) over-voltage-protect against applying electrical potential above the upper limit of normal circuit operation; (4) shorting-identifying when the discharge electrode assembly 142 and the counter electrode 148 have connected; (5) open circuit-identifying when any of the components of the plasma reactor 140 have become disabled or not properly installed; and (6) reverse polarity-protect against applying reverse polarity.

Figure 3:
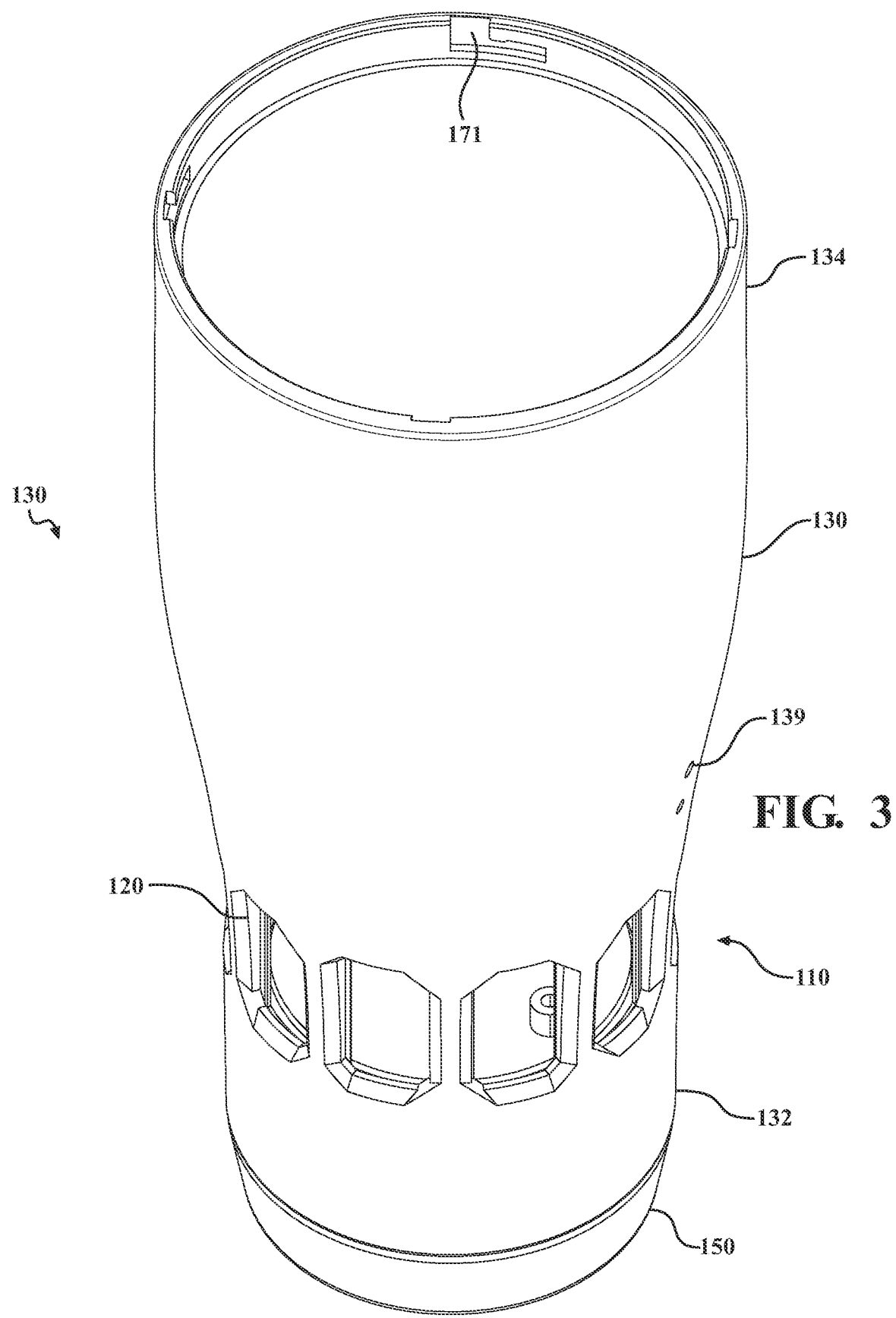
FIG. 3 is an illustration of an air purifier, according to one or more embodiments presently presented.

Referring again to FIGS. 1, 2, 4, and 5 the power source 156 may also be coupled to a user input device 138. The user input device 138 may be a button, dial, knob, switch, or the like capable of putting the air purifier 100, or any of its components, into the powered state or the unpowered state. As shown in FIG. 3, one or more alerts 139 may also be provided on any external surface of the main body 130 of the air purifier 100. The one or more alerts 139 may include a light, such as a light-emitting diode, which may indicate that the air purifier 100, or any of its components, is in the powered state. The one or more alerts 139 may display as different colors (e.g., green, red, blue, etc.) depending on which components are in the powered state and/or if the air purifier 100 may be in need of maintenance.

In one or more embodiments, the purified gas stream produced by the air purifier 100 may have a humidity of greater than 10%, such as greater than 15%, greater than 20%, greater than 25%, greater than 30%, greater than 35%, greater than 40%, greater than 45%, greater than 50%, greater than 55%, greater than 60%, greater than 65%, greater than 70%, greater than 75%, greater than 80%, greater than 85%, greater than 90%, or greater than 95%. While not shown in the Figures, the air purifier 100 may include a humidifying component, which may be fluidly coupled to any of the components of the air purifier 100, to achieve the increased humidity range.

Likewise, the purified gas stream produced by the air purifier 100 may have a humidity of less than 10%, such as less than 15%, less than 20%, less than 25%, less than 30%, less than 35%, less than 40%, less than 45%, less than 50%, less than 55%, less than 60%, less than 65%, less than 70%, less than 75%, less than 80%, less than 85%, less than 90%, or less than 95%. While not shown in the Figures, the air purifier 100 may include a dehumidifying component, which may be fluidly coupled to any of the components of the air purifier 100, to achieve the decreased humidity range.

Referring now to FIGS. 16-19, an alternative embodiment of an air purifier 200 is shown. It should be appreciated to one skilled in the art that any of the previously-described features, embodiments, and benefits regarding the air purifier 100 may also be shared or used in embodiments regarding the air purifier 200. It should be understood that air purifier 200 may be larger than air purifier 100, and, thus, may be preferable to use in larger spaces, such as a room, house, or office space.

As shown in FIGS. 16-19, the air purifier 200 may include a main body 210 that includes a first end 212 and a second end 214 that is opposite of the first end 212. The air purifier 200 may further include an ambient air intake 220, which may be positioned proximal to the first end 212 of the main body 210. The ambient air intake 220 may be configured to draw ambient air into the air purifier 200.

Figure 19A:
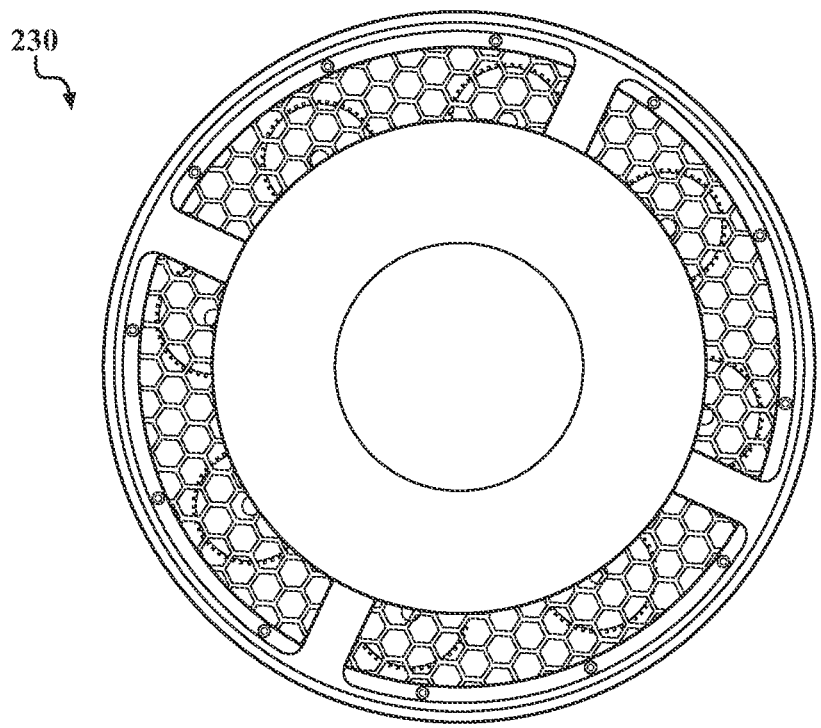
FIG. 19A is an illustration of a plasma reactor, according to one or more embodiments presently presented.
Figure 19B:
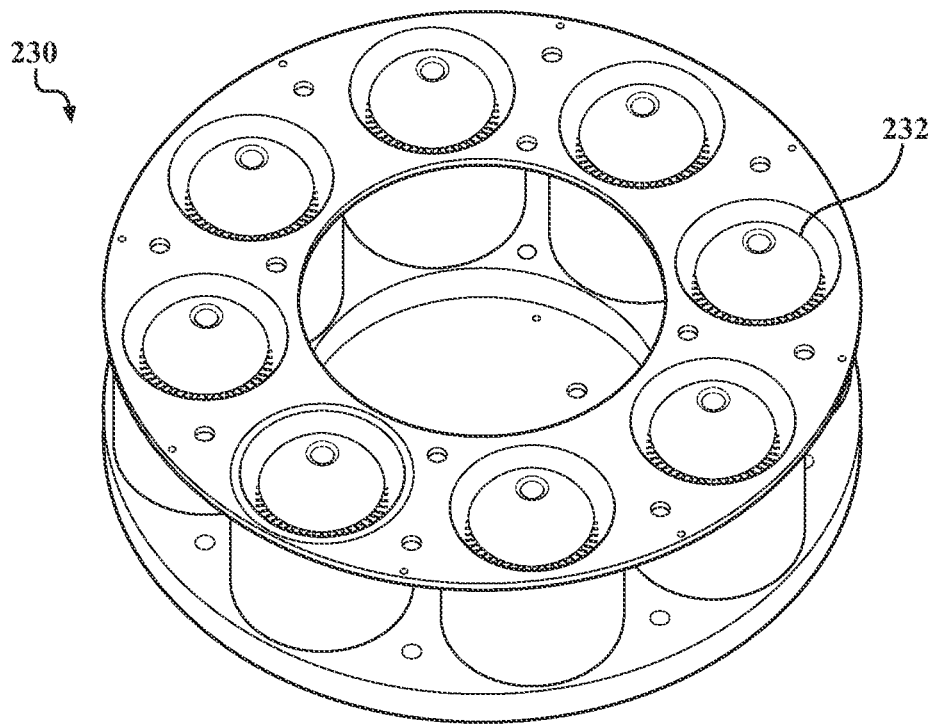
FIG. 19B is an illustration of the plasma reactor of FIG. 19A shown from a different perspective.

As shown in FIGS. 19A-B, the air purifier 200 may include a plasma reactor 230 that may include a plurality of discharge electrode assemblies 232. The plasma reactor 230 may be configured to generate one or more reaction products from the ambient air. In the illustrated example, the plasma reactor 230 has eight discharge electrode assemblies 232 disposed generally in a ring with the central axes of the assemblies being generally parallel to each other. Each discharge electrode assembly may be constructed similarly to the discharge electrode assembly 142 in FIGS. 11A and 11B with the fastener defining the axis. Other constructions will be discussed herein below. The plasma reactor 230 may be positioned between the first end 212 of the main body and the second end 214 of the main body.

Figure 17A:
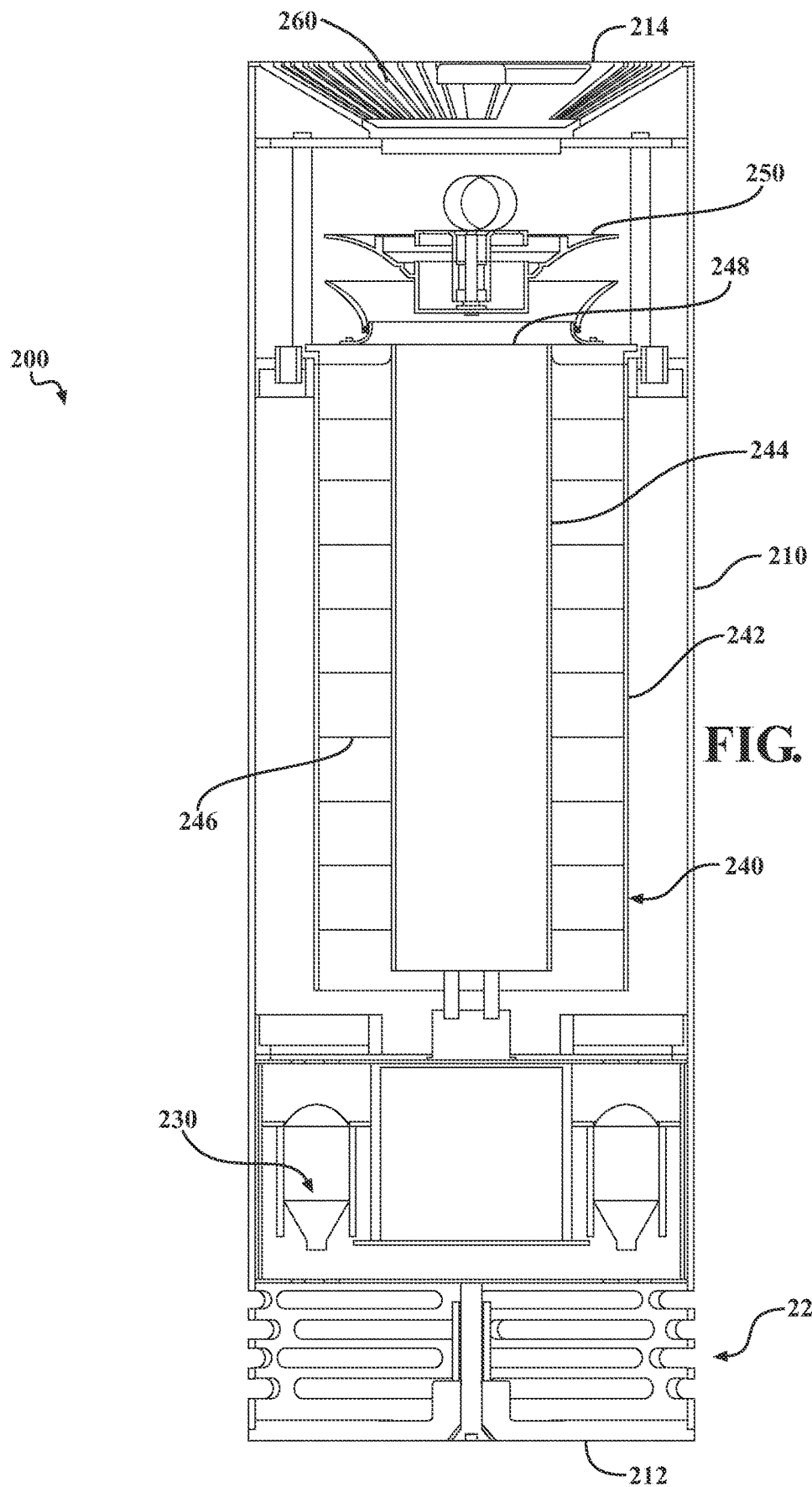
FIG. 17A is a cross-sectional view of the air purifier shown in FIG. 16.

As shown in FIGS. 17A, B, D and 18, the air purifier 200 may also include a neutralizing trap 240 configured to neutralize at least a portion of the one or more reaction products generated by the plasma reactor 230, thereby producing a purified gas stream to be expelled from the air purifier 200. It should be noted that each of the components in the air purifier 200 may be fluidly coupled to one another. For example, the ambient air intake 220 may be fluidly coupled to the plasma reactor 230, the plasma reactor 230 may be coupled to the neutralizing trap 240, and the neutralizing trap 240 may be fluidly coupled to a purified gas outlet 260.

Figure 17B:
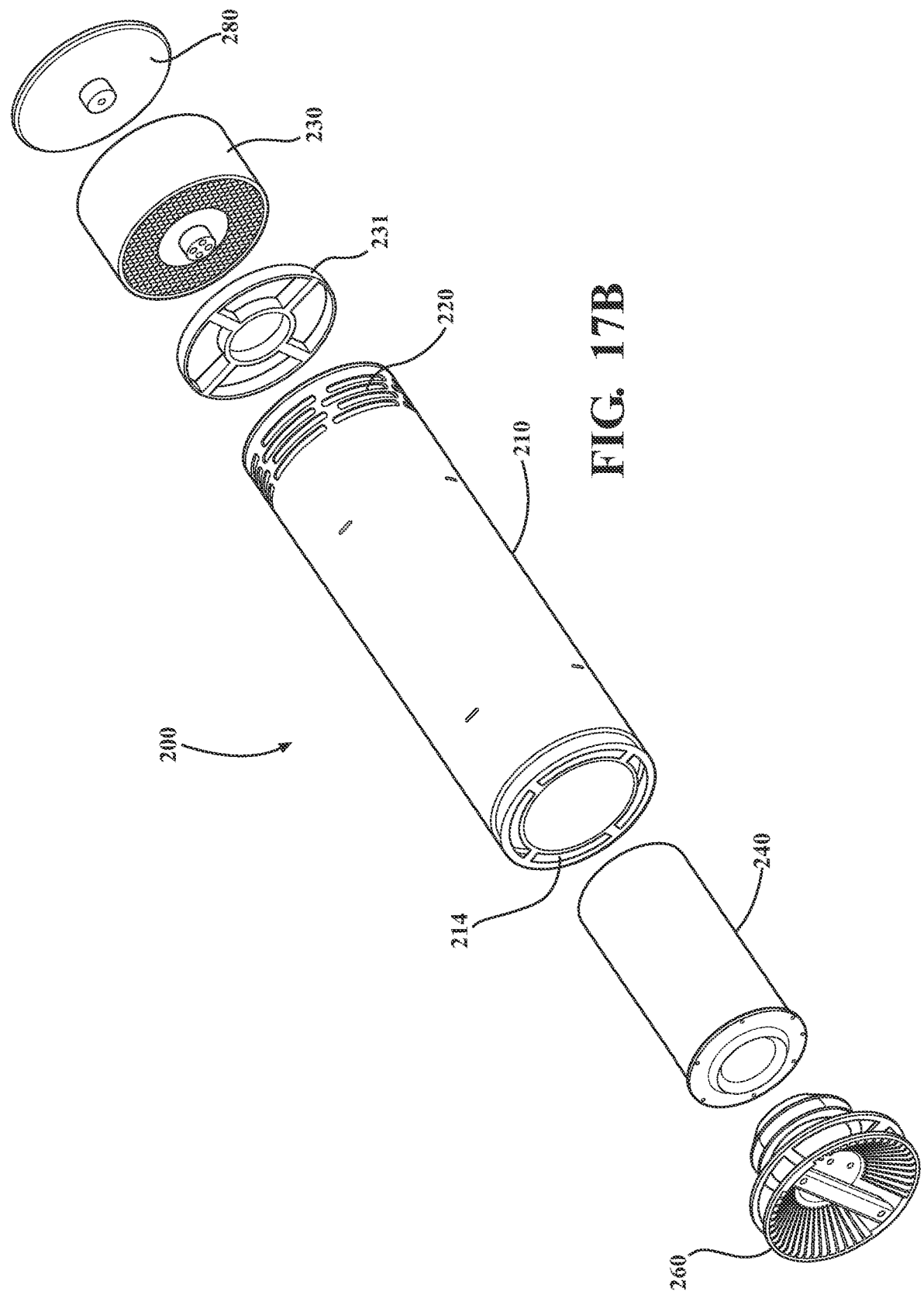
FIG. 17B is an exploded view illustrating some of the components of the air purifier shown in FIG. 16.

As shown in FIG. 17B, the air purifier 200 may optionally include plasma reactor spacer 231, which may be configured to position the plasma reactor 230 within the main body 210. The air purifier 200 may further optionally include a bottom enclosure 280, which may be configured to secure one or more of the components of the air purifier 200 within the main body 210 and further to prevent any unwanted intrusion into the main body 210 of the air purifier 200.

As shown in FIG. 17A, in embodiments, the air purifier 200 may include a fan 250, which may be fluidly coupled to at least the neutralizing trap 240. The fan may be positioned proximal to the second end 214 of the main body 210. In one or more embodiments, the fan may not be included within the main body 210 of the air purifier 200. Instead, the fan may be external to the air purifier 200 so long as it is positioned so as to pass air through the air purifier 200 and fluidly coupled at least to the ambient air intake 220 or the purified gas outlet 260. In some embodiments, the air purifier 200 may include one or more fans, external to air purifier 200, within the main body 210 of the air purifier 200, or both. In some embodiments that include a plurality of fans, each of the plurality of discharge electrode assemblies 232 may be fluidly coupled to one or more of the plurality of fans. Regardless of the embodiments selected, it is contemplated that the one or more fans present in the air purifier 200 may be configured to increase an air flow rate of the ambient air introduced to the plasma reactor 230, the neutralizing trap 240, or both, from the ambient air intake 220. The one or more fans, in other words, may be optionally included and/or in a powered state to increase the flow rate of the ambient air into the plasma reactor 230 of the air purifier 200.

Figure 17C:
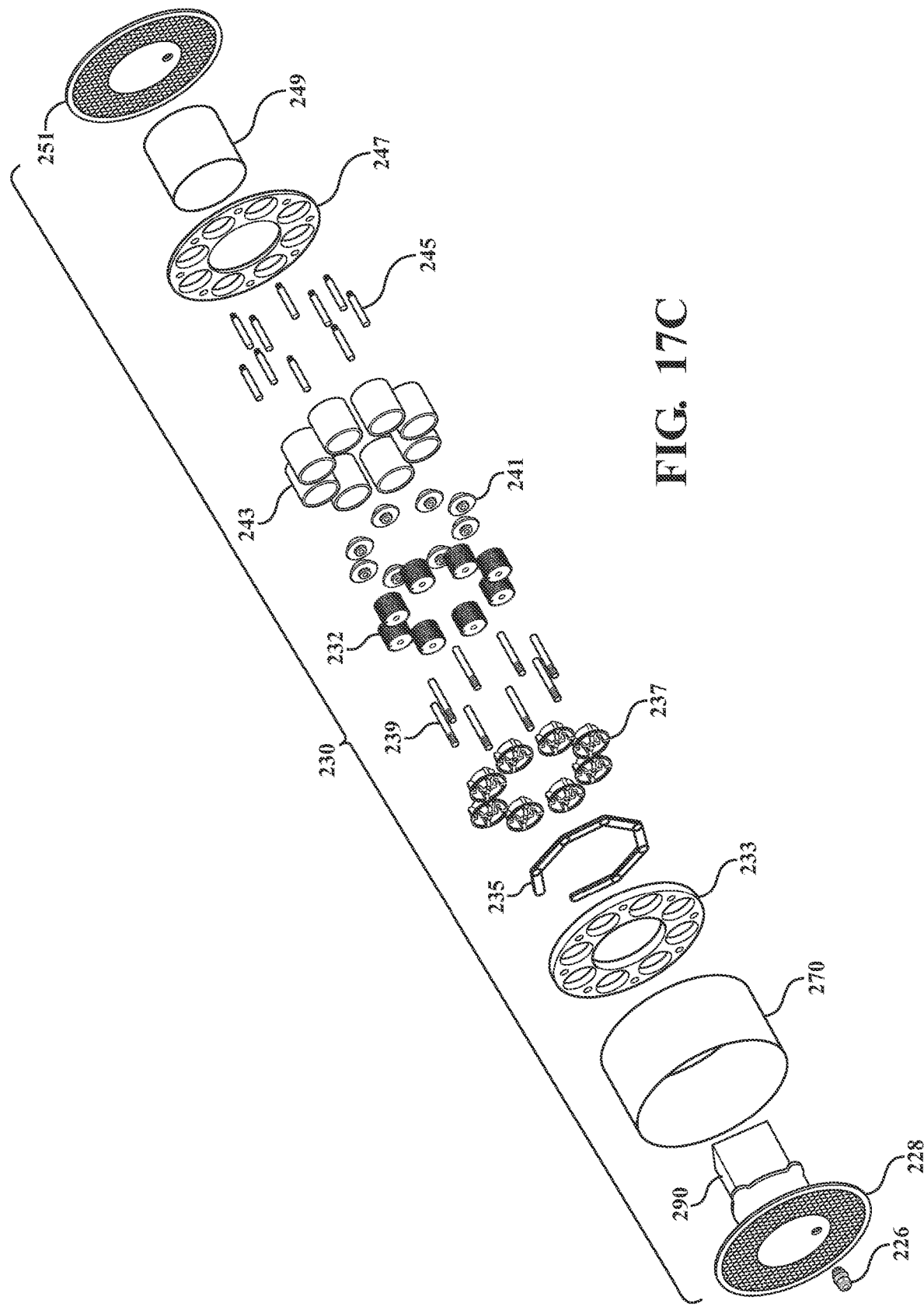
FIG. 17C is an exploded view of some of the components of the air purifier shown in FIG. 16.
Figure 17D:
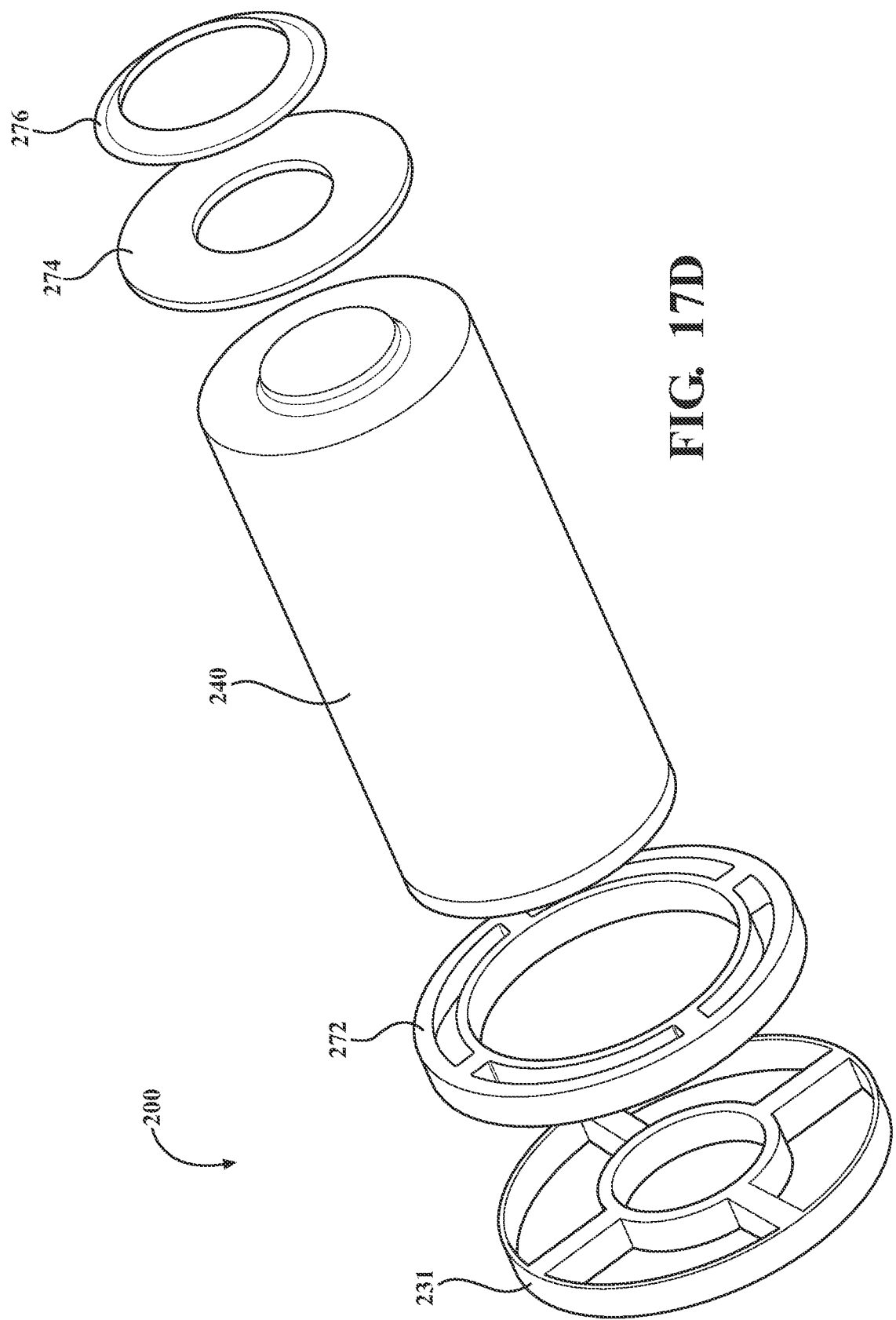
FIG. 17D is an exploded view illustrating some of the components of the air purifier shown in FIG. 16.

Referring now to FIG. 17C, the air purifier 200 may include various components such as a cable gland 226 configured to structurally maintain one or more components of the air purifier 200. The plasma reactor may have a bottom plate 228 joined to a plasma reactor housing 270 which houses the plurality of discharge electrode assemblies. A power supply 290 may be provided and be configured to supply power to one or more components of the air purifier 200. The plasma reactor may include a plasma reactor insulator plate 233, electrical contacts 235 configured to supply power from the power supply 230 to one or more components of the air purifier 200, plasma reactor heads 237, central rods 239, discharge electrode assemblies 232, plasma reactor caps 241, and counter electrodes 243, which together form the plasma reactor 230. The system may further include stand-offs 245, an electrical contact plate 247, a power supply enclosure 249, a bottom plate 251 and a top cover 238 for the plasma reactor housing 270. FIG. 17D shows other components that may be included in the air purifier 200, such as a plasma reactor holder ring 270, a filter holder ring or spacer 231, the neutralizing trap 240, a filter adapter 274; and a fan nozzle 276.

Figure 18:
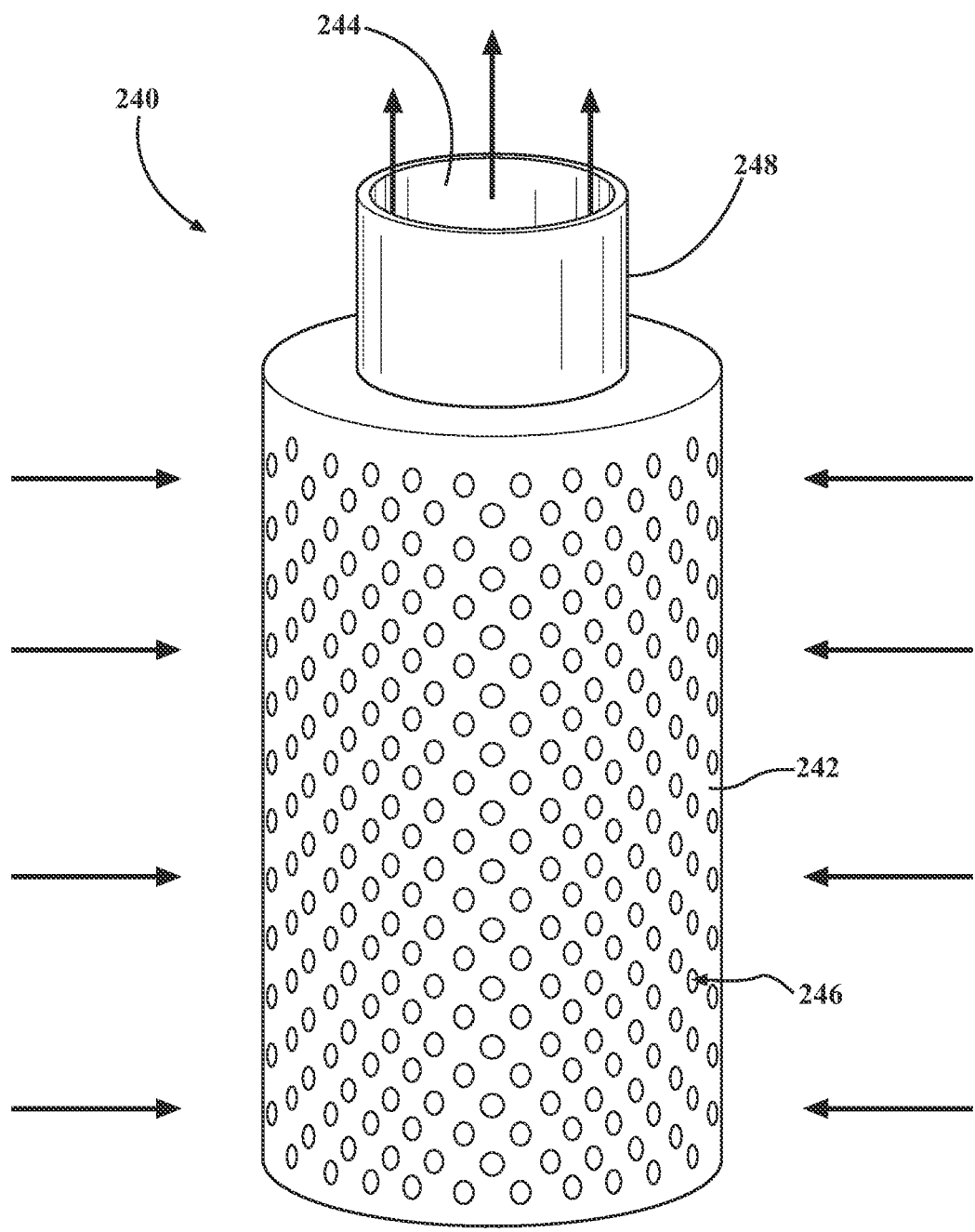
FIG. 18 is an illustration of a neutralizing trap, according to one or more embodiments presently presented.

As shown in FIG. 18, the neutralizing trap 240, which may include the composition or components of any of the previously described neutralizing traps, may include an outer surface 242 and an inner surface 244 between which run a plurality of channels 246. As ambient air enters the neutralizing trap 240 perpendicularly through the plurality of channels 246, and travels through the neutralizing trap 240 in an upward air flow direction, at least a portion of the submicron particles present in the ambient air, which have been contacted with the one or more reaction products, become sequestered and bound to the inner surface 244 before exiting the neutralizing trap through an outlet 248. Through this process, the neutralizing trap 240 may be configured to remove at least a portion of submicron particles from the ambient air in addition to re-converting one or more of the reaction products, thereby producing the purified gas stream In embodiments, regardless of whether the fan 250 (or the plurality of fans) is (a) present in the air purifier 200 or (b) in a powered state, the air flow rate of ambient air traveling through the air purifier 200 may be from 100 $m^3$/hr to 1,000 $m^3$/hr, such as from 125 $m^3$/hr to 1,000 $m^3$/hr, from 150 $m^3$/hr to 1,000 $m^3$/hr, from 175 $m^3$/hr to 1,000 $m^3$/hr, from 200 $m^3$/hr to 1,000 $m^3$/hr, from 225 $m^3$/hr to 1,000 $m^3$/hr, from 250 $m^3$/hr to 1,000 $m^3$/hr, from 275 $m^3$/hr to 1,000 $m^3$/hr, from 300 $m^3$/hr to 1,000 $m^3$/hr, from 100 $m^3$/hr to 950 $m^3$/hr from 100 $m^3$/hr to 900 $m^3$/hr from 100 $m^3$/hr to 850 $m^3$/hr from 100 $m^3$/hr to 800 $m^3$/hr, from 125 $m^3$/hr to 800 $m^3$/hr, from 150 $m^3$/hr to 800 $m^3$/hr, from 175 $m^3$/hr to 800 $m^3$/hr, from 200 $m^3$/hr to 800 $m^3$/hr, from 200 $m^3$/hr to 750 $m^3$/hr, from 200 $m^3$/hr to 700 $m^3$/hr, from 200 $m^3$/hr to 650 $m^3$/hr, from 200 $m^3$/hr to 600 $m^3$/hr, from 225 $m^3$/hr to 575 $m^3$/hr, from 250 $m^3$/hr to 550 $m^3$/hr, from 275 $m^3$/hr to 525 $m^3$/hr, from 300 $m^3$/hr to 500 $m^3$/hr, from 325 $m^3$/hr to 475 $m^3$/hr, from 350 $m^3$/hr to 450 $m^3$/hr, or from 375 $m^3$/hr to 425 $m^3$/hr.

Figure 20:
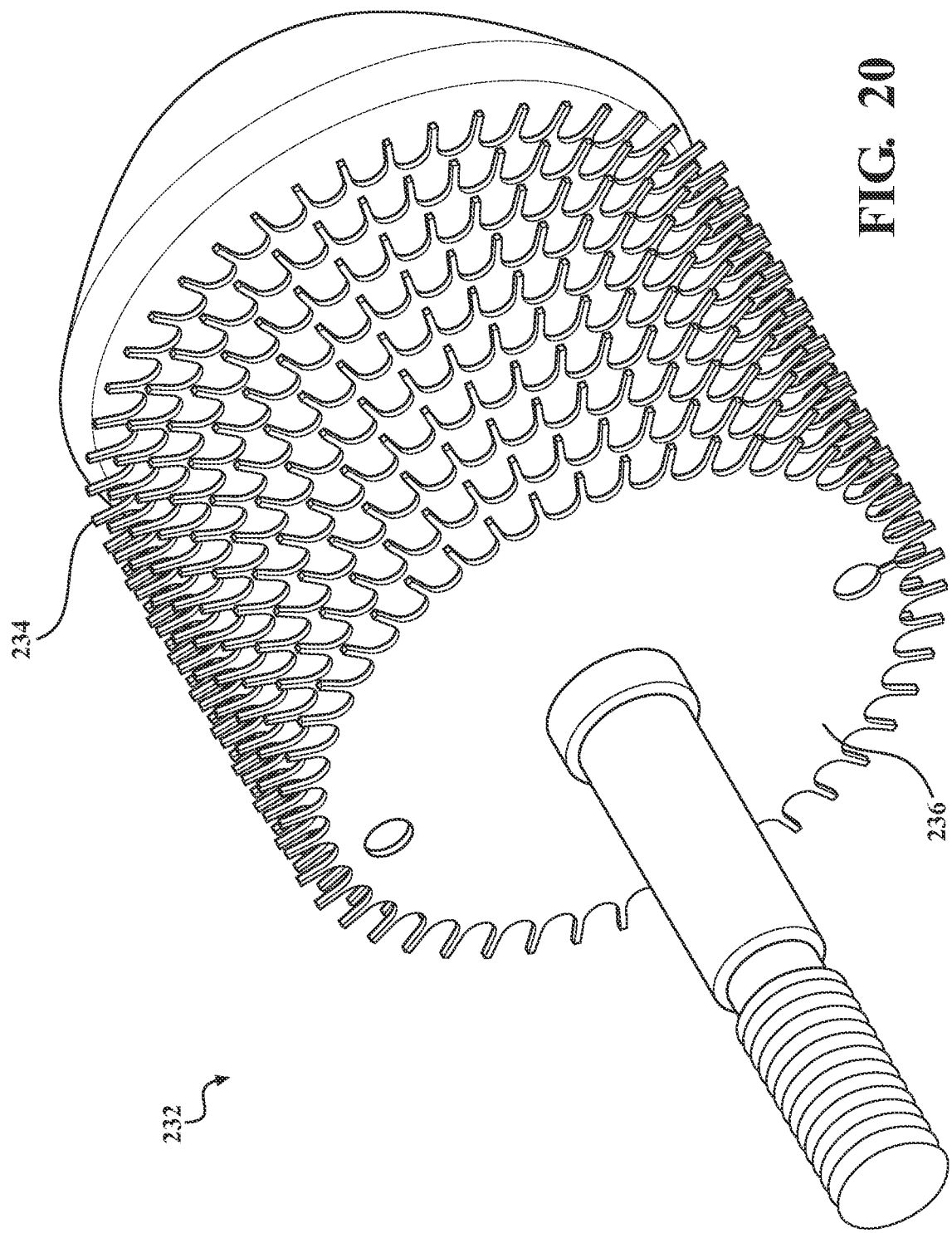
FIG. 20 is an illustration of a discharge electrode assembly, according to one or more embodiments presently presented.

As shown in FIG. 20, each discharge electrode assembly 232 may include one or more discharge electrode pins 234 in an array 236 arranged in a radial pattern and electrically configured to receive one or more voltage pulses. In addition, the plasma reactor 230 may include the same or similar components, or a plurality of the same or similar components, as described above in relation to plasma reactor 140. Further, as shown in FIG. 20, the discharge electrode assembly 232 may include an additional number of layers of arrays 236, each of which may include the one or more discharge electrode pins 234. While ten layers of arrays 236 are shown in FIG. 20, it is contemplated that any number of layers of arrays 236 may be included in the plasma reactor 230. In embodiments, the discharge electrode assembly 232 and any of its subcomponents may include any of the specifications previously described in relation to FIGS. 21 and 22.

An alternate embodiment of the plasma reactor 230 having a large diameter may be provided that may be used in the air purifier 200. This large diameter reactor may look similar to earlier versions but have a single large discharge electrode assembly, with an appearance such as in FIG. 20. In such a configuration, air flow into the system may be introduced tangentially at the bottom of the plasma reactor 230, allowing the air to distribute circumferentially around the plasma reactor 230. This arrangement permits an increase in residence time of air within the plasma reactor 230 with the effect of improved treatment efficiency.

Regardless of which embodiment of the air purifier is selected, one skilled in the art would recognize that any number of power supply features may be selected. Regardless of which setting is selected, the embodiments of air purifiers described herein are able to rapidly decrease the number of bacteria, volatile organic compounds, and other unwanted contaminants present in ambient air. However, the biological kill performance may be manipulated by modifying the specific energy applied in the unit. A measurement of the specific energy is the ratio of the power intake of the unit to the volumetric flow treated by the unit. In the embodiments herein described, the specific energy can be varied from 0.15 W/m$^3$ to 3.0 W/m$^3$. FIGS. 23 and 24 shows a single pass bacteria kill efficiency at a specific energy of 1.6 W/m$^3$.

Figure 25:
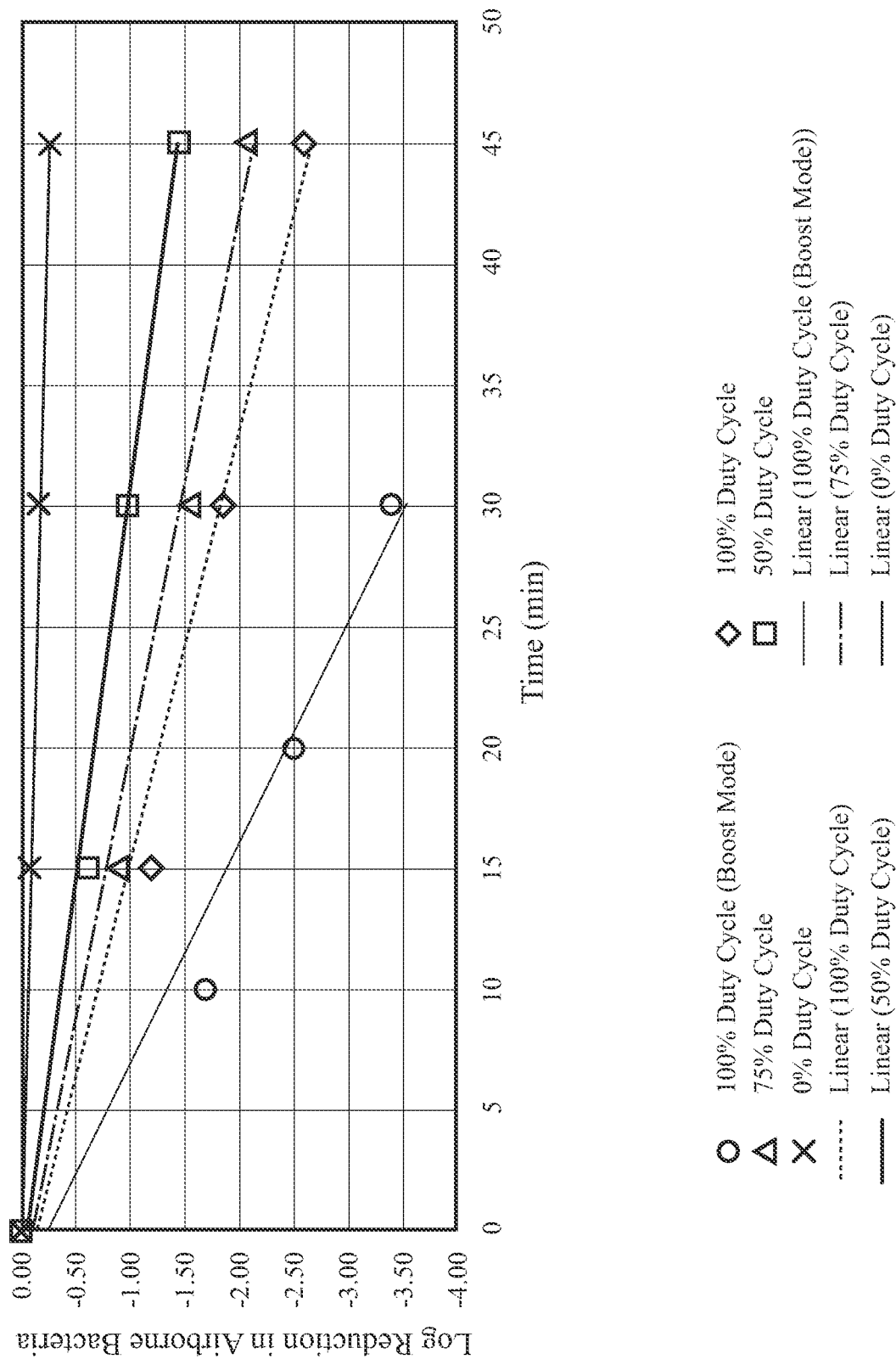
FIG. 25 is a graph showing the log reduction of airborne bacteria in a purified gas stream produced at different power settings of an air purifier, according to one or more embodiments presently presented.
Figure 26:
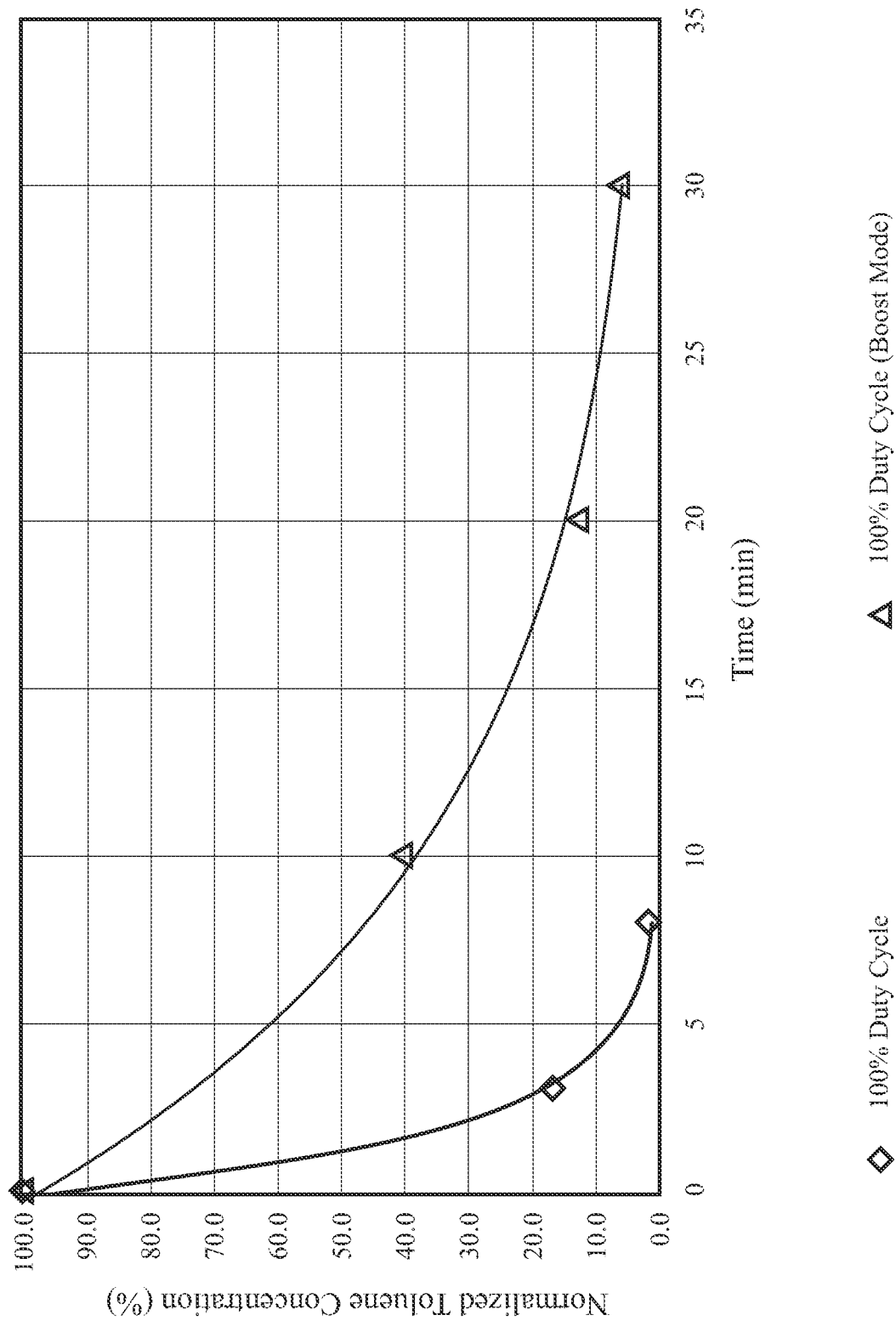
FIG. 26 is a graph showing the log reduction of toluene in a purified gas stream produced at different flow settings of an air purifier, according to one or more embodiments presently presented.

FIG. 25 shows bacteria kill performance in a closed volume at a specific energy of 0.35 W/m$^3$ with the air purifier 100 run at various duty cycles. The duty cycles are configured such that the plasma reactor 140 does not run continuously, but that one or more components (e.g., the fan) of the air purifier 100 continue to work. For example, a 100% duty cycle means that the plasma reactor 140 runs 100% of the time; a 75% means that the plasma reactor 140 runs 75% of the time. In embodiments, the plasma reactor 140 may run for 45 seconds and then be shut off for 15 seconds. In one or more embodiments, the plasma reactor 140 may run 3 minutes and then be shut off for 1 minute. In certain embodiments, the plasma reactor 140 may be run at different duty cycles (e.g., 75% of the time, 50% of the time, etc.), while the fan and other aspects of the air purifier 100 continue to work. In a boost mode, the plasma reactor 140 operates in a given duty cycle but the air flow rate may be increased for quicker treatment times.

Any plasma reactor disclosed herein may be operated at the duty cycles, voltages and other parameters discussed. In a further example, a plasma reactor such as reactor 230 having multiple discharge electrode assemblies may be operated with all discharge electrode assemblies on at the same time and off at the same time, and all at the same voltage. Alternatively, some subset of the discharge electrode assemblies may be on while the remainder are off. As a further alternative, some of the discharge electrode assemblies may be operated at a different voltage and/or duty cycle than others of the discharge electrode assemblies.

Figure 27A:
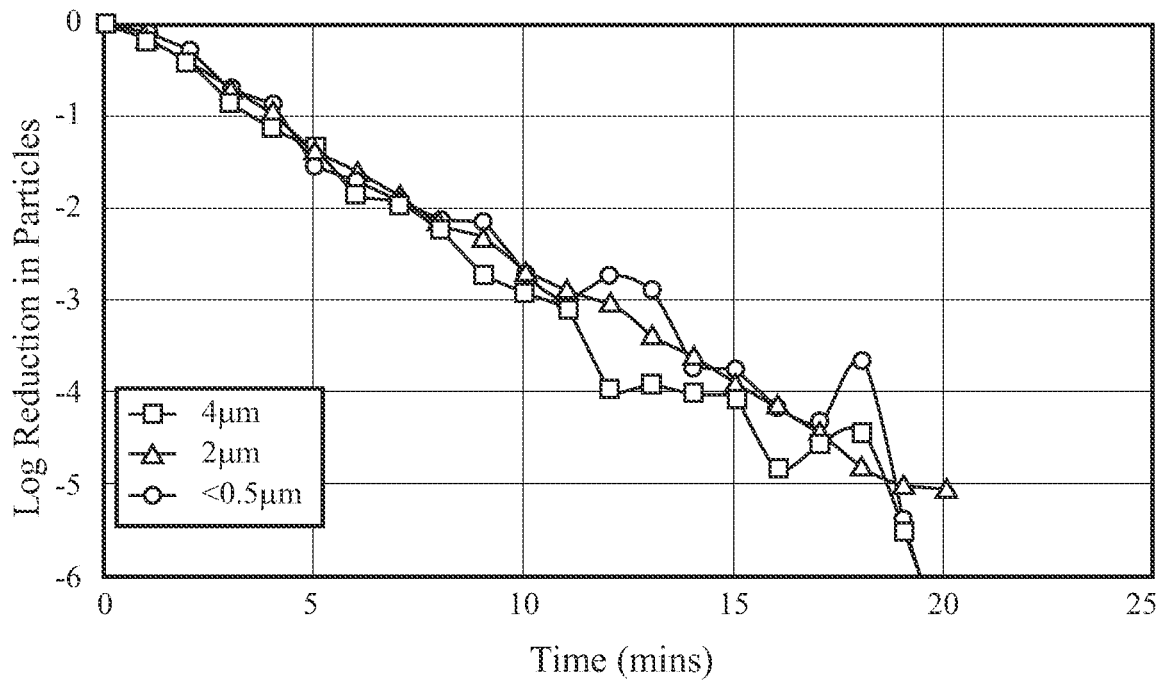
FIG. 27A is a graph showing particulate agglomeration effects on various sized contaminants that are contacted with one or more components of an air purifier, increasing particulate capture rate, according to one or more embodiments presently presented.
Figure 27B:
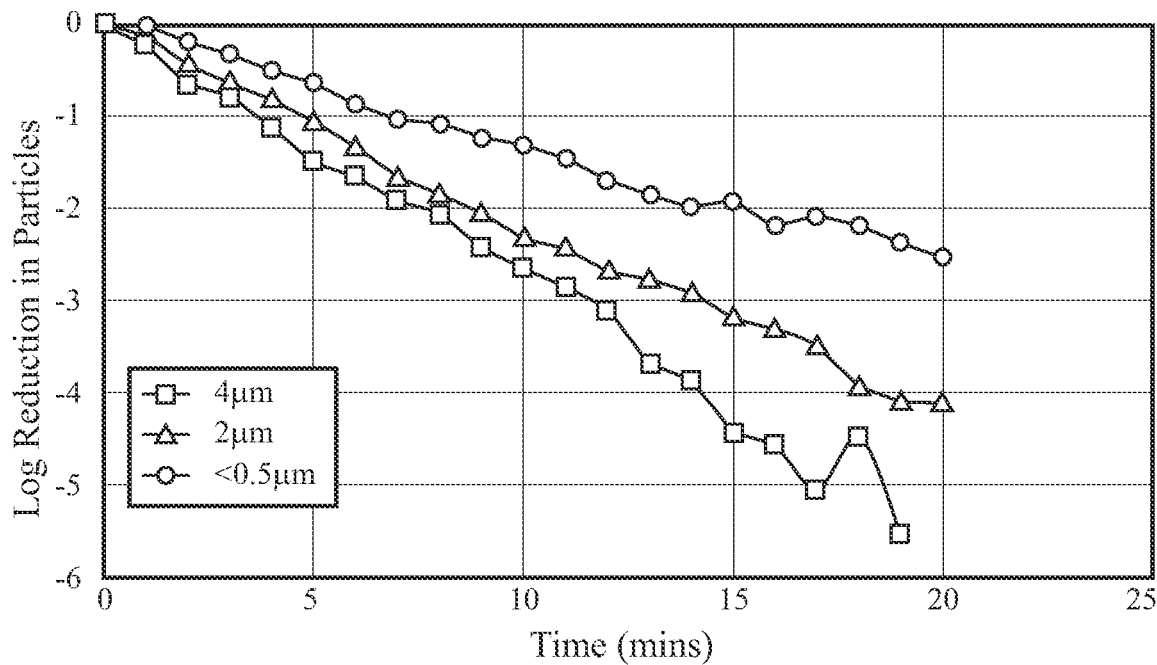
FIG. 27B is a graph showing particulate capture rate of various sized contaminants that are contacted with a typical HEPA filter over time.

As shown in FIG. 27A and FIG. 27B, the air purifiers 100, 200 demonstrate an increased amount of contaminant removal when used in combination with a typical filter. In particular, a test was done in a 562 cubic foot chamber using polystyrene-latex bead particles with varying diameters (0.1 µm to 10 µm). The chamber was first filled with the particles. An air purifier 100, 200 was then placed in the chamber having both a plasma reactor and a MERV 14 rated filter. FIG. 27A demonstrates filtration when the plasma reactor is engaged while FIG. 27B demonstrates filtration when the plasma reactor is not engaged. A comparison of FIG. 27A and FIG. 27B indicates that filtration is improved when the plasma reactor is engaged. Without being bound to a particular theory it is believed that the plasma reactor 140 promotes particulate agglomeration and, as such, it is believed that the MERV 14 filter can better capture particles when the plasma reactor is engaged (FIG. 27A) as opposed to when the plasma reactor is not engaged (FIG. 27B).

Figure 28:
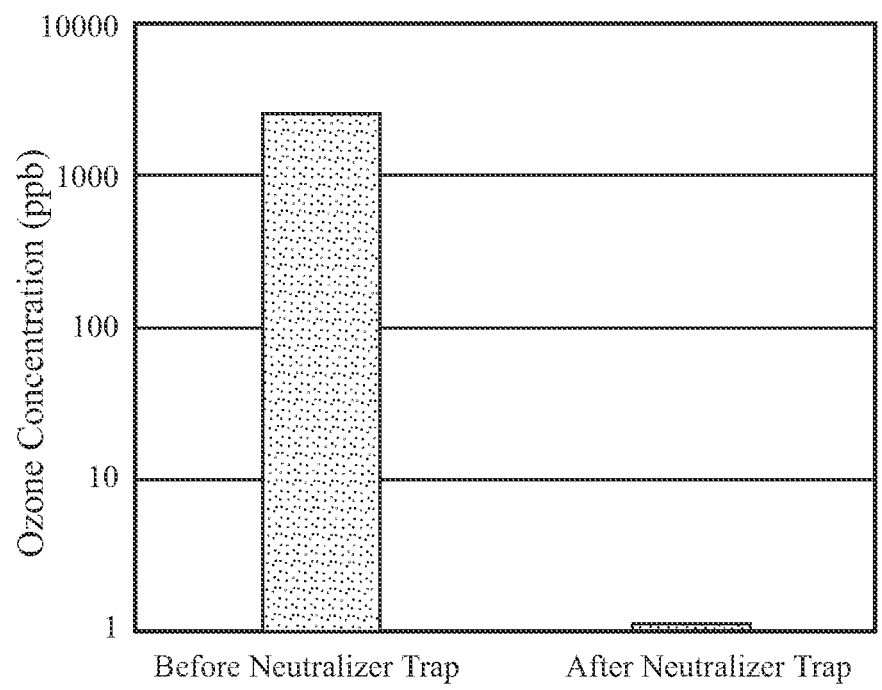
FIG. 28 is a graph showing the reduction of ozone generated by the plasma reactor compared to ozone present in the purified gas stream.

As seen in FIG. 28, the neutralizing trap removes all measurable ozone produced by the plasma reactor in air purifiers 100, 200.

Figure 29A:
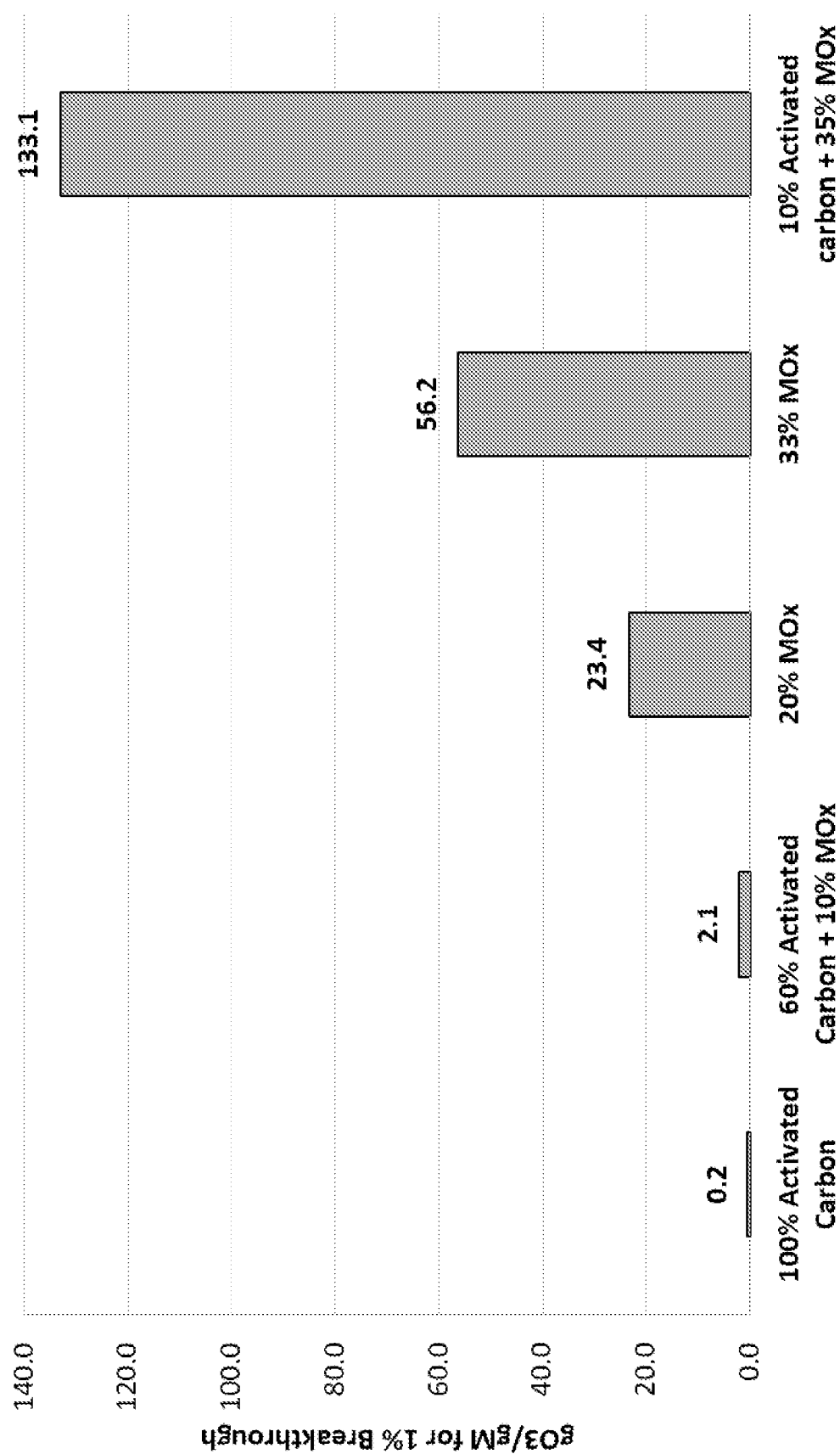
FIG. 29A is a graph showing lifetimes of various neutralizing traps that may be included in an air purifier, according to one or more embodiments presently presented.

FIG. 29A shows lifetimes of various neutralizing traps that may be included in an air purifier 100, 200. As discussed previously, the lifetime of the neutralizing trap is the time before the neutralizing trap is recommended to be replaced. Neutralizing traps were tested having an ozone concentration before the neutralizing trap of 2500 ppb and a 1% breakthrough indicated when 25 ppb ozone exits after the neutralizing trap. The graph indicates that the trap performs better with the addition of a metal oxide catalyst with a 100% carbon neutralizing trap having a breakthrough rate lower than a 100% MnO$_2$ trap. In the graph, gM signifies the weight of the filter.

According to a further embodiment of the present invention, the air purifier may be operated in a manner to allow free radicals, produced by the plasma reactor, to escape the purifier for sanitizing of an area surrounding the air purifier. In one example, this is accomplished by increasing the fan speed, and the resulting air flow rate, to a rate great enough to allow some free radicals to not be captured by the trap. In some embodiments, the trap may be nearly 100% efficient at capturing free radicals at up to a certain rate of capture or airflow rate, and when the air flow rate is increased above this point, some free radicals will pass through the trap without being captured. In one example, a sanitizing setting may be provided in which the fan speed and/or air flow rate is several times the normal maximum speed or rate. In other examples, the increase may be to more than double the normal rate. In one example, a user sets the purifier to a sanitizing setting, after which the purifier waits a given time period for the user to exit the area, and then the purifier switches to the high flow rate for a given sanitizing period. After the sanitizing period, the purifier may revert to normal operation or may shut off. A user may enter the area again after enough time has passed for the free radicals to have dispersed or been neutralized by interactions in the area. The purifier may include a sensor for sensing when a user is in the area, such as by using a motion sensor, and the sanitizing setting is disabled until the user is not present. The purifier may also include sound or light indicators to indicate when it the area may be entered. In yet a further example, the trap may have a bypass and the purifier may be operable to bypass the trap when in a sanitizing setting.

Figure 29B:
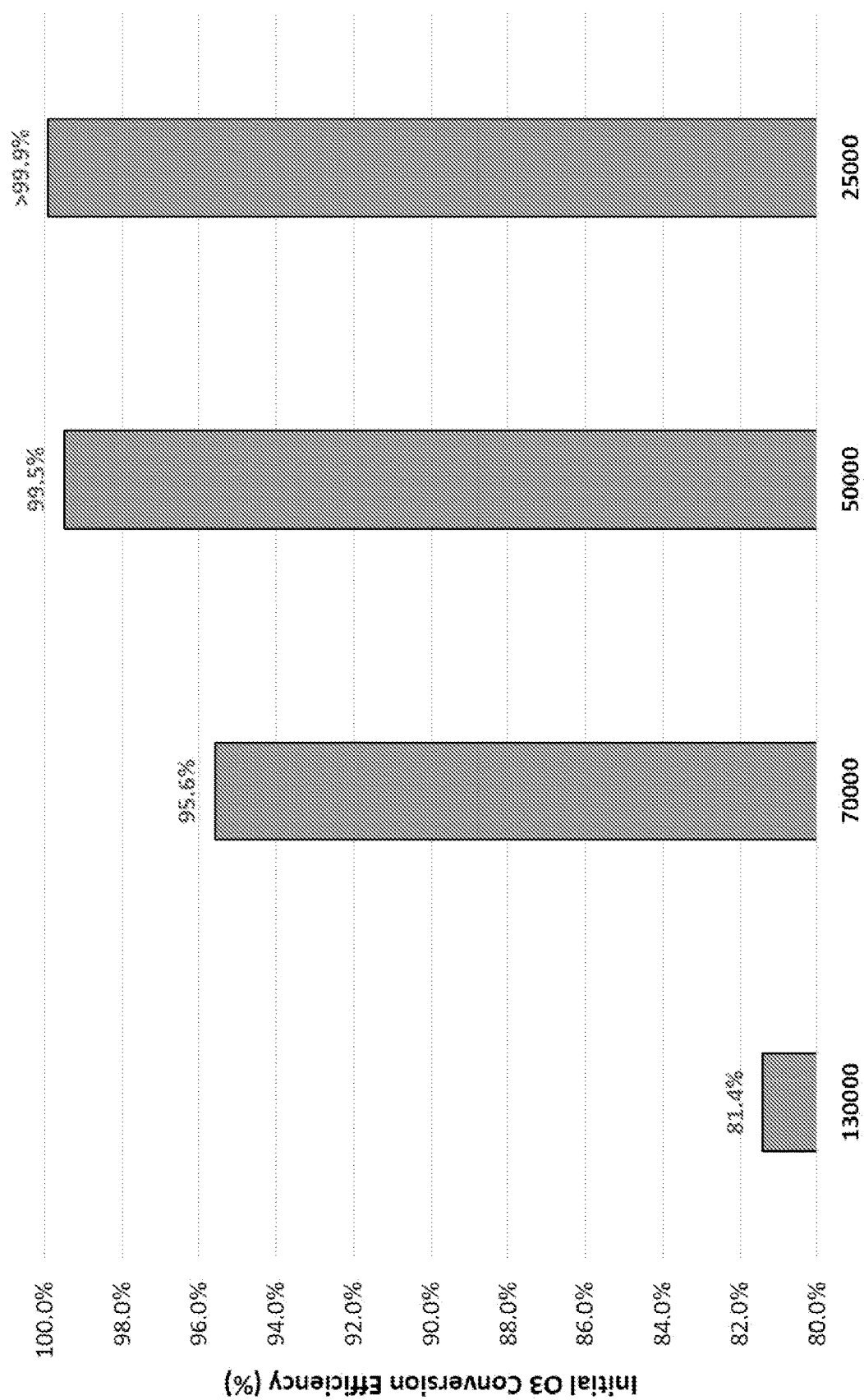
FIG. 29B is a graph showing how the release of free radicals may be impacted by changes in flow rate, according to one or more embodiments presently presented.

In embodiments, a sanitizing setting may include free radicals being additionally or alternatively released by increasing the plasma power either without increasing the flow rate or in combination with an increase in flow rate. The plasma power may be increased in a variety of ways, including increasing the current and/or increasing the amount of time the generator is energized if it is energized in a pulsed manner. In embodiments, a post-sanitizing setting may include turning off the plasma reactor while continuing to pass air through the neutralizing trap, which may include an increased flow rate. FIG. 29B is a bar chart which provides data representing how the release of free radicals may be impacted by changes in flow rate, and is presented in terms of the gas hourly space velocity (GHSV), which scales with flow rate. GHSV is the ratio of air or gas flow rate to the volume of the neutralizing trap. At the far right, the chart indicates a GHSV of 25,000 at which point ozone is converted by an exemplary track at greater than 99.9% efficiency. This may be considered to be a maximum normal operation rate of a purifier including this trap. Typically, the normal operation rate will be below this rate, and may be substantially below this rate, such as being below half this rate, such that the trap is operating well within its maximum efficiency range. The chart further indicates that when the GHSV is increased to 50,000, the efficiency drops to 99.5%, when the GHSV is increased to 70,000, the efficiency drops to 95.6%, and when the GHSV is increased to 130,000, the efficiency drops to 81.4%. In this example, when the GHSV is increased to 130,000, 18.6% of the ozone traveling through the trap is not converted and therefore escapes the trap. Some portion of this ozone will then exit the purifier into the space surrounding the purifier. It is noted that the data in FIG. 30 is for an exemplary trap and other traps will exhibit different characteristics. In accordance with certain embodiments of the present invention, a sanitizing setting may include a flow rate at which the free radical or ozone conversion efficiency drops below 99.9%, such as below 95%, below 90%, below 85%, below 80%, below 75%, below 70%, below 65%, below 60%, below 55%, or below 50%. Additionally or alternatively, a sanitizing setting may include a flow rate that is higher than a maximum non-sanitizing setting, such as 2 times, 3 times, 4 times, 5 times, 6 times, 7 times, 8 times, 9 times or 10 or more times the maximum non-sanitizing setting. The sanitizing setting may also correspond to a fan speed setting that is higher than a maximum non-sanitizing setting, such as 2 times, 3 times, 4 times, 5 times, 6 times, 7 times, 8 times, 9 times or 10 or more times the maximum non-sanitizing setting.

Figure 31:
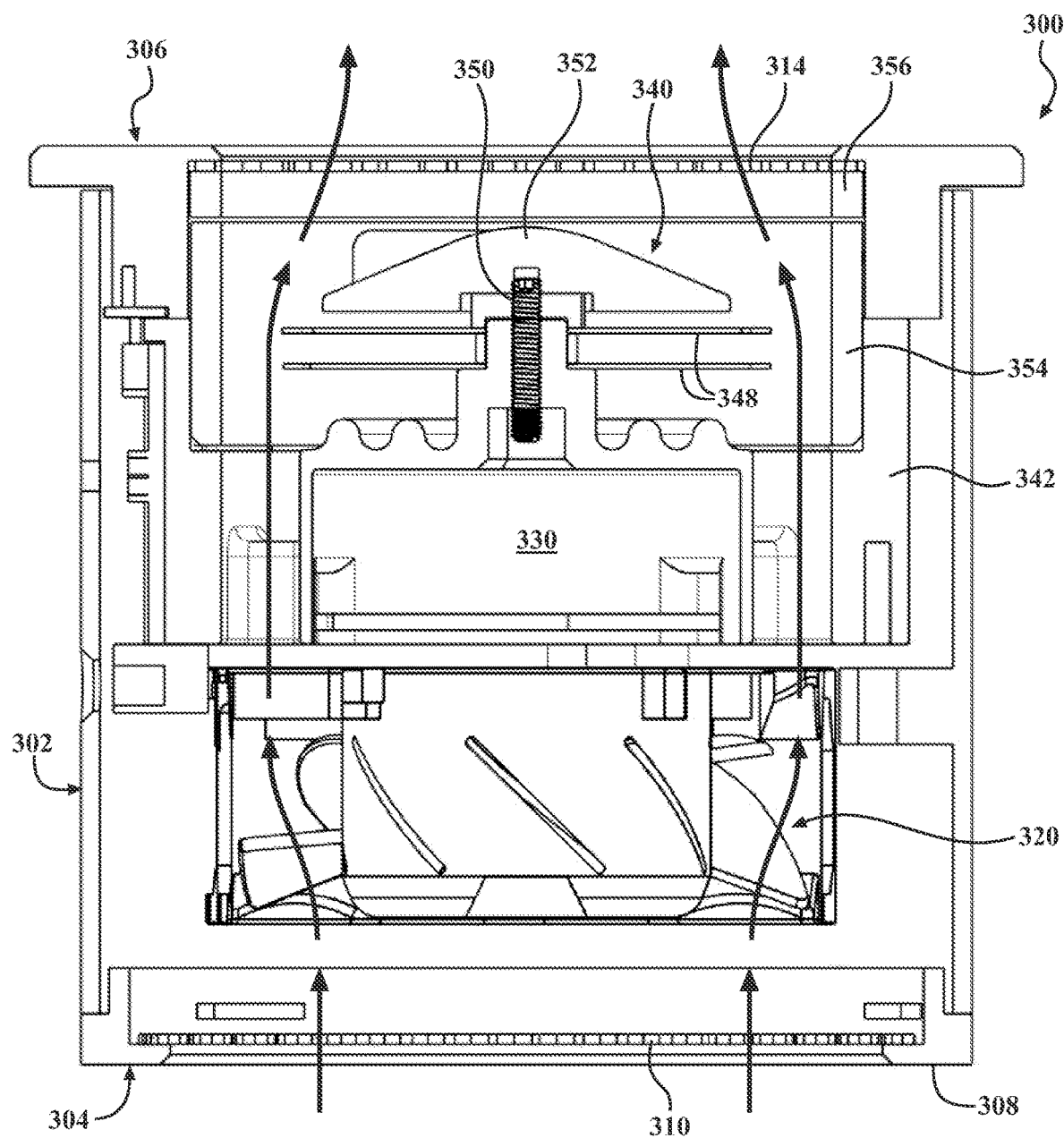
FIG. 31 is a cross-sectional view of an embodiment of a plasma reactor assembly according to an embodiment.
Figure 32:
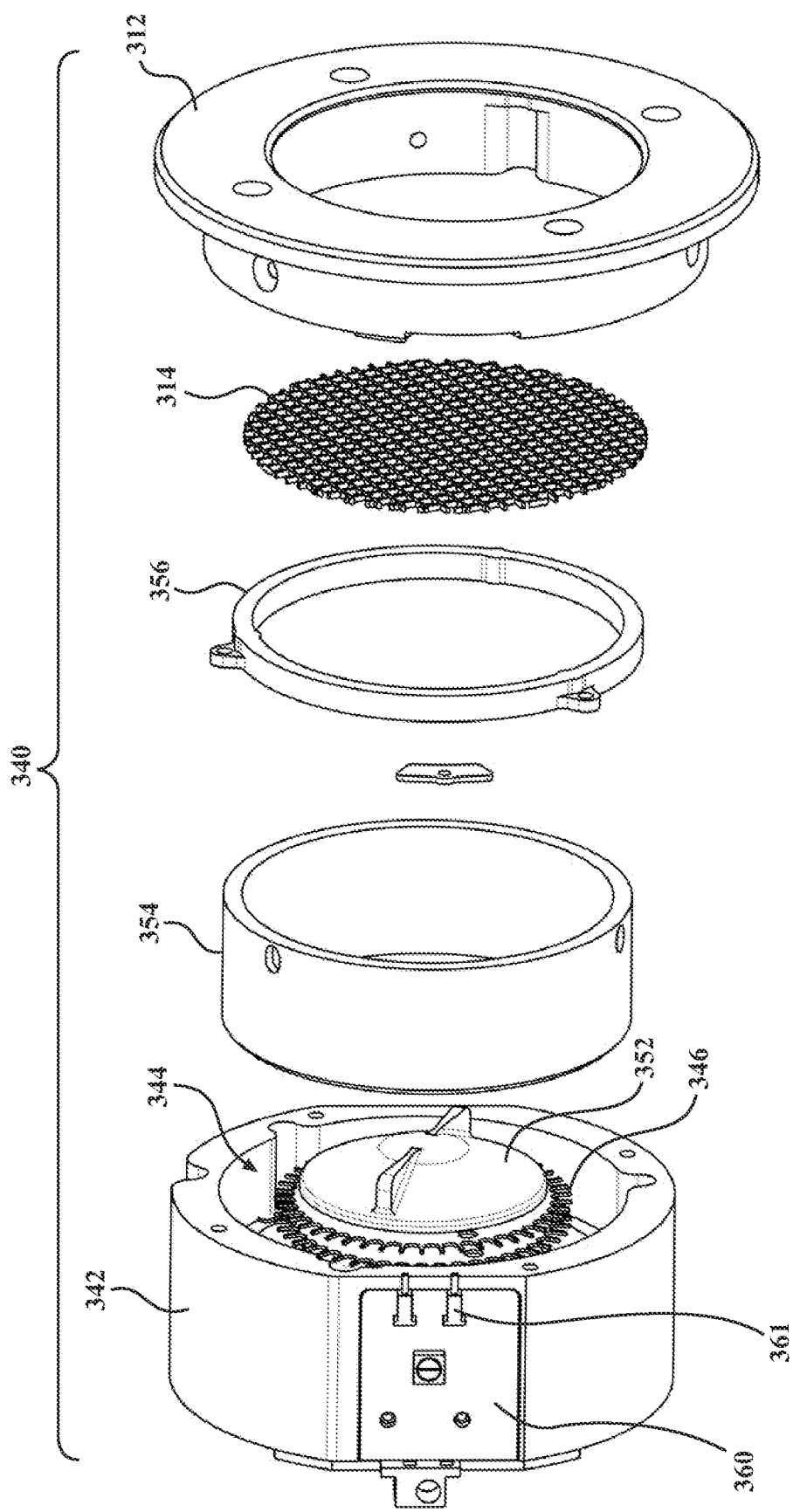
FIG. 32 is an exploded perspective view of an embodiment of a plasma reactor forming part of the plasma reactor assembly of FIG. 31.
Figure 33:
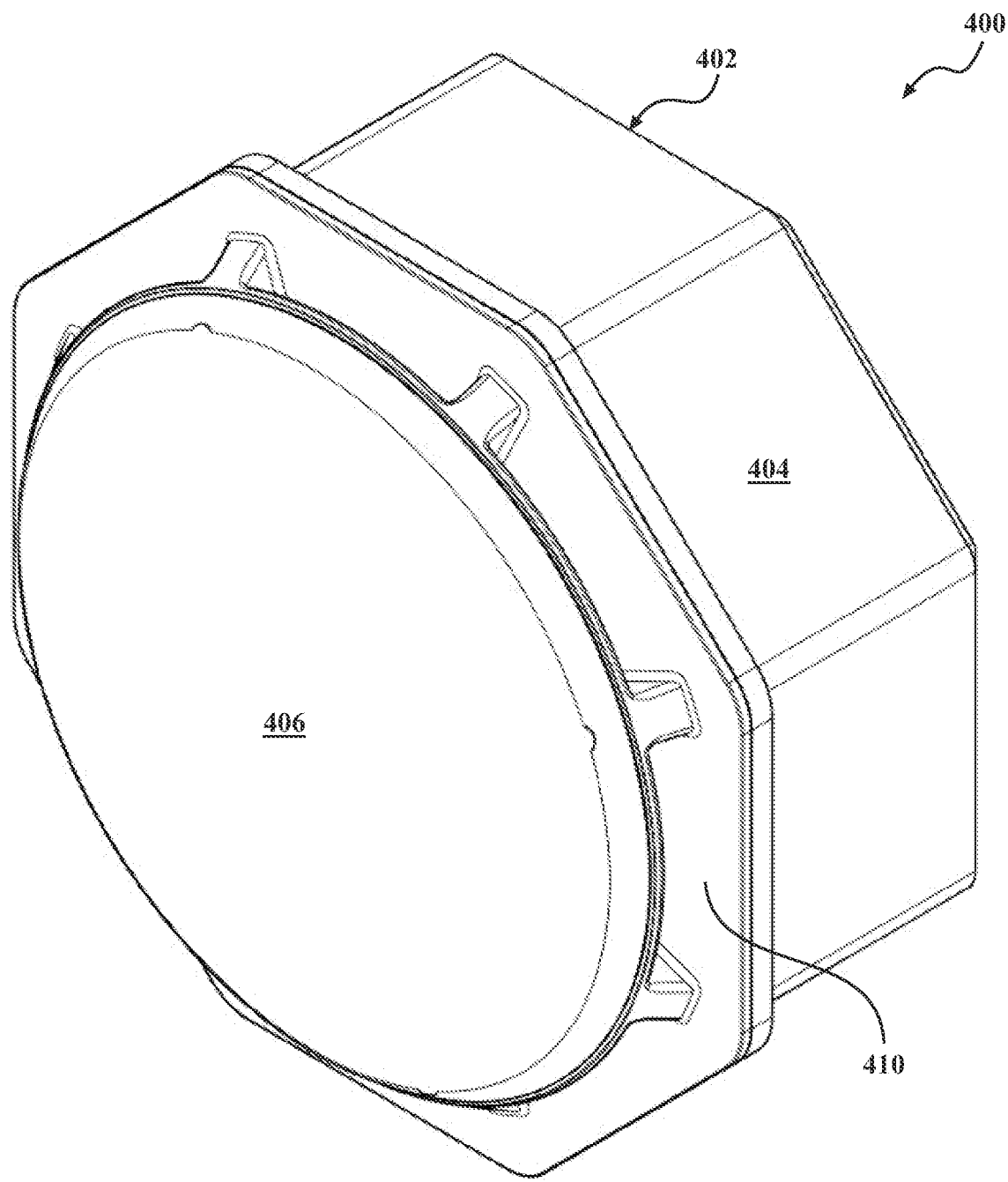
FIG. 33 is a perspective view of an air purifier according to an embodiment.
Figure 34:
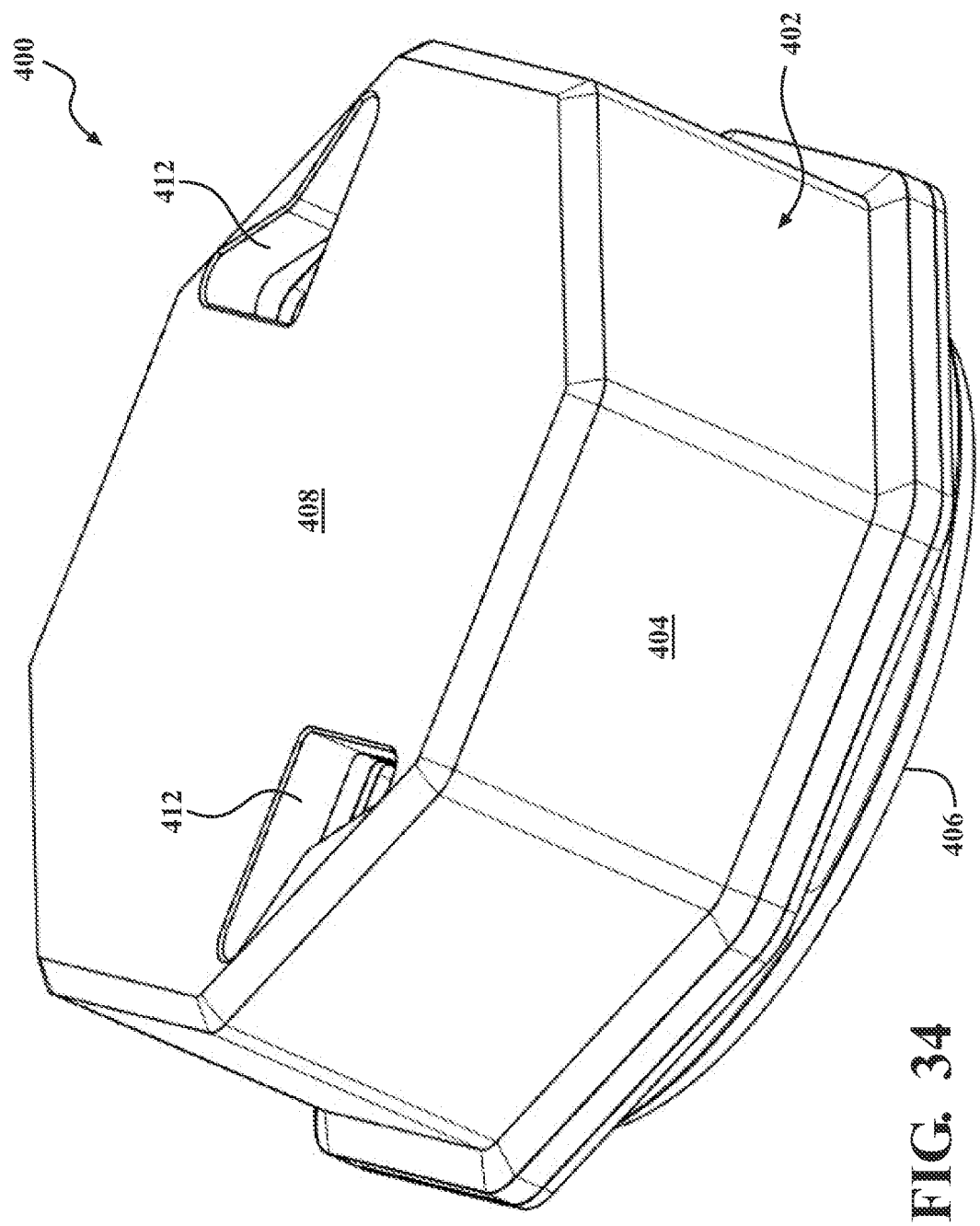
FIG. 34 is an additional perspective view of the air purifier of FIG. 33.

Referring now to FIGS. 31 and 32, an alternative embodiment of a plasma reactor assembly is shown at 300. The plasma reactor assembly 300 includes the components of a plasma reactor in addition to an integrated fan 320 and power supply 330. The plasma reactor assembly may be used with any embodiment of an air purifier, including any embodiment of an air purifier disclosed here, such as air purifier 100, 200 or 400. FIG. 31 provides a cross-sectional view of the plasma reactor assembly 300 and FIG. 32 provides a partially exploded perspective view of the plasma reactor assembly.

In embodiments, the plasma reactor assembly 300 has a generally cylindrical main body 302 with a first end 304 and a second end 306. In an example, the first end 304 is an intake end and has an end cap 308 with a grill or screen 310 providing intake openings. In an example, the second end 306 is an outlet end and has an end cap 312 with grill or screen 314 providing outlet openings. In embodiments, the opening or pore size of the grill or screen may be dimensioned to trap particles having a size equal to or larger than 0.5 mm to 5 mm. The fan 320 is disposed in the main body 302 near the first end 304 to draw air in through the intake openings in the end cap 308. Airflow is represented by arrows, but the airflow paths may be different or in a different direction. The power supply 330 is disposed downstream, with respect to airflow arrows, and may take any form discussed herein, and be connected to an external power supply, include a battery and/or be interconnected with or include a control.

The plasma reactor assembly 300 further includes a plasma reactor 340. The plasma reactor 340 includes a plasma reactor housing 342 which, in embodiments, is generally cylindrical, and is received in the main body 302 downstream, with respect to the airflow arrows, of the fan and power supply, adjacent the end cap 312. The plasma reactor housing 342 may be formed of a non-conductive material. A discharge electrode assembly 344 is disposed in the plasma reactor housing 302 and includes discharge electrode pins 346 provided, in this example, in two radial arrays 348 held in place by a fastener 350 and end cap 352. The end cap 352 may include flanges to allow for easy removal for cleaning of the arrays 348, and may be formed of an electrically insulating material.

A removable counter electrode 354, which in examples is generally cylindrically tube-shaped, is received in the plasma reactor housing 342 so as to surround the discharge electrode assembly 344. The components of the discharge electrode assembly 344 may have the same gaps, materials and geometry as discussed for previous embodiments. The materials, gap to the pins, and geometry of the counter electrode 354 may be the same as for discussed for previous embodiments. As shown, airflow occurs in the gap between the discharge electrode assembly 344 and the counter electrode 354. In embodiments, the counter electrode 354 is interconnected with the end cap 312 such that removal of the end cap removes the counter electrode from the housing 342. A spacer ring 356 may be disposed between the counter electrode 354 and the cap and may be spring loaded so as to allow for changes in height of the counter electrode. The spring loaded spacer ring 312 urges the counter electrode 354 against an electrical contact during use. The spacer ring may be formed of a non-conductive or a conductive material. The grill or screen 314 may be disposed on the spacer ring and held in place by the end cap 312. The end cap 312 engages the plasma reactor housing 342. By removing the end cap 312, screen 314 and spacer ring 356, the counter electrode 354 may be accessed and removed for cleaning, such as for cleaning of dust that may build up on the counter electrode.

The plasma reactor housing 342 may include a control board 360 for controlling the electrical components. Electrical connectors 361 may be positioned on the control board 360 as to make contact with an element in the cap such that removal of the cap breaks the contact and thereby turns off the plasma reactor. This assures that the plasma reactor is not powered when disassembled for cleaning.

In embodiments, the grill or screen 314 may be provided to avoid a user touching the electrical components, and the screen may be made of a made of a conductive or non-conductive material, and may be grounded for shielding and electrical safety. In an example, the screen may be a bimetal screen that serves to remove at least a portion of some precipitate byproducts, such as NOx. In examples, the grill or screen 314 may have pore sizes in the range of 0.5 to 5.0 mm. The grill or screen may also be configured to redistribute and even out airflow passing therethrough.

Referring now to FIGS. 33-38, a further embodiment of an air purifier 400 will be discussed. In the illustrated configuration, which is non-limiting, the air purifier 400 has a main body 402 with side walls 404 generally forming a hexagonal shape and extending between a first end 406 and second end 408. In some examples, the first end 406 is a bottom end and the second end 408 is a top end. This embodiment will be described herein below with respect to the first end 406 being a bottom end and the second end 408 being a top end, but it is understood that these directional indicators are being used merely for convenience and are not limiting.

In embodiments, the bottom end 406 defines an ambient air intake through openings 410 which may be radially disposed around a perimeter of the bottom end 406. The top end 408 defines a purified gas outlet through openings 412. The intake and/or outlet openings may include screens.

In embodiments, a plasma reactor assembly 420 is provided in the center of the main body 402. The plasma reactor assembly 420 may take any form disclosed herein, or any other form. In embodiments, the plasma reactor assembly 420 is the same as or similar to the plasma reactor assembly 300 previously described, and includes a plasma reactor, a fan and a power supply. An optional UV light 430 may be provided at the outlet end of the plasma reactor assembly 420 and may take any of the forms and be operated in any of the ways discussed previously.

Figure 35:
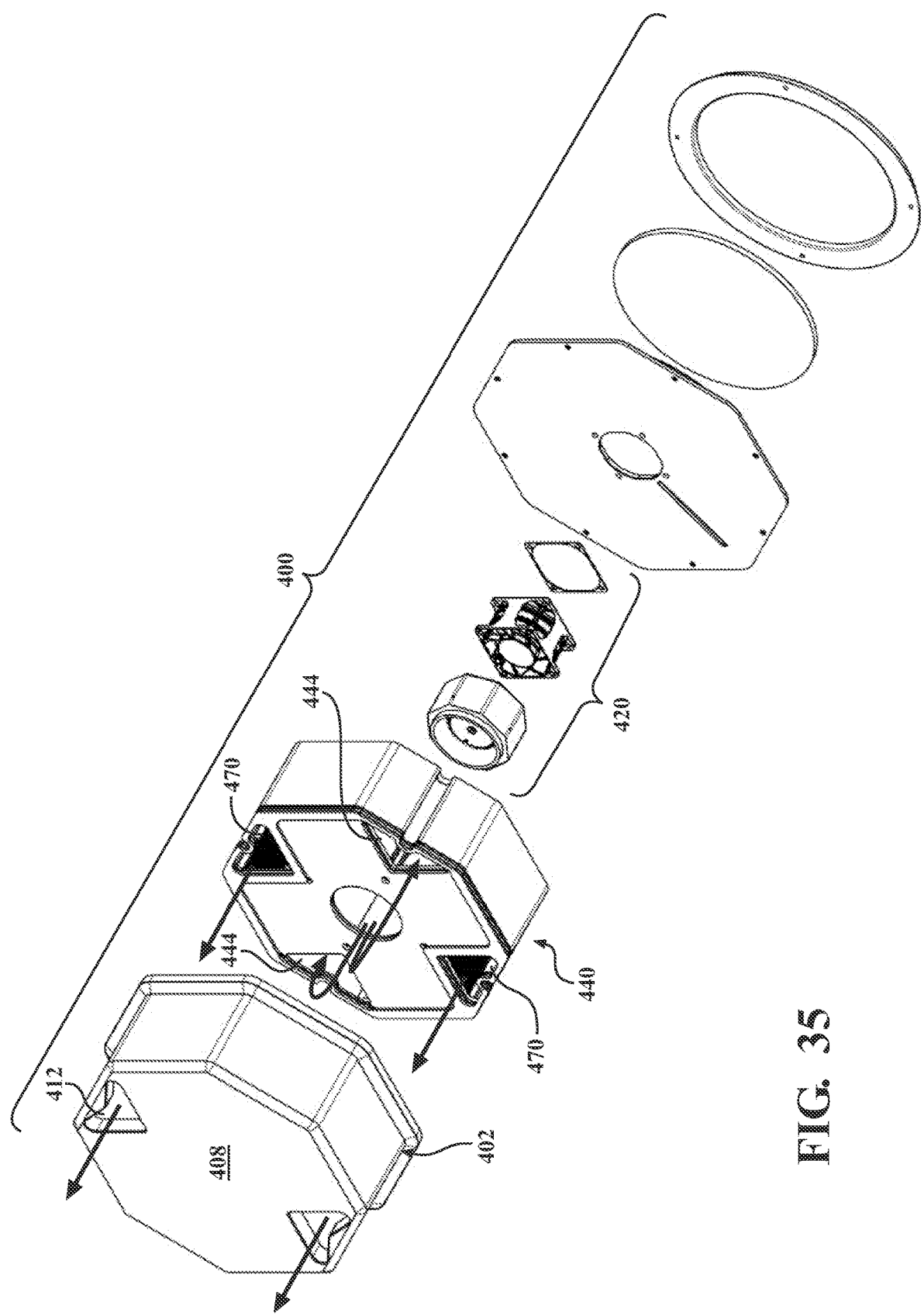
FIG. 35 is an exploded perspective view of the air purifier of FIGS. 33 and 34.
Figure 36:
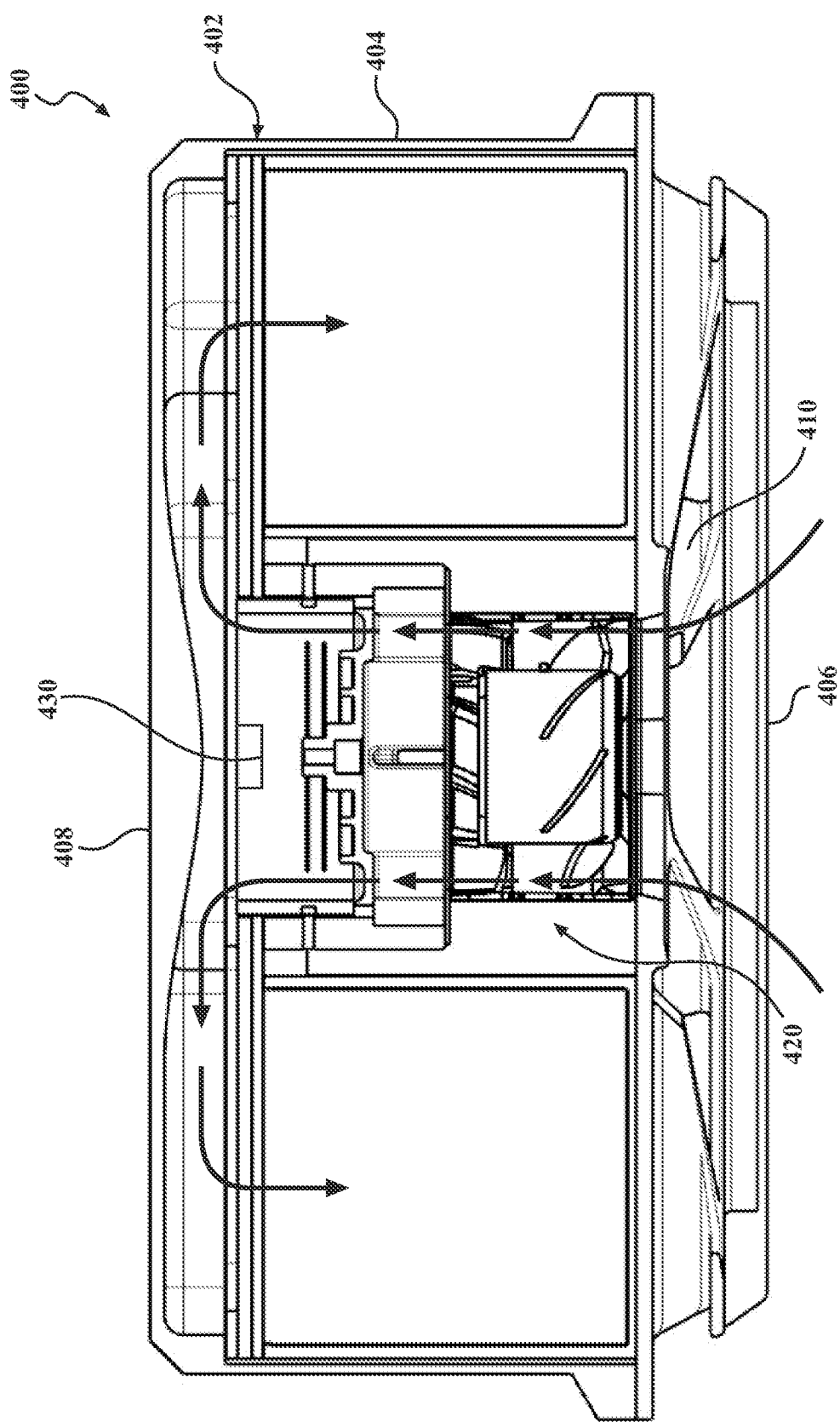
FIG. 36 is a cross-sectional view of the air purifier of FIGS. 33-35.

Referring to FIG. 35, a neutralizing trap 440 may surround the plasma reactor assembly 420. In embodiments, the neutralizing trap 440 has a central opening 442 in which the plasma reactor assembly 420 is received. Referring to FIGS. 35 and 36, airflow arrows are provided indicating that airflow travels through the plasma reactor assembly 420 and is then divided on the underside of the top end 408 of the main body 402, and then travels into inlet openings 444 in the neutralizing trap 440, which are radially outboard of the central opening 442.

Figure 37:
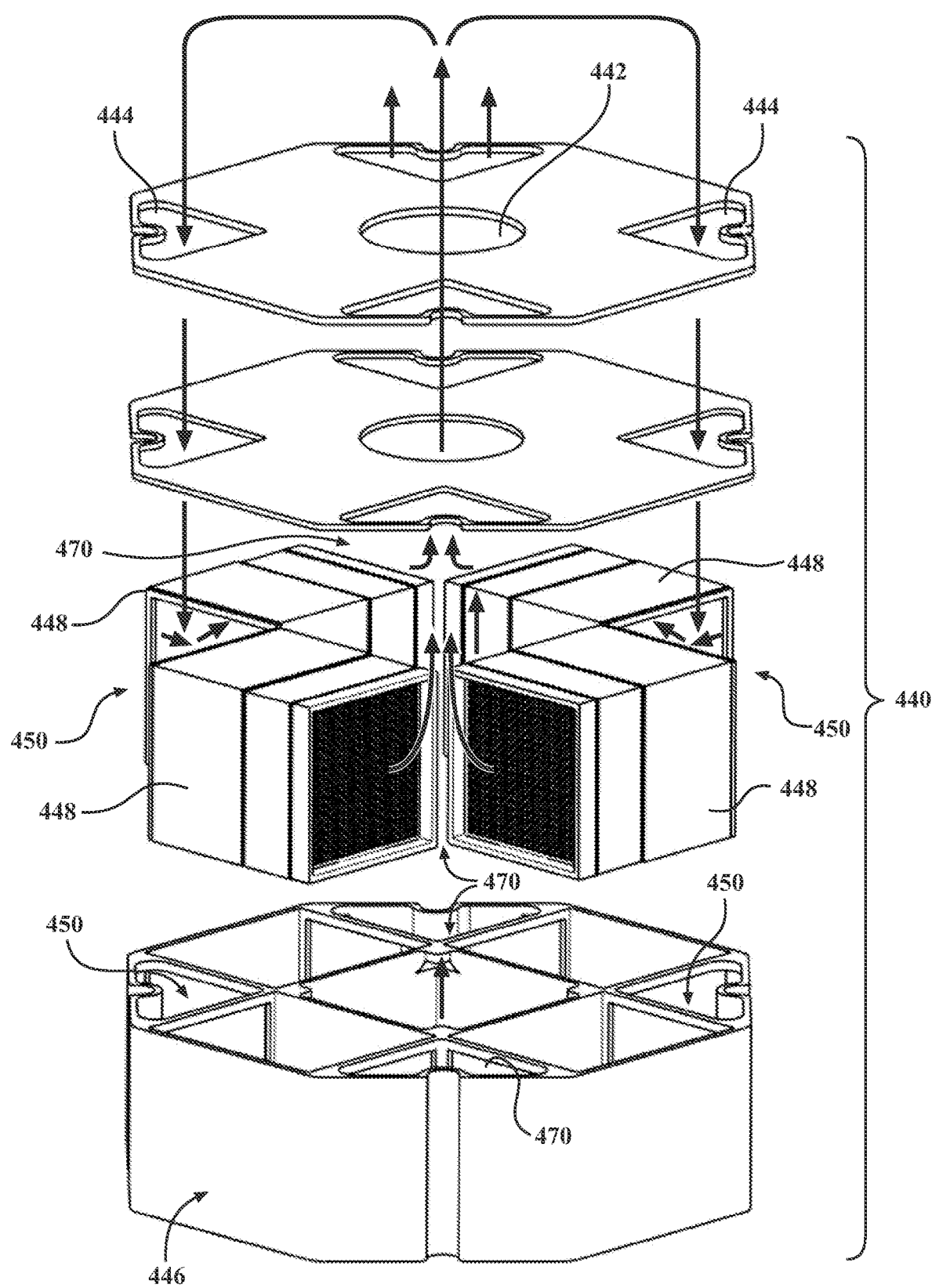
FIG. 37 is an exploded perspective view of a neutralizing trap which may form part of the air purifier shown in FIGS. 33-36.

FIG. 37 provided an exploded view of the neutralizing trap 440 by itself. The neutralizing trap 440 has a trap housing 446 which receives four neutralizing trap blocks 448, arranged as shown. Airflow is illustrated by airflow arrows, as flowing up through the central opening 442, splitting into two streams, and flowing back down to inlet areas 450 provided between pairs of neutralizing trap blocks 448. The inlet areas 450 are indicated in FIG. 37 as between adjacent blocks and also as areas in the housing 446. The air flowing into the inlet areas then splits again and flows through the blocks 448 that are adjacent each inlet area 450.

Figure 38:
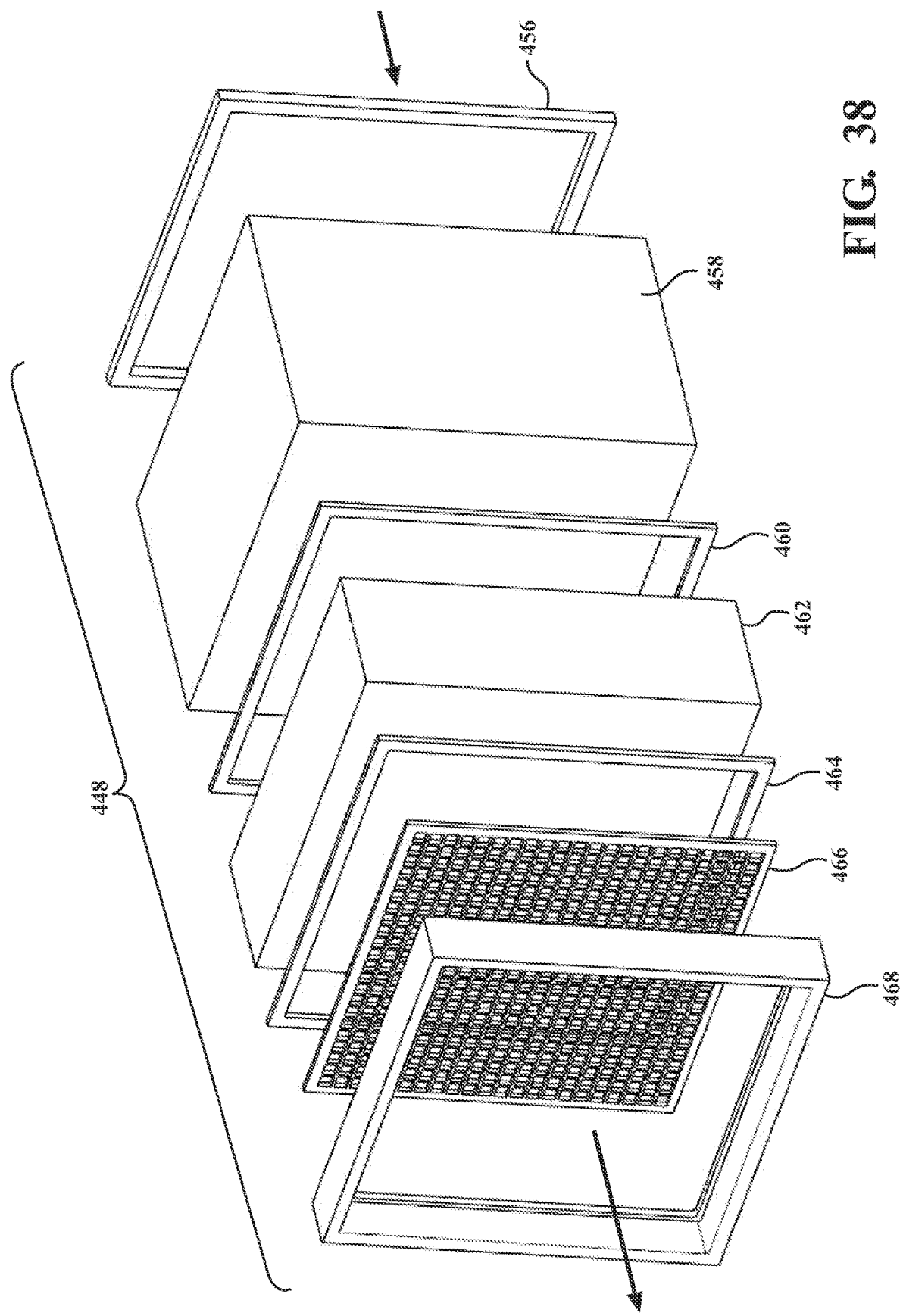
FIG. 38 is an exploded perspective view of a neutralizing trap block which may form part of the neutralizing trap shown in FIG. 37.
Figure 39:
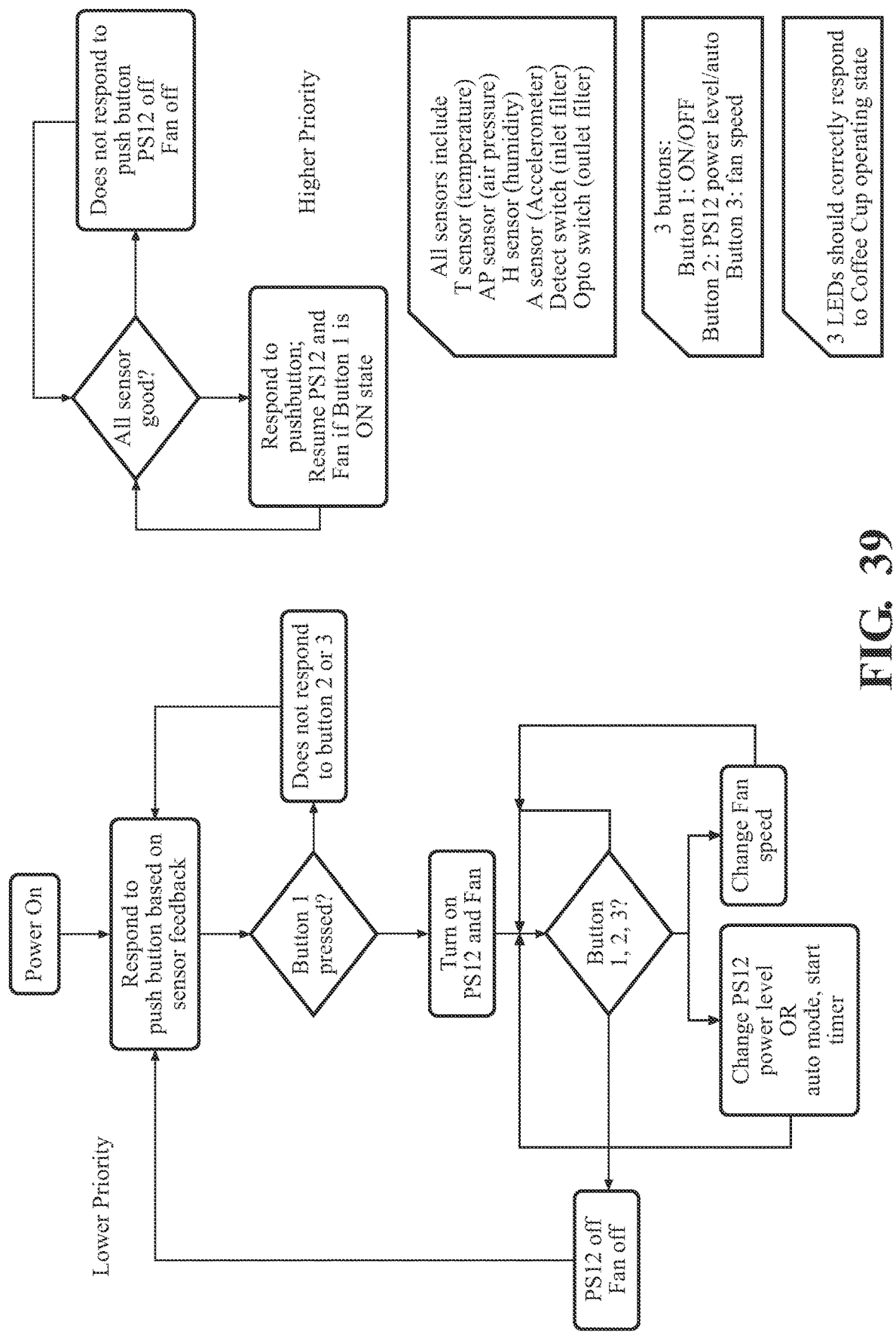
FIG. 39 is a flow chart of the operation of an embodiment of an air purifier.

FIG. 38 provides an exploded view of an embodiment of a single neutralizing trap block 448. The block has an inlet end 452 and an opposite outlet end 454. Airflow is indicated by arrows. Proceeding in the direction of airflow, the block 448 has an inlet seal 456, a metal oxide block 458, a second seal 460, an activated carbon block 462, a third seal 464, a particulate filter 466, and an outlet seal 468. The metal oxide block 458 and activated carbon block 462 may be formed in any of the ways previously discussed for a neutralizing trap, such as being formed of layers of metal oxide and activated carbon material, respectively. Alternatively, the neutralizing trap blocks 448 may be formed of a plurality of layers as we discussed previously, with any of the materials and ratios discussed. In embodiments [do you want to specify ranges or configurations or materials for this embodiment?].

Referring to FIGS. 35 and 37, the airflow exits each neutralizing filter block 448 into an outlet area 470 from where the purified gas flows upwardly and out through the purified gas outlets 412. In embodiments, the air flow rate is in the range of 3 $m^3$/hr to 75 $m^3$/hr.

FIG. 38 is a flow chart of one possible operation of the air purifier 100, 200. The control system does not permit operation of the air purifier 100, 200 in the event certain faults are observed. One fault that will result in the air purifier 100, 200 not operating is a detect switch not identifying whether a neutralizing trap is positioned in the air purifier 100, 200.

It should be understood that any two quantitative values assigned to a property may constitute a range of that property, and all combinations of ranges formed from all stated quantitative values of a given property are contemplated in this disclosure.

Having described the subject matter of the present disclosure in detail and by reference to specific embodiments, it is noted that the various details described in the present disclosure should not be taken to imply that these details relate to elements that are essential components of the various embodiments described in this disclosure. Rather, the appended claims should be taken as the sole representation of the breadth of the present disclosure and the corresponding scope of the various embodiments described in this disclosure. Further, it will be apparent that modifications and variations are possible without departing from the scope of the appended claims. More specifically, although some aspects of the present disclosure are identified as particularly advantageous, it is contemplated that the present disclosure is not necessarily limited to these aspects.

What is claimed is:

1. An air purifier comprising:
   an ambient air intake configured to draw ambient air into the air purifier;
   a plasma reactor configured to generate one or more reaction products from the ambient air;
   a main body comprising at least the plasma reactor;
   a neutralizing trap configured to neutralize at least a portion of the one or more reaction products generated by the plasma reactor, thereby producing a purified gas stream; and
   a purified gas outlet configured to expel the purified gas stream from the air purifier;
   wherein:
      the ambient air intake is fluidly coupled to the plasma reactor;
      the plasma reactor is fluidly coupled to the neutralizing trap;
      the plasma reactor is centrally located in the main body;
      the neutralizing trap is fluidly coupled to the purified gas outlet;
      the neutralizing trap is disposed radially outboard of the plasma reactor;
      the neutralizing trap surrounds the plasma reactor;
      the neutralizing trap comprises a plurality of neutralizing trap blocks, each neutralizing trap block having an inlet end and an opposite outlet end;
      a neutralizer inlet area is defined in the main body;
      the plurality of neutralizing trap blocks includes a pair of neutralizing trap blocks, the pair of neutralizing trap blocks being disposed with the respective inlet ends adjacent the neutralizer inlet area, a gas flow path being defined from the plasma reactor to the inlet area, the gas flow path splitting to flow through each of the neutralizing trap blocks in the pair; and
      neutralizer outlet areas are defined in the main body, each neutralizer outlet area being adjacent the outlet ends of one of the neutralizing trap blocks in the pair.

2. The air purifier of claim 1, further comprising:
   a fan that is fluidly coupled to the ambient air intake and the plasma reactor, wherein the fan is configured to increase an air flow rate of the ambient air introduced to the plasma reactor, the air flow rate being from 5 cubic meters per hour ($m^3$/hr) to 40 $m^3$/hr;

a control unit, wherein the control unit is coupled to a power source configured to supply the air purifier with power, and wherein the control unit is configured to alternate the air purifier, optionally the plasma reactor, between a powered state and an unpowered state;

a particulate filter that is fluidly coupled to the purified gas outlet and configured to further reduce the number of particulates present in the purified gas stream, the particulate filter being a micron filter comprising a plurality of perforations.

3. The air purifier of claim 1, wherein:

the neutralizing trap comprises activated carbon, a metal oxide catalyst, or both; or the neutralizing trap comprises a first layer, a second layer, a third layer, a fourth layer, and a fifth layer, wherein:

the first layer comprises greater than 90 wt. % activated carbon, based on the total weight of the first layer;

the second layer comprises from 60 wt. % to 90 wt. % activated carbon, based on the total weight of the second layer, and from 10 wt. % to 40 wt. % of the metal oxide catalyst, based on the total weight of the second layer;

the third layer comprises from 40 wt. % to 60 wt. % activated carbon, based on the total weight of the third layer, and from 40 wt. % to 60 wt. % of the metal oxide catalyst, based on the total weight of the third layer;

the fourth layer comprises from 10 wt. % to 40 wt. % activated carbon, based on the total weight of the fourth layer, and from 60 wt. % to 90 wt. % of the metal oxide catalyst, based on the total weight of the fourth layer; and the first layer comprises greater than 90 wt. % of the metal oxide catalyst, based on the total weight of the fifth layer; or the neutralizing trap comprises a first layer, a second layer, and a third layer, wherein:

the first layer comprises greater than 90 wt. % activated carbon, based on the total weight of the first layer;

the second layer comprises from 10 wt. % to 90 wt. % activated carbon, based on the total weight of the second layer, and from 10 wt. % to 90 wt. % of the metal oxide catalyst, based on the total weight of the second layer; and the third layer comprises greater than 90 wt. % of the metal oxide catalyst, based on the total weight of the third layer.

4. The air purifier of claim 1, wherein:

the one or more reaction products comprise ozone, oxygen radicals (O*), nitrogen radicals (N*), hydroxyl radicals (OH*), hydrogen radicals (H*), and methylene radicals ($CH_2$*), or combinations thereof; and/or the purified gas stream has a humidity of greater than 10%.

5. The air purifier of claim 1, wherein the plasma reactor comprises:

a discharge electrode assembly comprising one or more discharge electrode pins in an array arranged in a radial pattern and electrically configured to receive one or more voltage pulses; and a counter electrode positioned radially outward from the one or more discharge electrode pins, wherein;

the discharge electrode assembly is surrounded by the counter electrode and is separated therefrom by a discharge gap comprising a flow passage; and at least one baffling electrically isolates the discharge electrode assembly from the counter electrode and permits the flow of gas through the flow passage.

6. The air purifier of claim 5, wherein:

the discharge electrode assembly comprises a plurality of layers of arrays of the one or more discharge electrode pins;

a layer gap separates each of the layers of arrays, wherein the layer gap is from 1 millimeter (mm) to 10 mm;

the one or more discharge electrode pins each comprise an ignition tip, each ignition tip defined by an angle, the ignition tip positioned at a terminus of the discharge electrode pin proximal to the counter electrode;

a counter electrode gap separates the counter electrode from each ignition tip of the one or more discharge electrode pins, wherein the counter electrode gap is from 0.25 millimeters (mm) to 10.5 mm; and an ignition tip gap separates each ignition tip of the one or more discharge electrode pins, wherein the ignition tip gap is from 0.25 millimeters (mm) to 10 mm.

7. The air purifier according to claim 1, wherein:

the main body comprises a first end and a second end that is opposite to the first end;

the ambient air intake is positioned within a portion of the main body;

the plasma reactor is positioned between the first end of the main body and the second end of the main body; and the purified gas outlet is positioned proximal to the second end of the main body; wherein;

the ambient air intake is configured to draw ambient air into the air purifier; and the purified gas outlet is configured to expel the purified gas stream from the second end of the air purifier.

8. The air purifier of claim 7, further comprising:

a plasma reactor assembly defining the plasma reactor, power supply and fan;

wherein:

the plasma reactor assembly comprises an assembly main body, the plasma reactor, power supply and fan being disposed in the assembly main body the plasma reactor assembly has an end cap removable from the assembly main body to expose the plasma reactor; and removing the end cap disconnects power to the plasma reactor.

9. The air purifier of claim 1, wherein the plasma reactor comprises:

a discharge electrode assembly comprising one or more discharge electrode pins in an array arranged in a radial pattern and electrically configured to receive one or more voltage pulses; and a counter electrode positioned radially outward from the one or more discharge electrode pins, wherein the discharge electrode assembly is surrounded by the counter electrode and is separated therefrom by a discharge gap comprising a flow passage; and at least one end cap electrically isolates the discharge electrode assembly from the counter electrode and permits the flow of gas through the flow passage.

10. The air purifier according to claim 1, wherein:

the main body comprises a first end and a second end that is opposite of the first end;

the ambient air intake is positioned proximal to the first end of the main body; and the plasma reactor comprises a plurality of discharge electrode assemblies, wherein the plasma reactor is positioned between the first end of the main body and the second end of the main body, and wherein the plasma reactor is configured to generate one or more reaction products from the ambient air.

11. The air purifier of claim 10, further comprising:
a plurality of fans, each fan being fluidly coupled to the ambient air intake and to the plasma reactor, wherein the plurality of fans are configured to increase an air flow rate of the ambient air introduced to the plasma reactor, the air flow rate the from 100 cubic meters per hour ($m^3$/hr) to 1,000 $m^3$/hr;
a control unit, wherein the control unit is coupled to a power source configured to supply the air purifier with power, and wherein the control unit is configured to alternate the air purifier between a powered state and an unpowered state; and
a particulate filter that is fluidly coupled to the purified gas outlet and configured to further reduce the number of particulates present in the purified gas stream, the filter being a screen comprising a plurality of perforations, each perforation being from 2 microns to 6 microns.

12. The air purifier of claim 10, wherein:
the neutralizing trap comprises activated carbon, a metal oxide catalyst, or both;
the neutralizing trap comprises a plurality of layers, each layer having a different composition than the other layers;
the neutralizing trap comprises a first layer, a second layer, a third layer, a fourth layer, and a fifth layer, wherein:
  the first layer comprises greater than 95 wt. % activated carbon, based on the total weight of the first layer;
  the second layer comprises from 60 wt. % to 90 wt. % activated carbon, based on the total weight of the second layer, and from 10 wt. % to 40 wt. % of the metal oxide catalyst, based on the total weight of the second layer;
  the third layer comprises from 40 wt. % to 60 wt. % activated carbon, based on the total weight of the third layer, and from 40 wt. % to 60 wt. % of the metal oxide catalyst, based on the total weight of the third layer;
  the fourth layer comprises from 10 wt. % to 40 wt. % activated carbon, based on the total weight of the fourth layer, and from 60 wt. % to 90 wt. % of the metal oxide catalyst, based on the total weight of the fourth layer; and
  the first layer comprises greater than 95 wt. % of the metal oxide catalyst, based on the total weight of the fifth layer; or
the neutralizing trap comprises a first layer, a second layer, and a third layer, wherein:
  the first layer comprises greater than 95 wt. % activated carbon, based on the total weight of the first layer;
  the second layer comprises from 10 wt. % to 90 wt. % activated carbon, based on the total weight of the second layer, and from 10 wt. % to 90 wt. % of the metal oxide catalyst, based on the total weight of the second layer; and
  the third layer comprises greater than 95 wt. % of the metal oxide catalyst, based on the total weight of the third layer.

13. The air purifier of claim 10, wherein the plasma reactor comprises:
a plurality of discharge electrode assemblies, each discharge electrode assembly comprising one or more discharge electrode pins in an array arranged in a radial pattern and electrically configured to receive one or more voltage pulses; and
a counter electrode positioned radially outward from the one or more discharge electrode pins of each discharge electrode assembly, wherein
  each discharge electrode assembly is surrounded by the counter electrode and is separated therefrom by a discharge gap comprising a flow passage; and
at least one end cap electrically isolates each discharge electrode assembly from the counter electrode and permits the flow of gas through the flow passage.

14. The air purifier of claim 1, wherein:
a second neutralizer inlet area is defined in the main body;
the plurality of neutralizing blocks further includes a second pair of neutralizing blocks, the second pair of neutralizing blocks being disposed with the respective inlet ends adjacent the second neutralizer inlet area, a gas flow path further being defined from the plasma reactor to both of the inlet areas, the gas flow path splitting to flow through each of the neutralizing blocks in each of the pairs; and
each neutralizer outlet area being adjacent the outlet ends of one of the neutralizing blocks in each of the pairs.

15. The air purifier of claim 1, wherein the purified gas outlet comprises two outlets, each outlet being fluidly coupled to one of the neutralizer outlet areas.

16. A method of at least partially purifying ambient air, comprising:
providing an air purifier according to claim 1;
drawing ambient air into the air purifier;
passing the ambient air through the plasma reactor;
generating one or more reaction products in the plasma reactor, thereby introducing the reaction products into the ambient air to define a gas stream; and
neutralizing at least a portion of the reaction products by passing the gas stream through a neutralizing trap, thereby producing the purified gas stream.

17. The method of claim 16, further comprising passing the purified gas stream through a particulate filter, wherein the particulate filter comprises a plurality of perforations, each perforation being from 2 microns to 6 microns.

18. The method of claim 16, further comprises a sanitizing mode wherein:
a rate of generating one or more reaction products in the plasma reactor is increased to a rate greater than in a non-sanitizing mode; and/or
a flow rate through the neutralizing trap is increased to a rate greater than in the non-sanitizing mode;
wherein a portion of the reaction products are released to a surrounding area for sanitizing;
the flow rate in the sanitizing mode is at least twice the flow rate in the non-sanitizing mode, optionally at least five times the flow rate in the non-sanitizing mode.

* * * * *